United States Patent
Yui et al.

(10) Patent No.: US 10,048,851 B2
(45) Date of Patent: Aug. 14, 2018

(54) APPARATUS FOR OPERATING ROBOTS

(71) Applicant: DENSO WAVE INCORPORATED, Chita-gun, Aichi-pref. (JP)

(72) Inventors: Daisuke Yui, Chita-gun (JP); Motoki Kanada, Toyohashi (JP); Atsuko Sugano, Kariya (JP); Hirota Touma, Obu (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 15/076,016

(22) Filed: Mar. 21, 2016

(65) Prior Publication Data
US 2016/0274784 A1   Sep. 22, 2016

(30) Foreign Application Priority Data

Mar. 19, 2015 (JP) .................. 2015-056503
Feb. 2, 2016 (JP) .................. 2016-018003

(51) Int. Cl.
*G06F 3/0484* (2013.01)
*G05B 19/409* (2006.01)
(Continued)

(52) U.S. Cl.
CPC .......... *G06F 3/04847* (2013.01); *B25J 9/161* (2013.01); *B25J 9/1658* (2013.01); *G05B 19/409* (2013.01);
(Continued)

(58) Field of Classification Search
CPC ........................ G06F 3/04847; G06F 3/04883; B25J 9/1658; B25J 9/161; G05B 19/409;
(Continued)

(56) References Cited

U.S. PATENT DOCUMENTS

| 5,937,143 A | * | 8/1999 | Watanabe | B25J 9/1671 |
| | | | | 700/264 |
| 6,088,628 A | * | 7/2000 | Watanabe | B25J 9/1656 |
| | | | | 700/251 |

(Continued)

FOREIGN PATENT DOCUMENTS

| JP | 11262883 A | * | 9/1999 |
| JP | H11-262883 A | | 9/1999 |

OTHER PUBLICATIONS

Feb. 26, 2018 Office Action issued in U.S. Appl. No. 15/075,876.

*Primary Examiner* — Jaime Figueroa
(74) *Attorney, Agent, or Firm* — Oliff PLC

(57) ABSTRACT

A robot operation apparatus includes a touch panel, a display, an operation detecting unit capable of detecting a touch operation or a drag operation on the touch panel, a motion command generating unit that generates a motion command for operating a robot, and a display control unit that controls display content of the display. The motion command generating unit performs a motion speed determining process in which a motion speed of the robot is determined based on a slide distance that is a distance from a start position of a drag operation detected by the operation detecting unit to a current position. The display control unit performs a speed graphics display process in which a speed graphics in which the slide distance and the motion speed of the robot are correlated and that changes in aspect in accompaniment with changes in the slide distance is displayed on the display.

20 Claims, 41 Drawing Sheets

(51) Int. Cl.
*B25J 9/16* (2006.01)
*G06F 3/0488* (2013.01)

(52) U.S. Cl.
CPC .............. *G06F 3/04883* (2013.01); *G05B 2219/35488* (2013.01); *G05B 2219/36159* (2013.01); *G05B 2219/36168* (2013.01); *G05B 2219/40392* (2013.01)

(58) Field of Classification Search
CPC ........... G05B 2219/40392; G05B 2219/36168; G05B 2219/35488; G05B 2219/36159
USPC .................................................. 700/245, 257
See application file for complete search history.

(56) References Cited

U.S. PATENT DOCUMENTS

| | | | | |
|---|---|---|---|---|
| 6,167,328 | A * | 12/2000 | Takaoka | B25J 9/1671 318/568.1 |
| 8,406,923 | B2 * | 3/2013 | Ueyama | B25J 9/1697 700/245 |
| 8,972,055 | B1 * | 3/2015 | Desai | B25J 9/1651 318/568.18 |
| 9,186,792 | B2 * | 11/2015 | Kuwahara | B25J 9/1671 |
| 9,283,674 | B2 * | 3/2016 | Hoffman | B25J 9/161 |
| 9,311,608 | B2 * | 4/2016 | Kuwahara | B25J 9/1684 |
| 9,387,589 | B2 * | 7/2016 | Barajas | B25J 9/1697 |
| 9,387,590 | B2 * | 7/2016 | Som | B25J 13/06 |
| 9,452,528 | B1 | 9/2016 | Checka et al. | |
| 9,563,195 | B2 * | 2/2017 | Moriya | G05B 19/4069 |
| 9,625,899 | B2 * | 4/2017 | Kuwahara | G05B 19/425 |
| 2004/0143369 | A1 | 7/2004 | Takenaka et al. | |
| 2008/0027591 | A1 * | 1/2008 | Lenser | G05D 1/0274 701/2 |
| 2009/0058830 | A1 | 3/2009 | Herz et al. | |
| 2009/0289591 | A1 * | 11/2009 | Kassow | B25J 19/0004 318/568.13 |
| 2010/0103106 | A1 * | 4/2010 | Chui | G06F 3/017 345/166 |
| 2010/0245275 | A1 | 9/2010 | Tanaka | |
| 2011/0118928 | A1 | 5/2011 | Yoo et al. | |
| 2013/0009896 | A1 * | 1/2013 | Zaliva | G06F 3/0416 345/173 |
| 2014/0236565 | A1 * | 8/2014 | Kuwahara | B25J 9/1671 703/22 |
| 2014/0303775 | A1 | 10/2014 | Oh et al. | |
| 2014/0354548 | A1 * | 12/2014 | Lee | G06F 3/0346 345/166 |
| 2015/0057804 | A1 | 2/2015 | Som | |
| 2015/0081097 | A1 * | 3/2015 | Som | B25J 9/1656 700/257 |
| 2015/0190925 | A1 * | 7/2015 | Hoffman | B25J 9/161 700/257 |
| 2016/0096275 | A1 * | 4/2016 | Miyakoshi | B25J 13/06 700/264 |

* cited by examiner

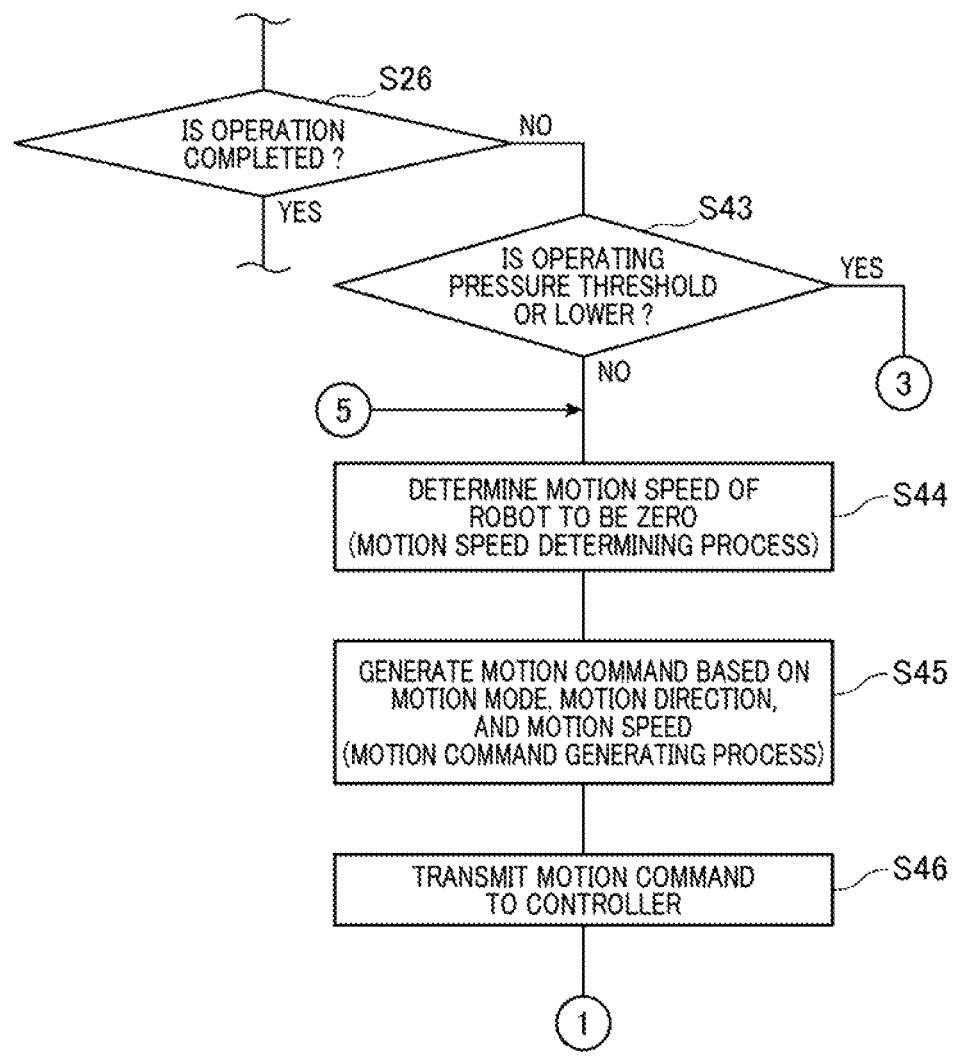

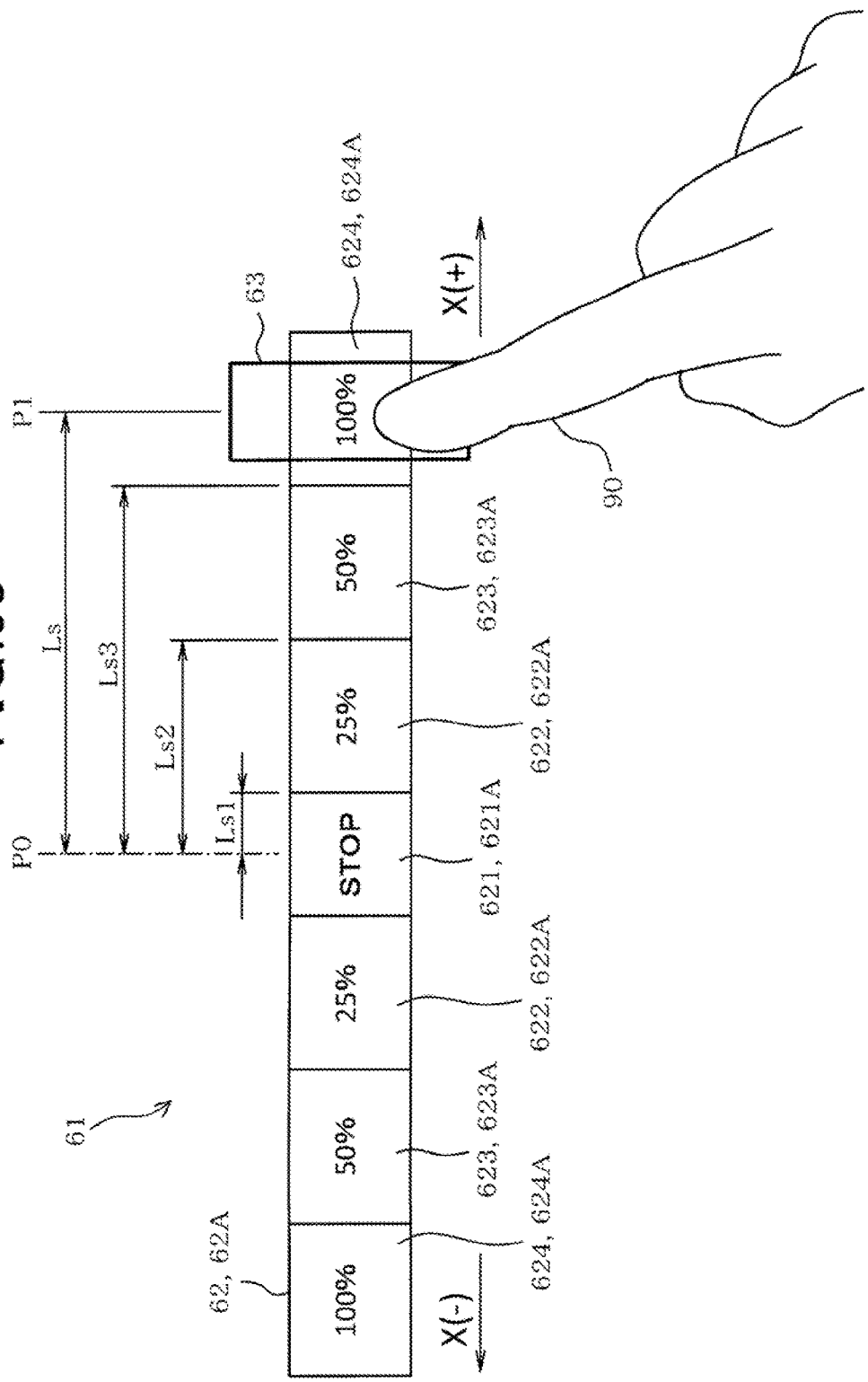

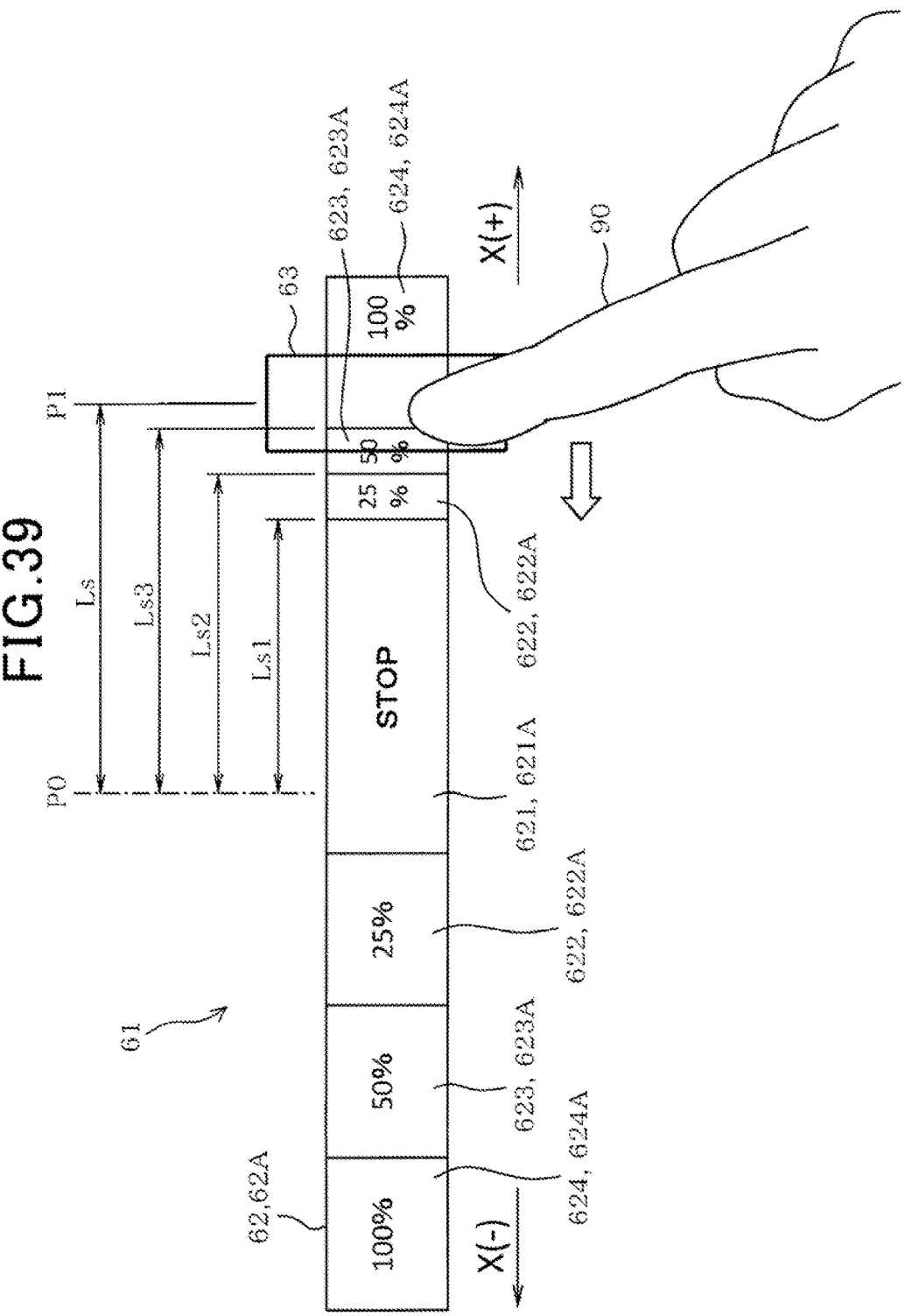

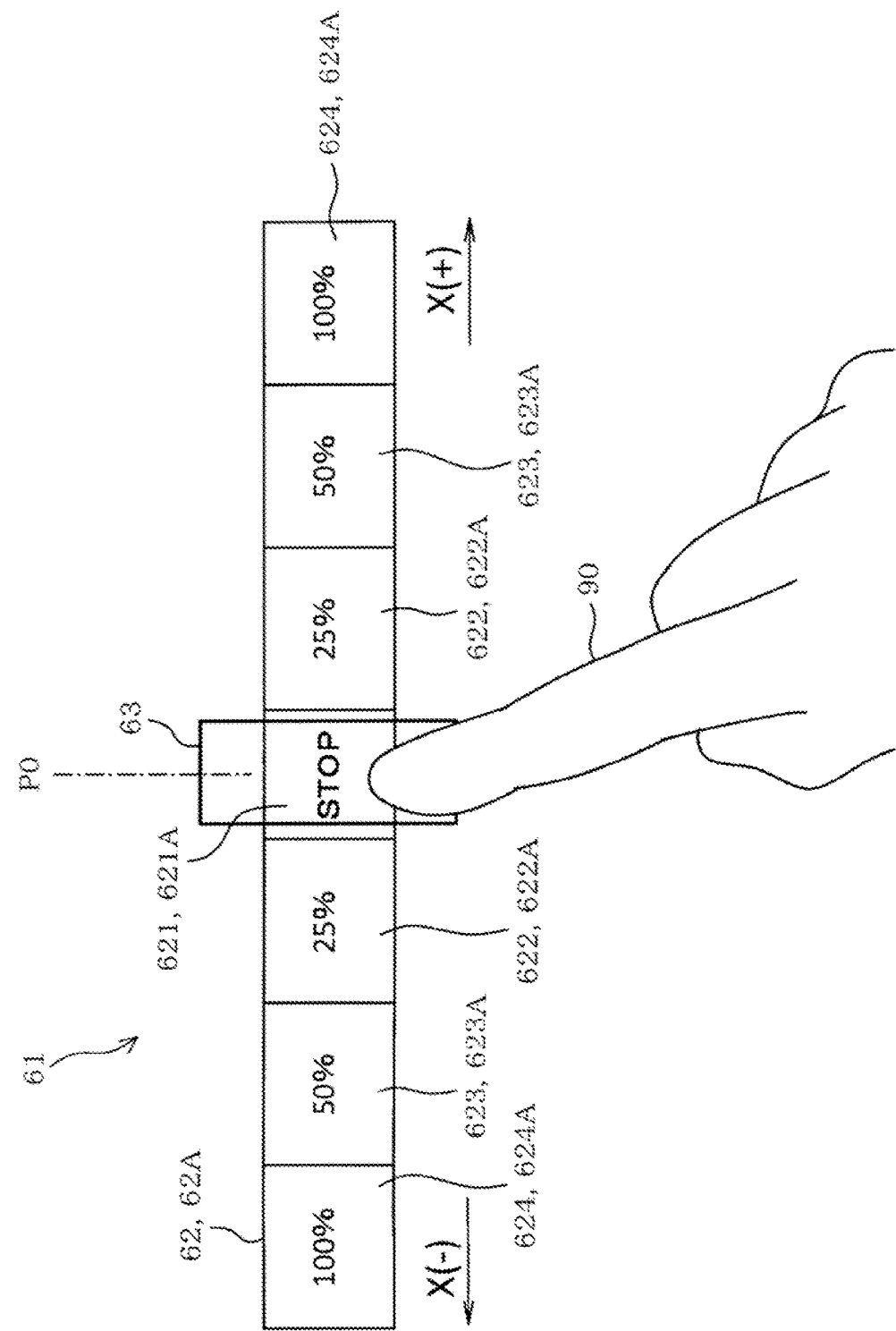

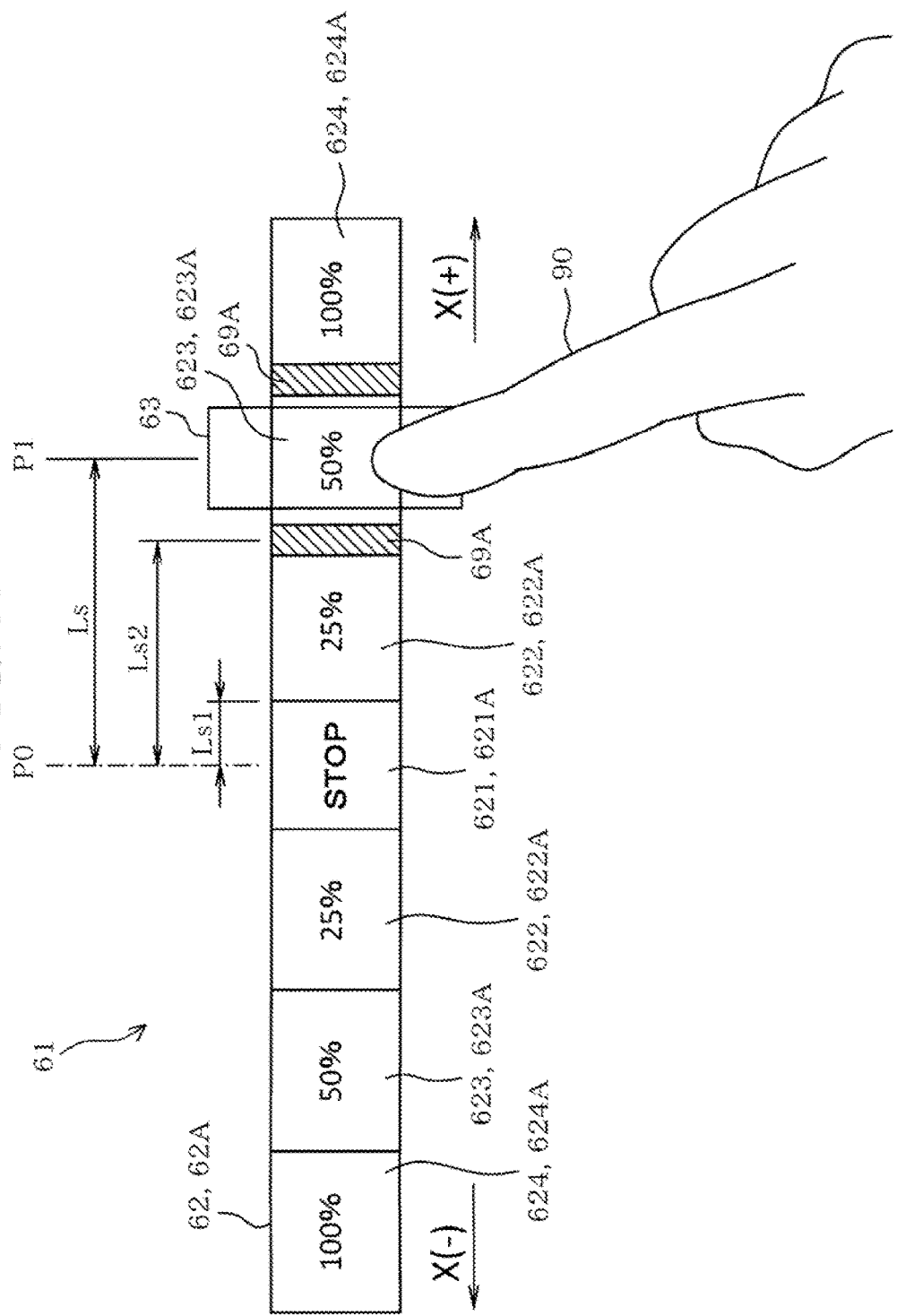

APPARATUS FOR OPERATING ROBOTS

CROSS-REFERENCE TO RELATED APPLICATION

This application is based on and claims the benefit of priority from earlier Japanese Patent Applications No. 2015-056503 filed Mar. 19, 2015 and 2016-018003 filed Feb. 2, 2016, the description of which is incorporated herein by reference.

BACKGROUND

Technical Field

The present invention relates to an apparatus that operates a robot. In particular, the present invention relates to an apparatus that operates various robots belonging to a category that is referred to as industrial robots.

Background Art

In a robot system for industrial use, manual operation in which a robot is manually operated is possible. Manual operation is used when a teaching operation (teaching), for example, is performed. In this case, a user manually operates the robot (referred to as manual operation or manual operation) using a teaching pendant or the like that is connected to a controller that controls the robot.

Many teaching pendants are provided with a touch panel display that can be touch-operated and can display images and the like. Among teaching pendants that are provided with a touch panel display, some enable the user to manually operate the robot by performing an operation that is referred to as a so-called drag operation, that is, by performing an operation in which a finger, a dedicated pen, or the like is traced over the touch panel display.

CITATION LIST

Patent Literature

[PTL 1] JP-A-H11-262883

Technical Problem

Technical Problem

However, the drag operation on the touch panel display is an operation in which the finger of the user or the like is traced over the flat touch panel display. Therefore, physical changes, such as in pressing force or tilt of a mechanical operating key, that are made when the operating key is operated are not possible. Therefore, compared to a teaching pendant in which a mechanical operating key is operated, in a teaching pendant in which a drag operation is performed on a touch panel display, the user has difficulty in attaining a sense of operation. Consequently, the user has difficulty in intuitively determining whether or not their drag operation is correctly inputted to the teaching pendant. In addition, in such teaching pendants, the user has difficulty in intuitively determining the correlation between the drag operation performed by the user themselves and motion of the robot performed as a result of the drag operation.

SUMMARY

In light of the above-described issues, in an apparatus that performs manual operation of a robot by a drag operation being inputted on a touch panel, it is desirable that an apparatus that operates a robot be provided that enables intuitive operation and is capable of improving user operability.

Solution to Problem

A robot operation apparatus of an exemplary embodiment includes a touch panel that receives input of a touch operation and a drag operation from a user; a display that is capable of displaying graphics; an operation detecting unit that is capable of detecting the touch operation and the drag operation on the touch panel; a motion command generating unit that generates a motion command for operating the robot based on a detection result from the operation detecting unit; and a display control unit that controls display content of the display. That is, the robot operation apparatus actualizes manual operation of a robot by a touch operation and a drag operation.

Here, the touch operation refers to an operation in which a finger of a user, a pen device, or the like (referred to, hereafter, as the finger or the like) comes into contact with, that is, touches a touch panel. In addition, the drag operation is performed continuously from the touch operation, and refers to an operation in which the finger of the user or the like is moved over the touch panel while the finger or the like remains in contact with the touch panel. In other words, the drag operation is an operation in which the finger of the user or the like is continuously moved over a fixed distance while in contact with the touch panel.

In addition, in the robot operation apparatus of the exemplary embodiment, the motion command generating unit is capable of performing a motion speed determining process in which a motion speed of the robot is determined based on a slide distance of a drag operation detected by the operation detecting unit. The slide distance is a distance from a start position to a current position of the drag operation. The display control unit capable of performing a speed graphics display process in which a speed graphics is displayed on the display. The speed graphics is a graphics in which the slide distance and the motion speed of the robot are correlated and that changes in aspect in accompaniment with changes in the slide distance. That is, the aspect of the speed graphics changes in accompaniment with the slide distance of the drag operation becoming longer or shorter. Because the slide distance and the motion speed of the robot are correlated, the aspect of the speed graphics is also correlated with the motion speed of the robot.

That is, in this configuration, when a drag operation is performed on the touch panel, the motion speed of the robot is determined based on the slide distance of the drag operation. Consequently, the user can change the motion speed of the robot by adjusting the slide distance of the drag operation. In addition, when the user adjusts the slide distance of the drag operation to adjust the motion speed of the robot, the aspect of the speed graphics displayed on the display changes, in accompaniment with the changes in the slide distance. Consequently, the user can intuitively determine the correlation between the drag operation performed by the user themselves and the motion speed of the robot performed as a result of the drag operation. That is, the user can visually recognize the current motion speed of the robot performed by their drag operation by viewing the speed graphics displayed on the display. As a result, intuitive operation becomes possible, the sense of operation of the user can be improved, and operability can be improved.

In the robot operation apparatus of the exemplary embodiment, the motion command generating unit can perform a motion direction determining process. The motion direction determining process may be a process in which a motion command for operating the robot in a positive direction is generated when an operating direction of the drag operation is a positive direction with reference to the start position of the drag operation, and a motion command for operating the robot in a negative direction is generated when the operating direction of the drag operation is a negative direction that is opposite the positive direction. Consequently, the user can adjust the motion direction of the robot to the positive direction or the negative direction by adjusting the operating direction of the drag operation to the positive direction or the negative direction with reference to the start position of the drag operation.

That is, the drag operation is an operation in which the finger of the user or line is moved, that is, slid over the touch panel. Therefore, the drag operation always includes the operating direction and the slide distance. Therefore, in the present robot operation apparatus, the motion speed of the robot can be determined by the slide distance of the drag operation, and the positive/negative of the motion direction of the robot can be determined by the positive/negative of the operating direction of the drag operation. Consequently, the user can determine the motion speed and the motion direction of the robot by a single drag operation. Therefore, the user is no longer required to perform a separate operation to determine the motion direction of the robot. As a result, the hassle of performing operations can be reduced and operability is improved.

Many conventional robot operation apparatuses are provided with a physical switch, that is, the so-called dead man's switch for ensuring safety of the robot and user. For example, the configuration is such that the robot cannot be operated unless the dead man's switch is in a depressed state. In this configuration, when the robot is about to collide with an object of some sort during operation of the robot by the user, the user can stop the operation of the robot by releasing a finger or the like from the dead man's switch or by firmly pressing the dead man's switch. Therefore, the user can quickly respond to such situations. As a result, a high degree of safety can be ensured. However, for example, when a low-cost device provided with a touch panel, such as a smartphone or a tablet terminal, is used as the robot operation apparatus, providing a physical switch such as the dead man's switch becomes difficult.

Here, when a device such as a smartphone is used the robot operation apparatus according to the above-described claims, that is, when the robot operation apparatus is not equipped with the dead man's switch is considered. In this configuration, for example, when the robot is about to collide with an object of some sort during user operation, the user can stop the operation of the robot by ending the operation by removing the finger or the like performing the operation from the touch panel. As a result, collision of the robot can be prevented to the greatest possible extent.

However, in some instances, the user may not be able to take action to remove the finger or the like performing the operation from the touch panel, on the spur of the moment. In this case, for example, the following three actions are supposed as the actions taken by the user. A first action is the user performing an operation to set the motion speed of the robot to zero or to decrease the motion speed, to stop or decelerate the robot. That is, the user performs an operation to shorten the slide distance Ls. A second action is the user erroneously performing an operation that increases the motion speed of the robot. That is, the user performs an operation that increases the slide distance. Both the first action and the second action are thought to be suddenly performed during a short amount of time. In addition, a third action is the user firmly pressing the touch panel with the finger or the like at the current operating position, without being able to perform any operations.

Therefore, in the above-described robot operation apparatus, the motion speed determining process includes a process in which the motion speed of the robot is set to zero when the operating speed of the drag operation exceeds a threshold. That is, as a result, when a drag operation in which the slide distance is suddenly increased or decreased, or in other words, a sudden drag operation in which the operating speed exceeds the threshold is performed, the operation of the robot can be stopped. Therefore, even when the above-described first action and second action are taken, the operation of the robot can be quickly stopped. As a result, safety in robot operation can be improved.

Here, the following issue may occur when the threshold regarding the deceleration operation is uniformly set regardless of the proficiency of the user. That is, a user with high proficiency is used to operating the robot. Therefore, the user can safely operate the robot even when the operating speed is relatively high. However, when the threshold is set based on users with low proficiency, when the user with high proficiency performs a quick deceleration operation, the robot stops contrary to the intention of the user. As a result, the operation intended by the user becomes difficult to perform, and this becomes inconvenient.

Therefore, in the above-described robot operation apparatus, the threshold for when a deceleration operation that is a drag operation in which the slide distance is decreased is performed is set to an operating speed of an acceleration operation that is a drag operation performed immediately before the deceleration operation and in which the slide distance is increased. That is, when the first action is taken and the deceleration operation is performed, the operation of the robot is stopped as a result of the operating speed of the acceleration operation performed immediately before the deceleration operation being exceeded.

In other words, in an operation related to normal teaching operations and the like (referred to, hereafter, as normal operation), it is though that, because the user with high proficiency is used to operating the robot, the user performs both the acceleration operation and the deceleration operation at a relatively high operating speed. Meanwhile, in normal operation, it is though that, because a user with low proficiency is not used to operating the robot, the user performs both the acceleration operation and the deceleration operation at a relatively low operating speed. Therefore, in the present configuration, the threshold for the deceleration operation is set to the operating speed of the acceleration operation performed immediately before the deceleration operation, taking into consideration the differences in operating speed attributed to the proficiency level. Consequently, the threshold for the deceleration operation related to a user with high proficiency tends to be a large value. Meanwhile, the threshold for the deceleration operation related to a user with low proficiency tends to be a small value. Therefore, the threshold for the deceleration operation can be that which is suitable for the proficiency level of the user. As a result, operability can be improved regardless of the proficiency level of the user.

When the deceleration operation is performed, the motion speed of the robot also decreases in accompaniment with the deceleration operation. Therefore, safety increases during normal operation. Consequently, no particular issues arise when the threshold for the deceleration operation changes depending on the proficiency level of the user. Meanwhile, when a sudden acceleration operation that is a drag operation in which the slide distance is increased is performed, the motion speed of the robot also suddenly increases. Therefore, the level of danger increases. Consequently, the threshold for the acceleration operation is preferably fixed, regardless of the proficiency level of the user.

Other characteristics are described in the embodiments disclosed below together with accompanying drawings.

BRIEF DESCRIPTION OF DRAWINGS

In the accompanying drawings:

FIG. 37 is a flowchart (2) of additions to the details of various processes performed by a control unit according to the first embodiment, according to the seventh embodiment;

FIG. 38 is a diagram (1) of a configuration of a speed graphics according to an eighth embodiment;

FIG. 39 is a diagram (2) of the configuration of the speed graphics according to the eighth embodiment;

FIG. 40 is a diagram (1) of a configuration of a speed graphics according to a ninth embodiment; and FIG. 41 is a diagram (2) of the configuration of the speed graphics according to the ninth embodiment.

DETAILED DESCRIPTION OF THE PREFERRED EMBODIMENTS

A plurality of embodiments of the present invention will hereinafter be described. Configurations according to the embodiments that are essentially the same are given the same reference numbers. Descriptions thereof will be omitted for a simplified description.

First Embodiment

Figure 1:
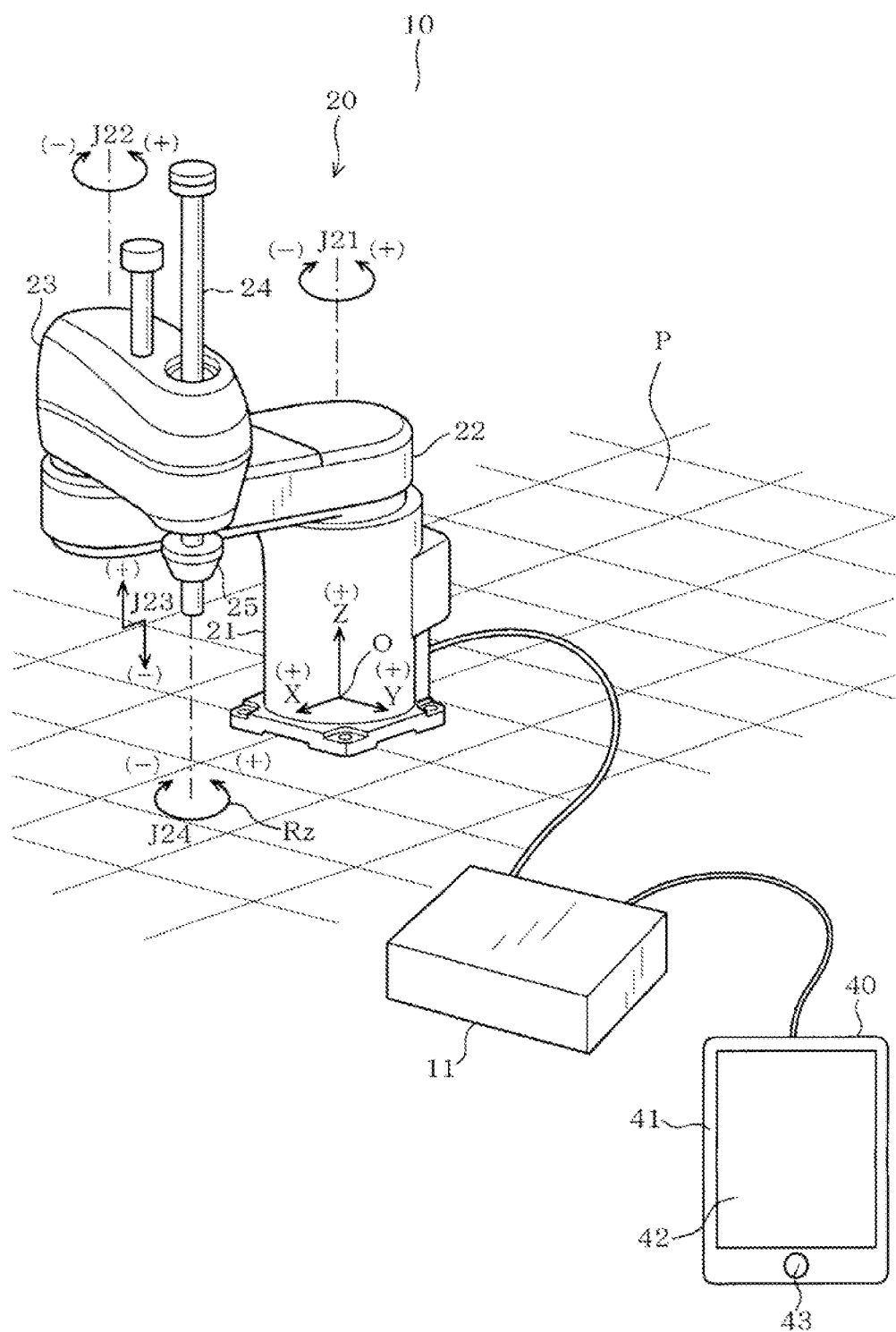
FIG. 1 is an overall configuration diagram of an example of a robot system using a four-axis, horizontal articulated robot according to a first embodiment.
Figure 2:
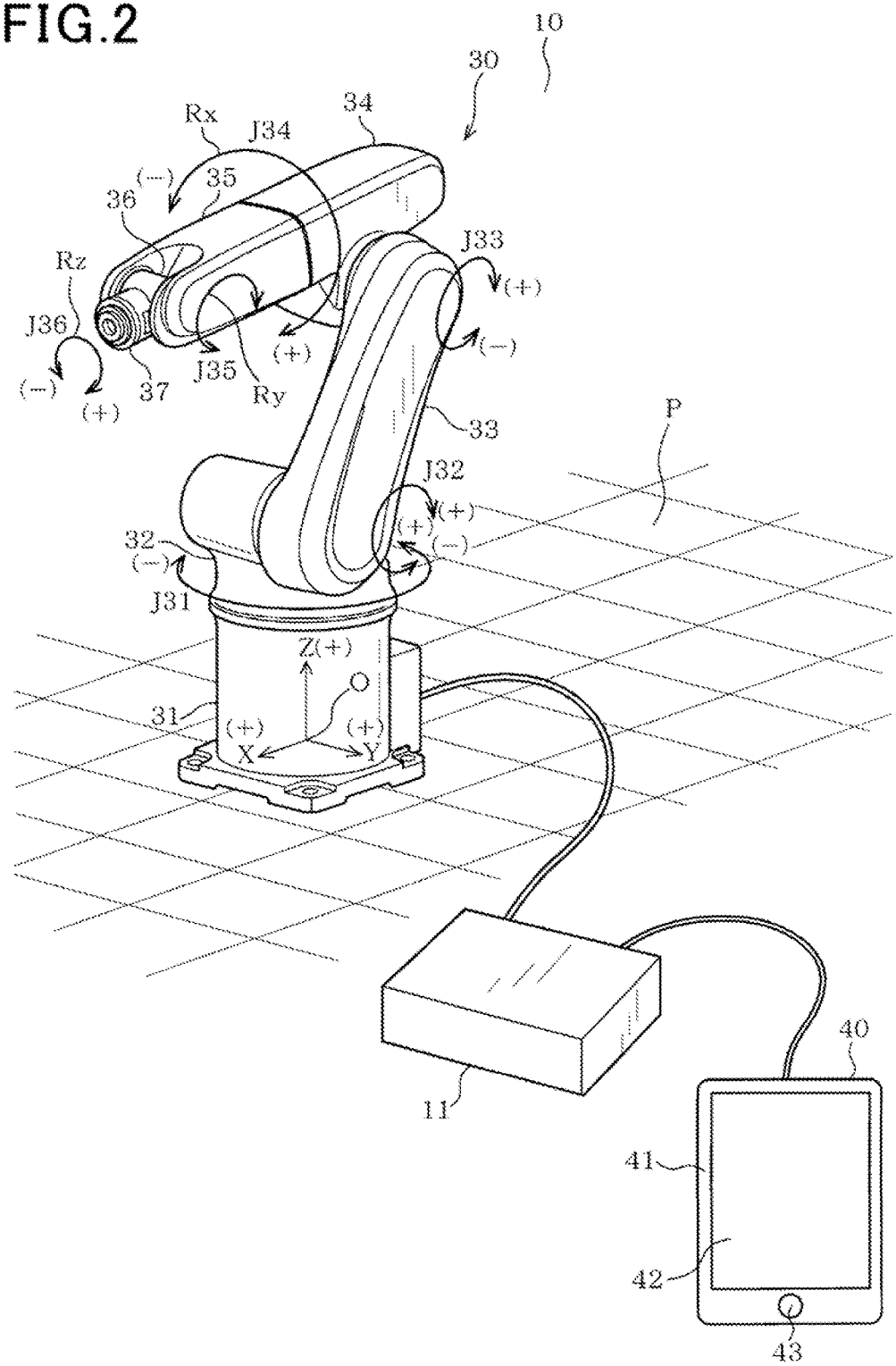
FIG. 2 is an overall configuration diagram of an example of a robot system using a six-axis, vertical articulated robot according to the first embodiment.

A first embodiment of the present invention will be described below, with reference to FIG. 1 to FIG. 19. FIG. 1 and FIG. 2 show a system configuration of a typical robot for industrial use. A robot system 10 operates, for example, a four-axis, horizontal articulated robot 20 (referred to, hereafter, as a four-axis robot 20) shown in FIG. 1 or a six-axis, vertical articulated robot 30 (referred to, hereafter, as a six-axis robot 30) shown in FIG. 2. The robot to be operated by the robot system 10 is not limited to the above-described four-axis robot 20 and six-axis robot 30.

First, an overall configuration of the four-axis robot 20 shown in FIG. 1 will be described. The four-axis robot 20 operates or is manipulated based on a unique robot coordinate system (a three-dimensional orthogonal coordinate system composed of an X-axis, a Y-axis, and a Z-axis). According to the present embodiment, in the robot coordinate system, the center of a base 21 is defined as a point of origin O, a top surface of a work table P is defined as an X-Y plane, and a coordinate axis perpendicular to the X-Y plane is defined as the Z-axis. The top surface of the work table P is an installation surface for installing the four-axis robot 20. In this case, the installation surface corresponds to an action reference plane of the robot. The action reference plane is not limited to the installation surface and may be an arbitrary plane.

The four-axis robot 20 has the base 21, a first arm 22, a second arm 23, a shaft 24, and a flange 25. The base 21 is fixed to the top surface (also referred to, hereafter, as the installation surface) of the work table P. The first arm 22 is connected to an upper portion of the base 21 such as to be capable of rotating in a horizontal direction around a first axis 321. The first axis 321 has a shaft center in the Z-axis (vertical-axis) direction. The second arm 23 is connected to an upper portion of a tip end portion of the first arm 22 such as to be capable of rotating around a second axis 322. The second axis J22 has a shaft center in the Z-axis direction. The shaft 24 is provided in a tip end portion of the second arm 23 such as to be capable of moving up and down and to be capable of rotating. In addition, an axis for when the shaft 24 is moved up and down is a third axis 323. An axis for when the shaft 24 is rotated is a fourth axis J24. The flange 25 is detachably attached to a tip end portion, that is, a lower end portion of the shaft 24.

The base 21, the first arm 22, the second arm 23, the shaft 24, and the flange 25 function as an arm of the four-axis robot 20. An end effector (not shown) is attached to the flange 25 that is the arm tip. For example, when component inspection or the like is performed using the four-axis robot 20, a camera for imaging the component to be inspected or the like is used as the end effector. The plurality of axes (321 to J24) provided in the four-axis robot 20 are driven by motors (not shown) respectively provided in correspondence thereto. A position detector (not shown) for detecting a rotation angle of a rotation shaft of the motor is provided near each motor.

When an articulated-type robot is manually operated, the motions of the robot include a motion of an axis system in which the drive axes are individually driven, and a motion of an end effector system in which the end effector of the robot is moved over an arbitrary coordinate system by a plurality of drive axes being driven in combination. In this case, in the motion of the axis system, the four-axis robot 20 can individually drive the drive axes J21 to J24. In addition, in the motion of the end effector system, the four-axis robot 20 can, for example, perform: a motion in the X-Y plane direction in which the first axis 321 and the second axis J22 are combined; a motion in the Z direction by the third axis 323; and a motion in a Rz direction by the fourth axis 324.

Next, an overall configuration of the six-axis robot 30 shown in FIG. 2 will be described. In a manner similar to the four-axis robot 20, the six-axis robot 30 also operates based on a unique robot coordinate system (a three-dimensional orthogonal coordinate system composed of an X-axis, a Y-axis, and a Z-axis). The six-axis robot 30 has a base 31, a shoulder portion 32, a lower arm 33, a first upper arm 34, a second upper arm 35, a wrist 36, and a flange 37. The base 31 is fixed to the top surface of the work table P. The shoulder portion 32 is connected to an upper portion of the base 31 such as to be capable of rotating in a horizontal direction around a first axis J31. The first axis 331 has a shaft center in the Z-axis (vertical-axis) direction. The lower arm 33 is provided extending upward from the shoulder portion 32. The lower arm 33 is connected to the shoulder portion 32 such as to be capable of rotating in a vertical direction around a second axis 332. The second axis 332 has a shaft center in the Y-axis direction.

The first upper arm 34 is connected to a tip end portion of the lower arm 33, such as to be capable of rotating in the vertical direction around a third axis 333. The third axis 333 has a shaft center in the Y-axis direction. The second upper arm 35 is connected to a tip end portion of the first upper arm 34 such as to be capable of rotating in a twisting manner around a fourth axis 334. The fourth axis J34 has a shaft center in the X-axis direction. The wrist 36 is connected to a tip end portion of the second upper arm 35 such as to rotate in the vertical direction around a fifth axis 325. The fifth axis 325 has a shaft center in the Y-axis direction. The flange 37 is connected to the wrist 36 such as to be capable of rotating in a twisting manner around a sixth axis 336. The sixth axis 336 has a shaft center in the X-axis direction.

The base 31, the shoulder portion 32, the lower arm 33, the first upper arm 34, the second upper arm 35, the wrist 36, and the flange 37 function as an arm of the robot 30. A tool, such as an air chuck (not shown), is attached to the flange 37 (corresponding to the end effector) that is the arm tip. In a manner similar to the four-axis robot 20, the plurality of axes (331 to J36) provided in the six-axis robot 30 are driven by motors (not shown) respectively provided in correspondence thereto. In addition, a position detector (not shown) for detecting a rotation angle of a rotation shaft of the motor is provided near each motor.

In the motion of the axis system, the six-axis robot 30 can individually drive the drive axes J31 to J36. In addition, in the motion of the end effector system, the six-axis robot 30 can perform a motion in which the end effector is rotated around two axes differing from the Z-axis, in addition to the motions that can be performed by the four-axis robot 20. The two axes are two axes (X-axis and Y-axis) that are perpendicular to each other and horizontal in relation to the installation surface P. In this case, the rotation direction around the X-axis is an Rx direction and the rotation direction around the Y-axis is an Ry direction. That is, in the motion of the end effector system, the six-axis robot 30 can, for example, perform: a motion in the X-Y plane direction in which the first axis J31, the second axis 332, and the third axis 333 are combined; a motion in a Z direction in which the second axis J32 and the third axis J33 are combined; a motion in the Rx direction by the fourth axis 334; a motion in the Ry direction by the fifth axis J35; and a motion in the Rz direction by the sixth axis.

In addition, the robot system 10 shown in FIG. 1 and FIG. 2 includes a controller 11 and a teaching pendant 40 (corresponding to a robot operation (or manipulation) apparatus), in addition to the robot 20 or the robot 30. The controller 11 controls or manipulates the robot 20 or 30. The controller 11 is connected to the robot 20 or 30 by a connection cable. The teaching pendant 40 is connected to the controller 11 by a connection cable. Data communication is performed between the controller 11 and the teaching pendant 40. As a result, various types of operating information inputted based on user operation are transmitted from the teaching pendant 40 to the controller 11. In addition, the controller 11 transmits various types of control signals, signals for display, and the like, and also supplies power for driving, to the teaching pendant 40. The teaching pendant 40 and the controller 11 may be connected by wireless communication.

When a signal issuing a command for manual operation is provided by the teaching pendant 40, the controller 11 performs control to enable the robot 20 or 30 to be manually operated. In addition, when a signal issuing a command for automatic operation is provided by the teaching pendant 40, the controller 11 performs control to enable the robot 20 or 30 to be automatically operated by startup of an automatic program that is stored in advance.

Figure 3:
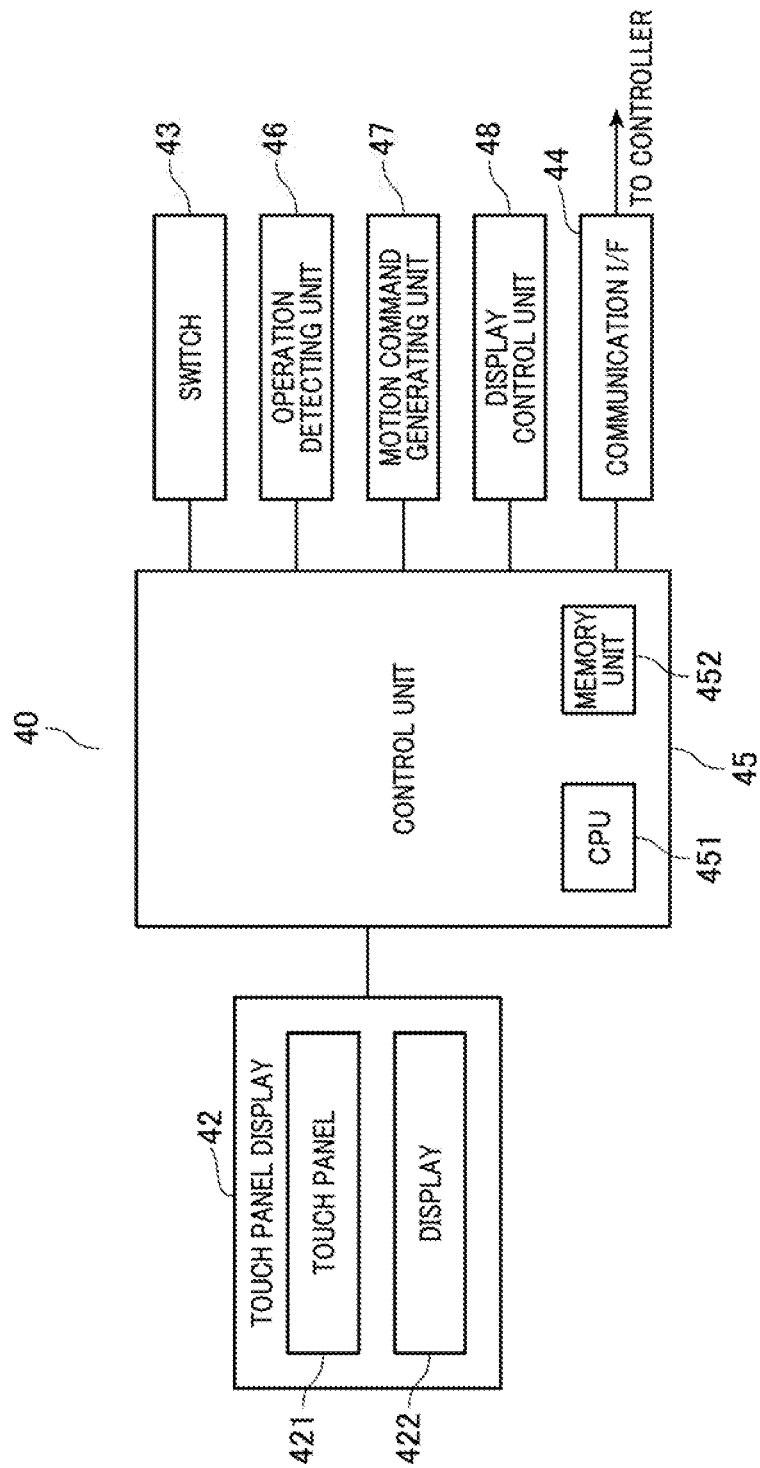
FIG. 3 is a block diagram of an example of an electrical configuration of a teaching pendant according to the first embodiment.

For example, the size of the teaching pendant 40 is to an extent that allows the user to carry the teaching pendant 40 or to operate the teaching pendant 40 while holding the teaching pendant 40 in their hand. The teaching pendant 40 is provided with, for example, a case 41, a touch panel display 42, and a switch 43. The case 41 is shaped like a thin, substantially rectangular box and configures an outer shell of the teaching pendant 40. The touch panel display 42 is provided so as to occupy a major portion of the front surface side of the case 41. As shown in FIG. 3, the touch panel display 42 has a touch panel 421 and a display 422, and is such that the touch panel 421 and the display 422 are arranged in an overlapping manner.

The touch panel display 42 is capable of receiving input of touch operations and drag operations by the user through the touch panel 421. In addition, the touch panel display 42 is capable of displaying images of characters, numbers, symbols, graphics, and the like through the display 422. The switch 43 is, for example, a physical switch and is provided in the periphery of the touch panel display 42. The switch 43 may be replaced with a button displayed on the touch panel display 42. The user performs various input operations by operating the touch panel display 42 and the switch 43.

The user can perform various functions such as operation and setting of the robot 20 or 30 using the teaching pendant 40. The user can also call up a control program stored in advance, and perform startup of the robot 20 or 30, setting of various parameters, and the like. In addition, the user can also perform various teaching operations by operating the robot 20 or 30 by manual operation, that is, operation by hand. In the touch panel display 42, for example, a menu screen, a setting input screen, a status display screen, and the like are displayed as required.

Next, an electrical configuration of the teaching pendant 40 will be described with reference to FIG. 3. The teaching pendant 40 has, in addition to the touch panel display 42 and the switch 43, a communication interface (I/F) 44, a control unit 45, an operation detecting unit 46, a motion command generating unit 47, and a display control unit 48. The communication interface 44 connects the control unit 45 of the teaching pendant 40 and the controller 11 to enable communication.

The control unit 45 is mainly configured by a microcomputer. The microcomputer includes, for example, a central processing unit (CPU) 451 and a storage area 452 (corresponding to a non-transitory, computer-readable medium), such as a read-only memory (ROM), a random access memory (RAM), and a rewritable flash memory. The control unit 45 controls the overall teaching pendant 40. The storage area 452 stores therein a robot operation program. The control unit 45 runs the robot operation program in the CPU 451, thereby virtually actualizing the operation detecting unit 46, the motion command generating unit 47, the display control unit 48, and the like through software. The operation detecting unit 46, the motion command generating unit 47, and the display control unit 48 may also be actualized by hardware as an integrated circuit that is integrated with the control unit 45, for example.

The operation detecting unit 46 is capable of detecting touch operations and drag operations performed on the touch panel 421. As detection of a touch operation, the operation detecting unit 46 is capable of detecting whether or not a finger of the user or the like has come into contact with the touch panel display 42, and the position (touch position) of the finger or the like that is in contact. In addition, as detection of a drag operation, the operation detecting unit 46 is capable of detecting a current position, a movement direction, a movement speed, and a movement amount of the finger or the like related to the drag operation.

The motion command generating unit 47 generates a motion command for operating the robot 20 or 30 based on the detection result from the operation detecting unit 46. The motion command generated by the motion command generating unit 47 is provided to the controller 11 via the communication interface 44. The display control unit 48 controls display content displayed on the display 422, based on operation of the switch 43, the detection result from the operation detecting unit 46, and the like. Through use of the teaching pendant 40 configured in this way, the user can perform manual operation of the robot 20 or 30 by touch operations and drag operations.

Next, details of control performed by the control unit 45 will be described with reference to FIG. 4 to FIG. 11. In the description below, when motion mode of the robot 20 or 30 is referred to, this indicates a motion mode of the robot 20 or 30 by a drive axis or a combination of drive axes of the robot 20 or 30. In this case, regarding motion systems, that is, the above-described end effector system and each axis system, the motion mode of the robot 20 or 30 does not include a movement direction in a positive (+) direction or a negative (−) direction of the motion system. In the description below, a case is described in which, in the motion of the end effector system of the robot 20 or 30, manual operation in the X-Y plane direction is performed on the same screen. In the teaching pendant 40, motion mode is not limited to the above-described motion mode of the end effector system in the X-Y plane direction. The robot 20 or 30 can be manually operated in an arbitrary motion mode of the axis system and the end effector system.

Figure 4:
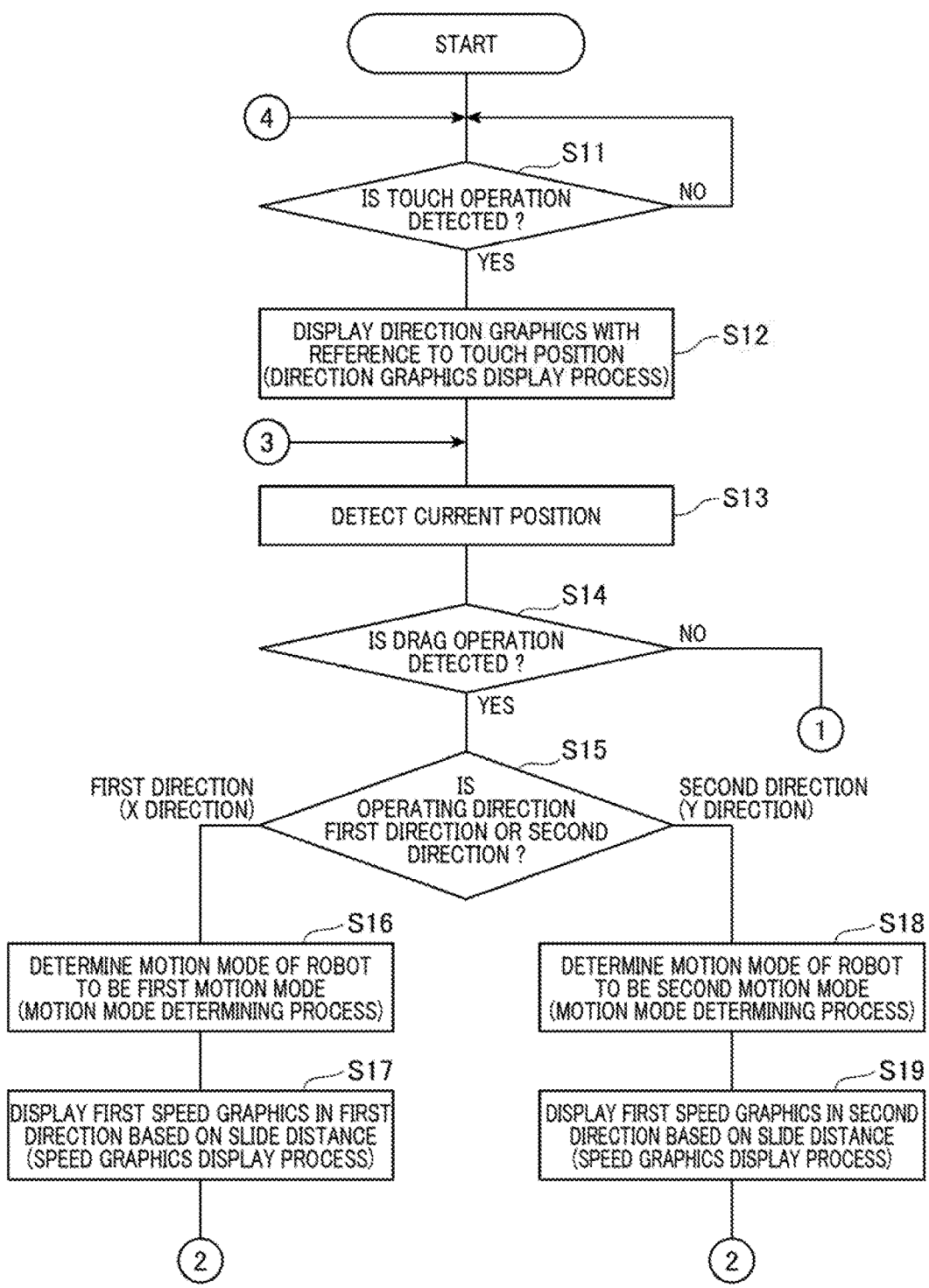
FIG. 4 is a flowchart (1) of an example of details of various processes performed by a control unit according to the first embodiment.
Figure 5:
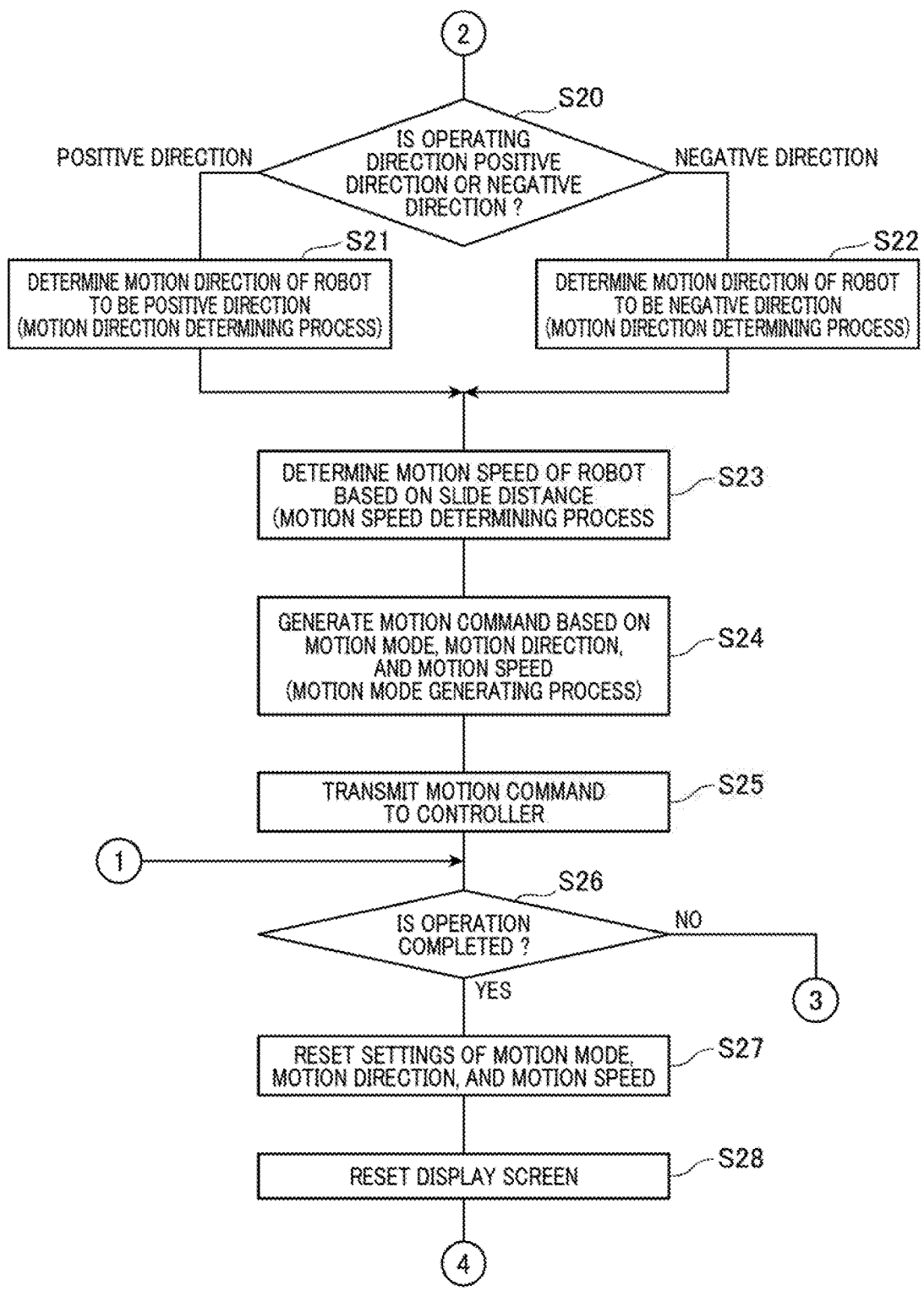
FIG. 5 is a flowchart (2) of the details of the various processes performed by the control unit according to the first embodiment.
Figure 6:
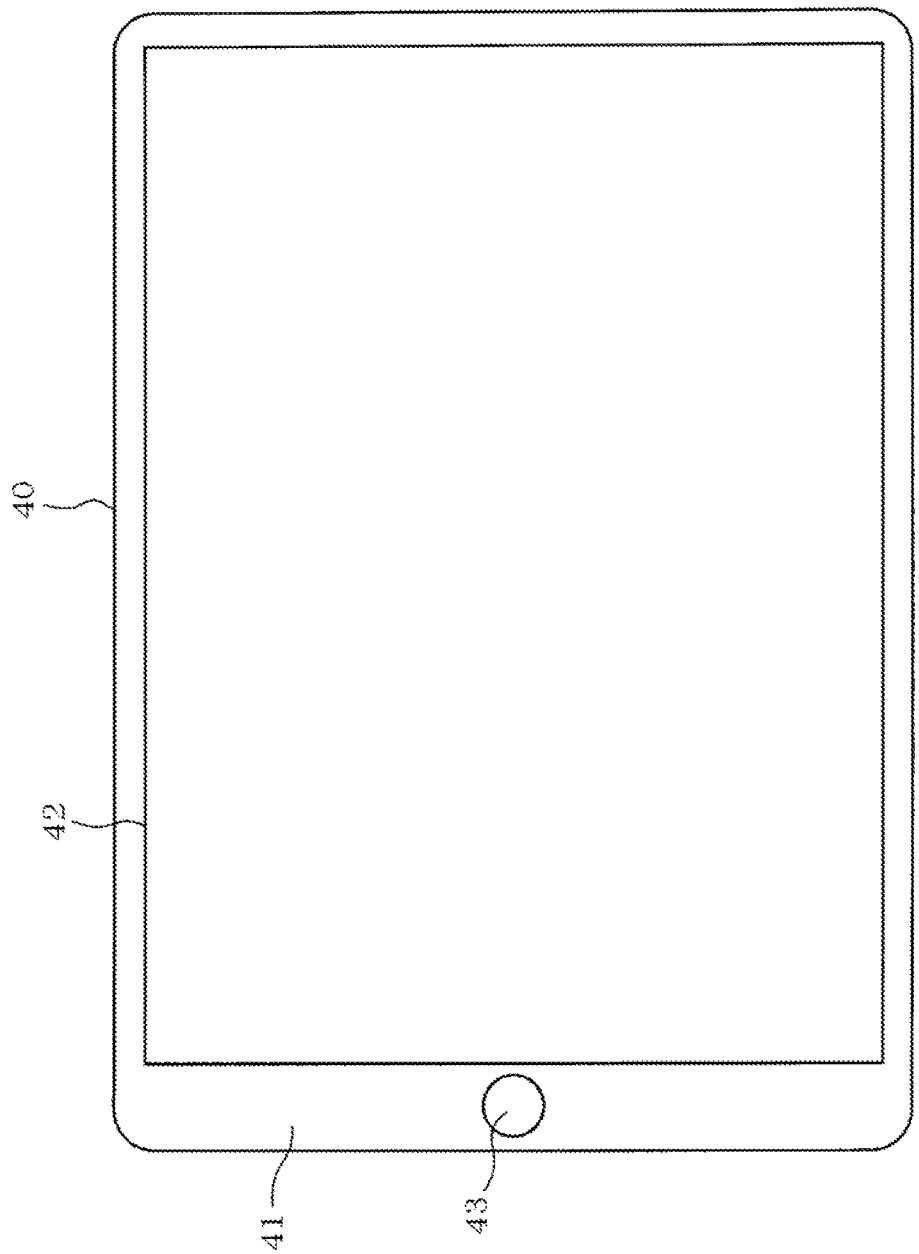
FIG. 6 is a diagram of an example of display content on a touch panel display immediately after manual operation is started, according to the first embodiment.
Figure 7:
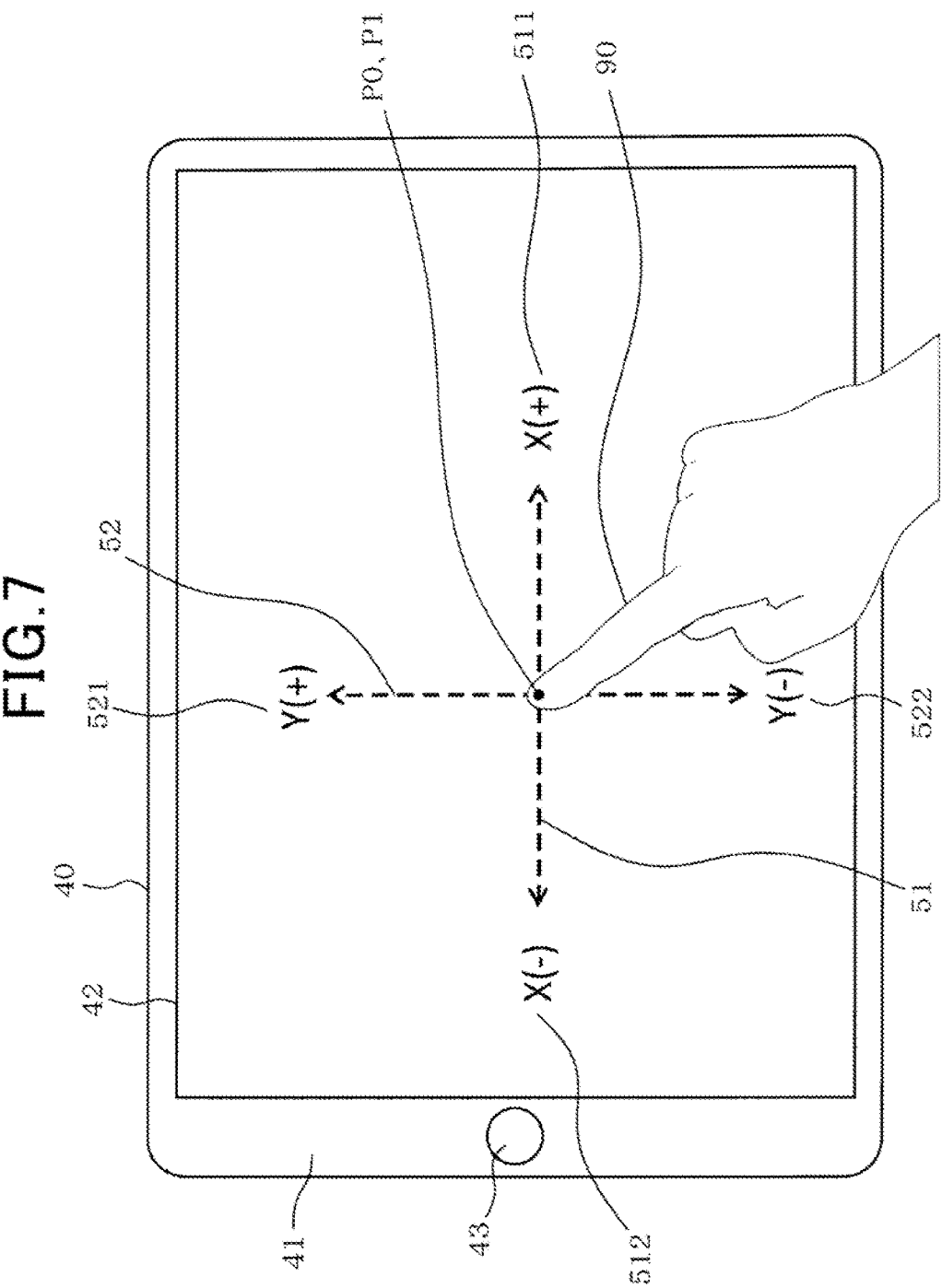
FIG. 7 is a diagram of an example of when a first direction graphics and a second direction graphics are displayed on the touch panel display as a result of a touch operation being detected, according to the first embodiment.

When manual operation of the robot 20 or 30 is started, the control unit 45 of the teaching pendant 40 performs control of which details are shown in FIG. 4 and FIG. 5. Specifically, when a process related to manual operation is started, first, at step S11 in FIG. 4, the control unit 45 determines whether or not a touch operation is performed on the touch panel display 42 based on a detection result from the operation detecting unit 46. When determined that a touch operation is not performed (NO at step S11), the control unit 45 displays nothing on the touch panel display 42, as shown in FIG. 6, and waits. Meanwhile, as shown in FIG. 7, when the user performs a touch operation on an arbitrary point on the touch panel display 42 with a finger 90 or the like, the control unit 45 determines that a touch operation is performed (YES at step S11) and performs step S12 in FIG. 4.

At step S12, the control unit 45 performs a direction graphics display process. The direction graphics display process is a process in which, when the operation detecting unit 46 detects a touch operation, as shown in FIG. 7, a first direction graphics 51 and a second direction graphics 52 are displayed on the touch panel display 42. The first direction graphics 51 is a graphics indicating a first direction in relation to the touch panel display 42. The second direction graphics 52 is a graphics indicating a second direction in relation to the touch panel display 42. For example, the first direction is set to a longitudinal direction of the touch panel display 42. In addition, the second direction is set to a direction perpendicular to the first direction. The first direction and the second direction may be arbitrarily set.

In the direction graphics display process, the control unit 45 sets a touch position P0 by the touch operation to a center position P0 of the first direction graphics 51 and the second direction graphics 52. The control unit 45 displays the first direction graphics 51 and the second direction graphics 52 on the touch panel display 42 such as to be perpendicular to each other. The first direction graphics 51 includes first direction displays 511 and 512 that indicate the first direction. The second direction graphics 52 includes second direction displays 521 and 522 that indicate the second direction. The first direction display 511 indicates the positive (+) direction in the first direction. The first direction display 512 indicates the negative (−) direction in the first direction. The second direction display 521 indicates the positive (+) direction in the second direction. The second direction display 522 indicates the negative (−) direction in the second direction.

The drag operations in the first direction and the second direction are assigned arbitrary motion modes of the robot 20 or 30. According to the present embodiment, the drag operation in the first direction is assigned a motion mode of the end effector system in the X direction. In addition, the drag operation in the second direction is assigned a motion mode of the end effector system in the Y direction. That is, the user can operate the robot 20 or 30 in the positive (+) direction in the X direction by performing the drag operation in the positive (+) direction along the first direction graphics 51. The user can operate the robot 20 or 30 in the negative (−) direction in the X direction by performing the drag operation in the negative (−) direction along the first direction graphics 51. In addition, the user can operate the robot 20 or 30 in the positive (+) direction in the Y direction by performing the drag operation in the positive (+) direction along the second direction graphics 52. The user can operate the robot 20 or 30 in the negative (−) direction in the Y direction by performing the drag operation in the negative (−) direction along the second direction graphics 52.

Next, at step S13 in FIG. 4, the control unit 45 detects a current position P1 related to the finger 90 of the user or the like, by the operation detecting unit 46. As a result, the control unit 45 can detect whether or not a drag operation is performed, as well as a slide distance Ls of the drag operation, an operating direction of the drag operation, and the like, based on the touch position P0 of the touch operation detected at step S11 and the current position P1 detected at step S13. In this case, the touch position P0 is synonymous with a start position P0 of the drag operation. In addition, the slide distance Ls means a linear distance connecting the start position P0 of the drag operation and the current position P1. The operating direction of the drag operation is determined by the direction of the straight line connecting the start position P0 of the drag operation and the current position P1.

Next, at step S14, the control unit 45 determines whether or not a drag operation is performed, based on the touch position P0 detected at step S11 and the current position P1 detected at step S13. When the touch position P0 of the touch operation detected at step S11 and the current position P1 detected at step S13 are identical, the control unit 45 determines that a drag operation is not performed (NO at step S14) and performs step S26 in FIG. 5. Meanwhile, when the touch position P0 of the touch operation detected at step S11 and the current position P1 detected at step S13 differ, the control unit 45 determines that a drag operation is performed (YES at step S14) and performs step S15.

Next, at step S15, the control unit 45 determines whether the operating direction of the drag operation is the first direction or the second direction. When determined that the operating direction of the drag operation is the first direction that is, in this case, the X direction (first direction at step S15), the control unit 45 performs steps S16 and S17. Meanwhile, when determined that the operating direction of the drag operation is the second direction that is, in this case, the Y direction (second direction at step S15), the control unit 45 performs steps S18 and S19. In the determination at step S15, positive/negative in the first direction or the second direction is not an issue.

At steps S16 and S18, the control unit 45 performs a motion mode determining process by processes performed by the motion command generating unit 47. The motion mode determining process is a process for determining the motion mode of the robot 20 or 30 to be a first motion mode when the operating direction of the drag operation detected by the operation detecting unit 46 is the first direction, and determining the motion mode of the robot 20 or 30 to be a second motion mode when the operating direction of the drag operation is the second direction.

In this case, when the operating direction of the drag operation is the first direction along the first direction graphics 51 (first direction at step S15), at step S16, the control unit 45 determines the motion mode of the robot 20 or 30 to be a motion of the end effector system in the X direction, which is the first motion mode. Meanwhile, when the operating direction of the drag operation is the second direction along the second direction graphics 52 (second direction at step S15), at step S18, the control unit 45 determines the motion mode of the robot 20 or 30 to be a motion of the end effector system in the Y direction, which is the second motion mode.

Figure 8:
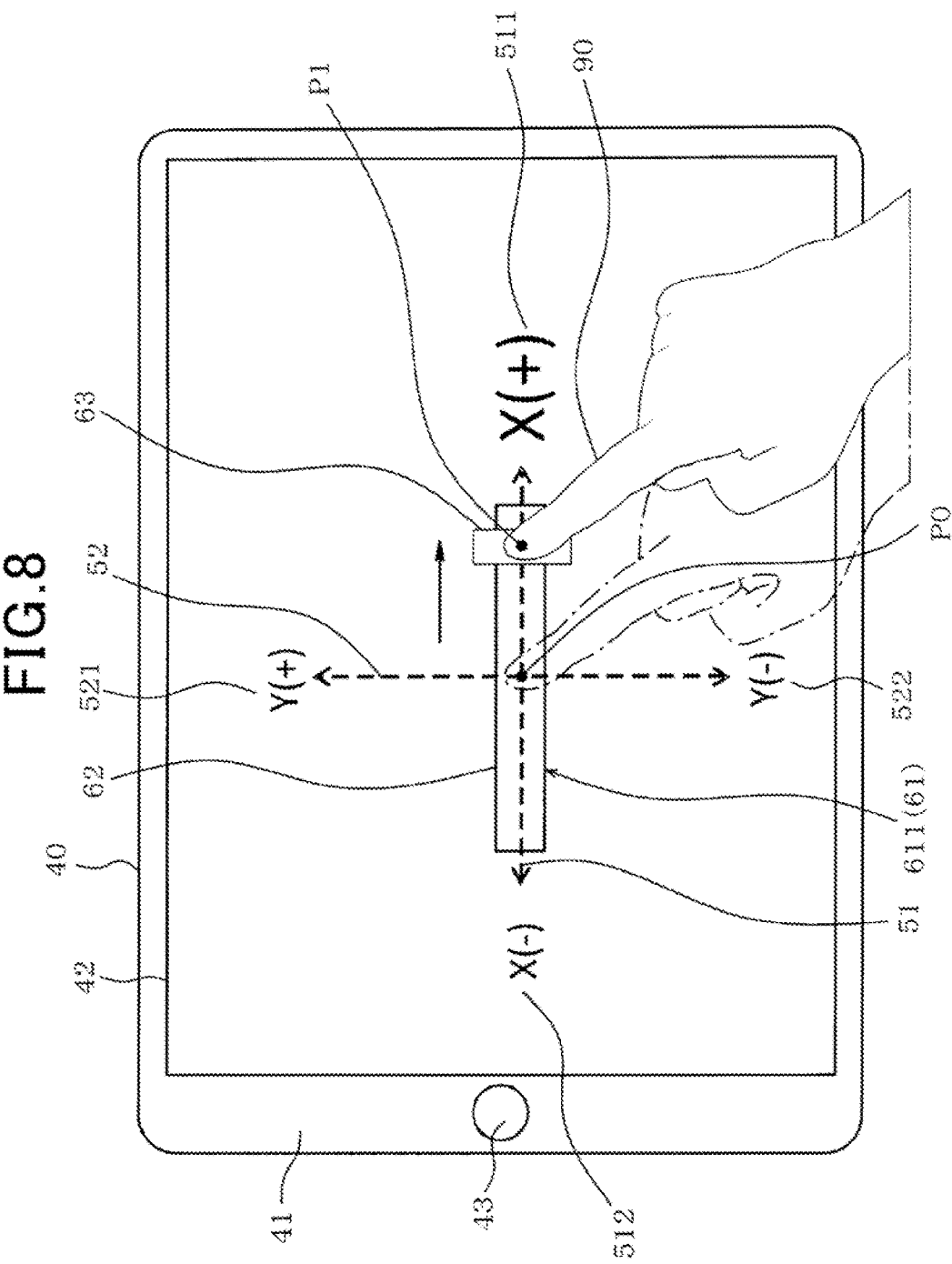
FIG. 8 is a diagram of an example of when a first speed graphics is displayed on the touch panel display as a result of a drag operation in a first direction being detected, according to the first embodiment.
Figure 9:
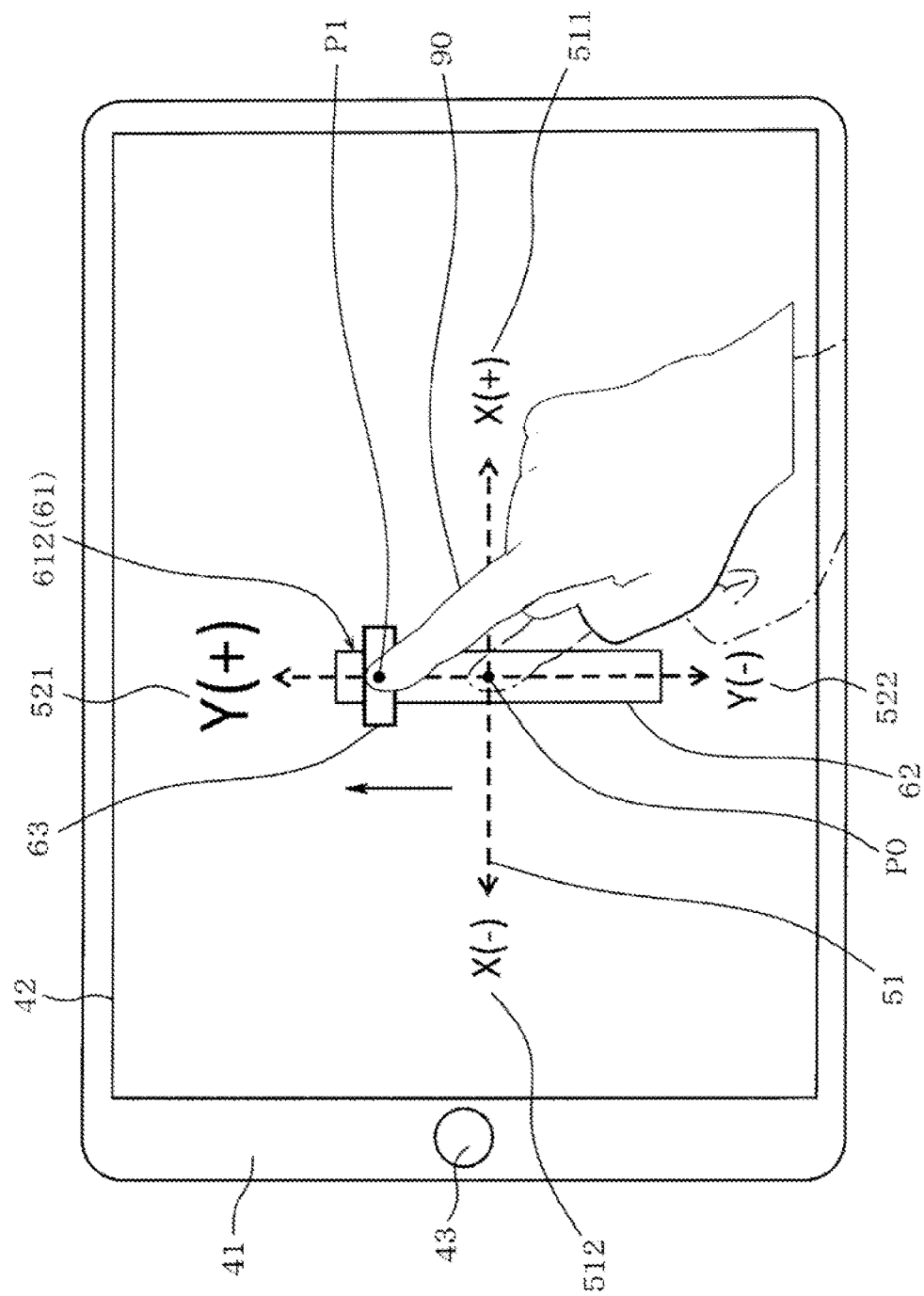
FIG. 9 is a diagram of an example of when a second speed graphics is displayed on the touch panel display as a result of a drag operation in a second direction being detected, according to the first embodiment.

Next, at steps S17 and S19, the control unit 45 performs a speed graphics display process by processes performed by the display control unit 48. The speed graphics display process is a process in which a speed graphics 611 or 612 is displayed on the touch panel display 42, as shown in FIG. 8 or FIG. 9. In this case, when the operating direction of the drag operation is the first direction along the first direction graphics 51 (first direction at step S15), as shown in FIG. 8, the control unit 45 displays a first speed graphics 611 that extends in the first direction, on the touch panel display 42 (step S18). Meanwhile, when the operating direction of the drag operation is the second direction along the second direction graphics 52 (second direction at step S15), as shown in FIG. 9, the control unit 45 displays a first speed graphics 612 that extends in the second direction, on the touch panel display 42 (step S19).

The first speed graphics 611 and 612 are examples of the speed graphics. The first speed graphics 611 that extends in the first direction is displayed such as to overlap the first direction graphics 51. The first speed graphics 612 that extends in the second direction is displayed such as to overlap the second direction graphics 52. When a drag operation is detected and the first speed graphics 61 is displayed, the control unit 45 may perform display such that a direction display corresponding to the operating direction of the drag operation is more strongly emphasized than other direction displays, such as by the color, size, or shape thereof being changed. For example, as shown in FIG. 8, when a drag operation in the positive (+) direction in the first direction is performed, the control unit 45 displays the direction display 511 indicating the positive (+) direction in the first direction to be larger than the other direction displays 512, 521, and 522. In addition, for example, as shown in FIG. 9, when a drag operation in the positive (+) direction in the second direction is performed, the control unit 45 displays the direction display 521 indicating the positive (+) direction in the second direction to be larger than the other direction displays 511, 512, and 522. As a result, the user can easily ascertain the operating direction of the drag operation performed by the user themselves at a single glance.

The first speed graphics 611 and 612 are graphics in which the slide distance Ls of the drag operation and a motion speed Vr of the robot 20 or 30 are correlated, and of which the aspects change in accompaniment with changes in the slide distance Ls. In this case, for both first speed graphics 611 and 612, a number indicating the value of the motion speed Vr of the robot 20 or 30 may be displayed on the touch panel display 42 together with the first speed graphic 611 or 612. However, according to the present embodiment, the number indicating the value of the motion speed Vr is not included in the aspects of the first speed graphics 611 and 612.

The first speed graphics 611 that extends in the first direction corresponds, for example, to the motion mode of the end effector system in the X direction. In addition, the first speed graphics 612 that extends in the second direction corresponds, for example, to the motion mode of the end effector system in the Y direction. Aside from the differences in the corresponding motion mode of the robot 20 or 30 and the display orientation, the first speed graphics 611 and 612 have a similar basic configuration. Therefore, in the description below, the description will be given mainly with reference to drawings showing the first speed graphics 611 that extends in the first direction. In addition, when the first speed graphics 611 that extends in the first direction and the first speed graphics 612 that extends in the second direction are collectedly referred to, the first speed graphics 61 is simply used.

Figure 10:
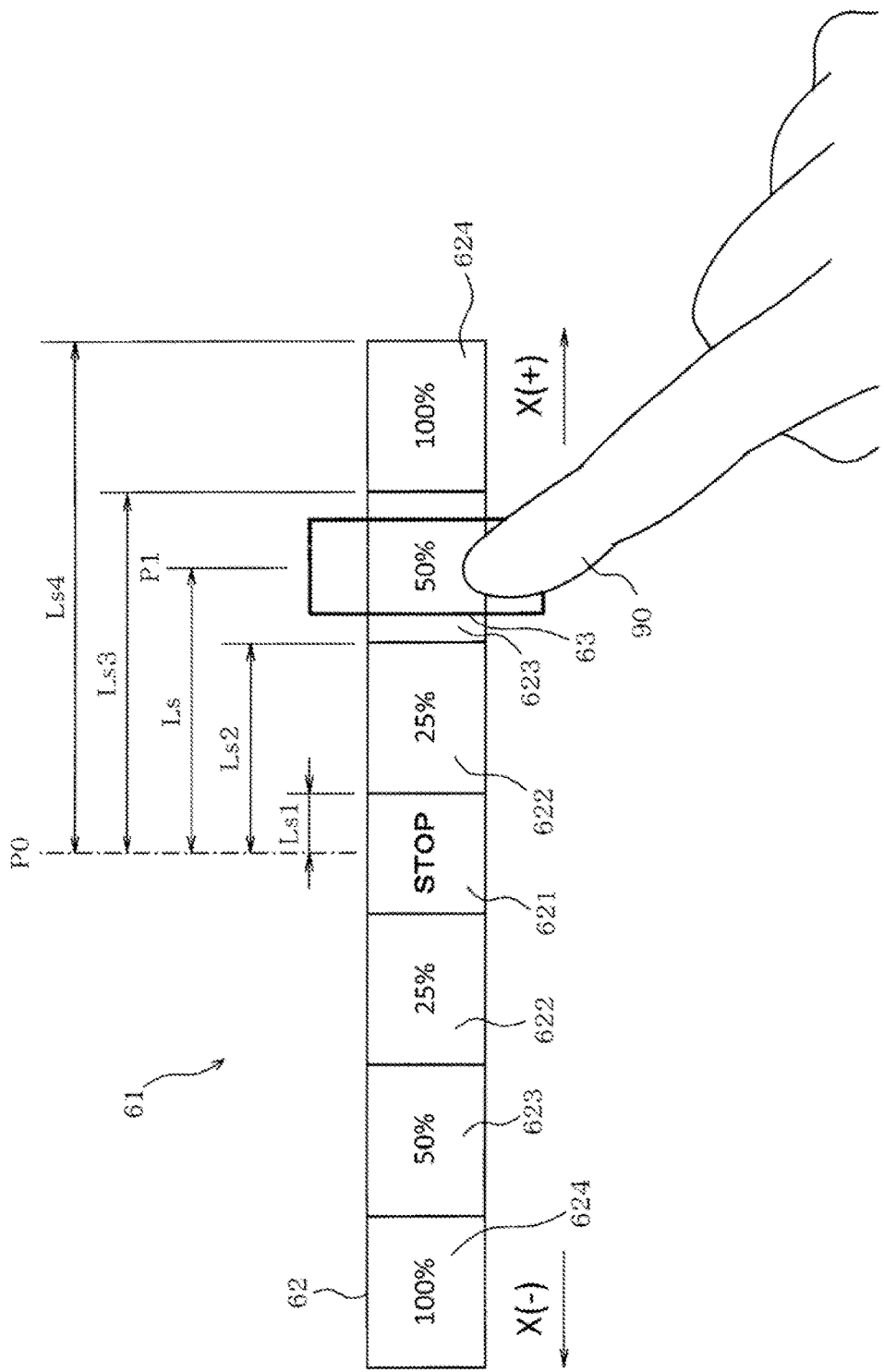
FIG. 10 is a diagram of an example of details of a speed graphics according to the first embodiment.

As shown in FIG. 10, the first speed graphics 61 has a first bar 62 and a slider 63. The first bar 62 is formed in a linear shape with a start position P0 of the drag operation as a base point, or in this case, a rectangular shape that is laterally long in the first direction. The first bar 62 is a graphics that indicates the correlation between the slide distance Ls of the drag operation and the motion speed Vr of the robot 20 or 30. The slider 63 is capable of moving along the first bar 62 in accompaniment with the drag operation. The slider 63 is a graphics that indicates the current position P1 of the drag operation on the first bar 62. That is, the display position of the slider 63 also moves in accompaniment with the changes in slide distance Ls resulting from the drag operation by the user. In this case, the changes in the aspect of the speed graphics 61 include the changes in the relative positional relationship of the slider 63 in relation to the first bar 62. That is, the aspect of the speed graphics 61 changes in accompaniment with the changes in slide distance Ls of the drag operation.

The slider 63 indicates the motion speed of the robot 20 or 30 set by the drag operation. According to the present embodiment, the speed graphics 61 is set such that the motion speed Vr of the robot 20 or 30 increases in stages in proportion to the slide distance Ls of the drag operation. That is, the speed graphics 61 is set such that the motion speed Vr of the robot 20 or 30 increases in stages in proportion to the position of the slider 63 in relation to the first bar 62, or in other words, the increase in slide distance Ls.

According to the present embodiment, the first bar 62 has a first area 621, a second area 622, a third area 623, and a fourth area 624. Of the overall first bar 62, the first area 621 is an area that is less than a first distance Ls1 on both the positive and negative side, with the start position P0 of the drag operation as the base point. Of the overall first bar 62, the second area 622 is an area that is the first distance Ls1 or more and less than a second distance Ls2 on both the positive and negative side, with the start position P0 of the drag operation as the base point. Of the overall first bar 62, the third area 623 is an area that is the second distance Ls2 or more and less than a third distance Ls3 on both the positive and negative side, with the start position P0 of the drag operation as the base point. Of the overall first bar 62, the fourth area 624 is an area that is the third distance Ls3 or more and less than a fourth distance Ls4 on both the positive and negative side, with the start position P0 of the drag operation as the base point.

According to the present embodiment, the motion speed Vr of the robot 20 or 30 by manual operation can be changed over four stages including a stop state (Vr=0), in one positive or negative direction. For example, a speed that is 0% in relation to a maximum motion speed Vrmax of the robot 20 or 30 is a first motion speed Vr1. That is, the first motion speed Vr1 is the stop state of the robot 20 or 30. In addition, a speed that is 25% in relation to the maximum motion speed Vrmax of the robot 20 or 30 is a second motion speed Vr2. A speed that is 50% in relation to the maximum motion speed Vrmax of the robot 20 or 30 is a third motion speed Vr3. A speed that is 100% in relation to the maximum motion speed Vrmax of the robot 20 or 30 is a fourth motion speed Vr4. In this case, the fourth motion speed Vr4 is the maximum motion speed Vrmax of the robot 20 or 30.

Figure 11:
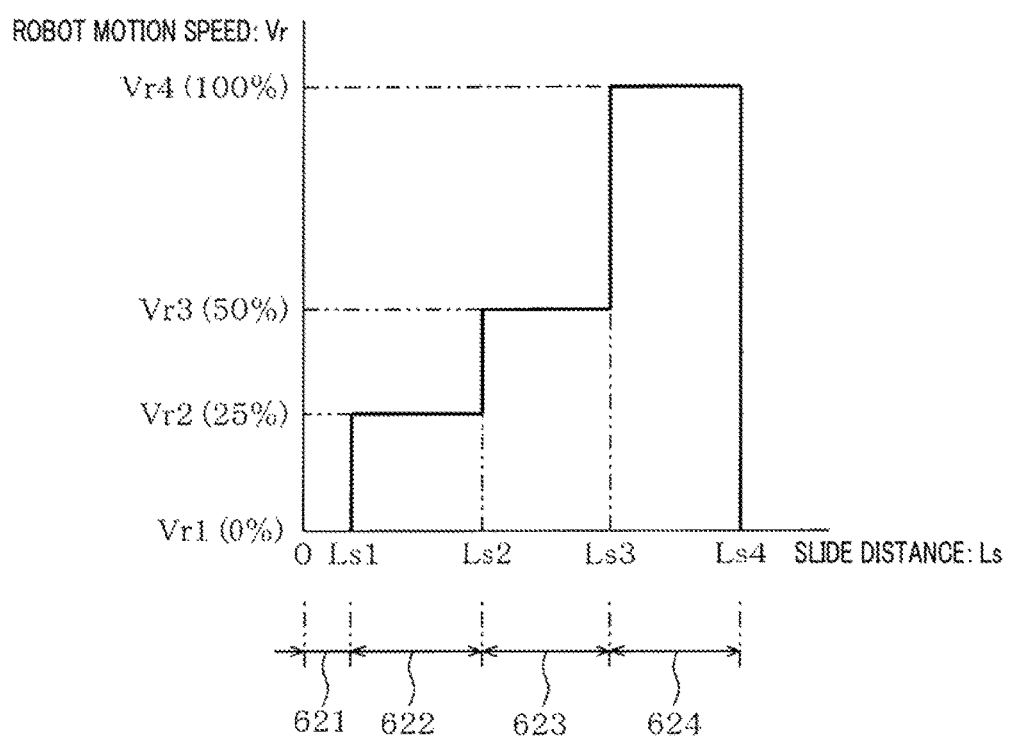
FIG. 11 is a diagram of an example of a correlation between a slide distance of a drag operation and a motion speed of a robot, according to the first embodiment.

Of the overall first bar 62, the first area 621 is assigned to the first motion speed Vr1 (0%). The second area 622 is assigned to the second motion speed Vr2 (25%). The third area 623 is assigned to the third motion speed Vr3 (50%). The fourth area 624 is assigned to the fourth motion speed Vr4 (100%). The correlation between the slide distance Ls on the first bar 62 of the speed graphics 61 and the motion speed Vr of the robot 20 or 30 is as shown in FIG. 11.

In this case, the slider 63 may be made to move continuously and smoothly based on the slide distance Ls of the drag operation. The slider 63 has a width of a certain extent. Therefore, when the slide distance Ls is near the boundary between two adjacent areas, the slider 63 is positioned such as to straddle the two adjacent areas. The area, of the two adjacent areas, indicated by the slider 63 is difficult to know.

Therefore, the slider 63 may be made to move intermittently based on the slide distance Ls of the drag operation.

In other words, when the slide distance Ls of the drag operation is the first distance Ls1 or less, the slider 63 is displayed to indicate the center of the first area 621, that is, the start position P0 of the drag operation. When the slide distance Ls of the drag operation is the first distance Ls1 or more and less than the second distance Ls2, the slider 63 is displayed to indicate the center of the second area 622. When the slide distance Ls of the drag operation is the second distance Ls2 or more and less than the third distance Ls3, the slider 63 is displayed to indicate the center of the third area 623. When the slide distance Ls of the drag operation is the third distance Ls3 or more and less than the fourth distance Ls4, the slider 63 is displayed to indicate the center of the fourth area 624. As a result, the slider 63 no longer becomes positioned such as to straddle two adjacent areas. Therefore, the user can ascertain the area indicated by the slider 63 at a single glance.

According to the present embodiment, when the slide distance Ls of the drag operation becomes the fourth distance Ls4 or more, the control unit 45 determines that an operable range is exceeded and displays the slider 63 such as to indicate the start position P0. However, this is not limited thereto. When the slide distance Ls of the drag operation becomes the fourth distance Ls4 or more, the control unit 45 may determine that the user intends to operate the robot 20 or 30 at the motion speed Vr4 and display the slider 63 such as to indicate the center of the fourth area 624.

Next, at step S20 in FIG. 5, the control unit 45 determines whether the operating direction of the drag operation is the positive direction or the negative direction in the first direction or the second direction. Then, at step S21 or step S22, the control unit 45 performs a motion direction determining process based on the determination result at step S10, by processes performed by the motion command generating unit 47. The motion direction determining process includes a process in which a motion command for operating the robot 20 or 30 in the positive direction in the motion mode determined in the motion mode determining process at step S16 or S18 is generated when the operating direction of the drag operation is the positive direction with reference to the start position P0 of the drag operation. In addition, the motion direction determining process includes a process in which a motion command for operating the robot 20 or 30 in the negative direction in the motion mode determined in the motion mode determining process at step S16 or S18 is generated when the operating direction of the drag operation is the negative direction that is a direction opposite the positive direction.

For example, according to the present embodiment, when determined that the operating direction of the drag operation is the first direction (in this case, the X direction) and the positive direction (the first direction at step S15 and the positive direction at step S20), the control unit 45 determines the motion mode of the robot 20 or 30 to be the end effector system in the X direction, and determines the motion direction in this motion mode to be the positive direction. In addition, when determined that the operating direction of the drag operation is the first direction (in this case, the X direction) and the negative direction (the first direction at step S15 and the negative direction at step S20), the control unit 45 determines the motion mode of the robot 20 or 30 to be the end effector system in the X direction, and determines the motion direction in this motion mode to be the negative direction.

In a similar manner, when determined that the operating direction of the drag operation is the second direction (in this case, the Y direction) and the positive direction (the second direction at step S15 and the positive direction at step S20), the control unit 45 determines the motion mode of the robot 20 or 30 to be the end effector system in the Y direction, and determines the motion direction in this motion mode to be the positive direction. In addition, when determined that the operating direction of the drag operation is the second direction (in this case, the Y direction) and the negative direction (the second direction at step S15 and the negative direction at step S20), the control unit 45 determines the motion mode of the robot 20 or 30 to be the end effector system in the Y direction, and determines the motion direction in this motion mode to be the negative direction.

Next, at step S23, the control unit 45 performs a motion speed determining process. The motion speed determining process is a process in which the motion speed Vr of the robot 20 or 30 is determined based on the slide distance Ls of the drag operation. In this case, when the slide distance Ls of the drag operation is less than the first distance Ls1, the motion speed Vr of the robot 20 or 30 is set to the first motion speed Vr1 (0%). When the slide distance Ls of the drag operation is the first distance Ls1 or more and less than the second distance Ls2, the motion speed Vr of the robot 20 or 30 is set to the second motion speed Vr2 (25%).

When the slide distance Ls of the drag operation is the second distance Ls2 or more and less than the third distance Ls3, the motion speed Vr of the robot 20 or 30 is set to the third motion speed Vr3 (50%). When the slide distance Ls of the drag operation is the third distance Ls3 or more and less than the fourth distance Ls4, the motion speed Vr of the robot 20 or 30 is set to the fourth motion speed Vr4 (100%). According to the present embodiment, when the slide distance Ls becomes the fourth distance Ls4 or more, the control unit 45 determines that an operable range of the first speed graphics 61 is exceeded. The control unit 45 sets the motion speed Vr of the robot 20 or 30 to 0%, that is, stops the operation of the robot 20 or 30. However, this is not limited thereto. When the slide distance Ls becomes the fourth distance Ls4 or more, the control unit 45 may determine that the user intends to operate the robot 20 or 30 at the motion speed Vr4, and maintain the motion speed Vr of the robot 20 or 30 at the fourth motion speed Vr4.

Next, at step S24, the control unit 45 performs a motion command generating process. The control unit 45 generates a motion command for operating the robot 20 or 30 based on the motion mode of the robot 20 or 30 determined in the motion mode determining process (step S16 or S18), the motion direction of the robot 20 or 30 determined in the motion direction determining process (step S21 or S22), and the motion speed Vr of the robot 20 or 30 determined in the motion speed determining process (step S23). Then, at step S25, the control unit 45 transmits the motion command generated at step S24 to the controller 11. The controller 11 operates the robot 20 or 30 based on the motion command received from the teaching pendant 40.

Next, the control unit 45 performs step S26. The control unit 45 determines whether or not the operation is completed based on a detection result from the operation detecting unit 46. In this case, the completion of an operation refers to the finger 90 of the user or the like separating from the touch panel display 42. That is, the operation is not determined to be completed merely by the operating speed of the drag operation becoming zero. In addition, the operation is not determined to be completed by the slide distance Ls of the drag operation becoming zero, that is, the current position P1 of the drag operation being equal to the start position P0.

When the drag operation is continued (NO at step S26), the control unit 45 proceeds to step S13 in FIG. 4 and repeatedly performs steps S13 to S26. The processes at steps S13 to S26 are repeatedly performed every 0.5 seconds, for example. Therefore, no significant time delay occurs between the input of the drag operation and the motion of the robot 20 or 30. Consequently, the user can receive the impression that the robot 20 or 30 is being manually operated substantially in real-time. In this case, should the user stop the drag operation at a certain slide distance Ls, the user can continue the operation of the robot 20 or 30 at the motion speed Vr corresponding to the slide distance Ls. Then, when determined that the drag operation is completed based on the detection result from the operation detecting unit 46 (YES at step S26), the control unit 45 performs steps S27 and S28.

At step S27, the control unit 45 cancels, or in other words, resets the settings of the motion mode, the motion direction, and the motion speed Vr of the robot 20 or 30 determined in the above-described processes. As a result, the operation of the robot 20 or 30 is completed. At step S28, the control unit 45 deletes the direction graphics 51 and 52 from the touch panel display 42 by processes performed by the display control unit 48, and resets the display content on the screen. As a result, the series of processes is completed. Then, the control unit 45 returns to step S11 in FIG. 4 and performs the processes at steps S11 to S28 again. As a result, the user is able to perform manual operation in a new motion mode. That is, the user is able to change the motion mode and motion direction of the robot 20 or 30.

According to the present embodiment, the control unit 45 can perform the motion speed determining process by the processes performed by the motion command generating unit 47. In the motion speed determining process, the motion speed Vr of the robot 20 or 30 is determined based on the slide distance Ls of the drag operation detected by the operation detecting unit 46. Then, the control unit 45 can perform the speed graphics display process by the processes performed by the display control unit 48. In the speed graphics display process, the speed graphics 61 is displayed on the touch panel display 42. The speed graphics 61 is a graphics in which the slide distance Ls and the motion speed Vr of the robot 20 or 30 are correlated. The speed graphics 61 changes in aspect in accompaniment with the changes in slide distance Ls. That is, the aspect of the speed graphics 61 changes in accompaniment with the slide distance Ls of the drag operation becoming longer or shorter. In addition, because the slide distance Ls and the motion speed Vr of the robot 20 or 30 are correlated as shown in FIG. 10, the changes in the aspect of the speed graphics 61 are also correlated with the motion speed Vr of the robot 20 or 30.

That is, in the above-described configuration, when the drag operation is performed on the touch panel display 42, the motion speed Vr of the robot 20 or 30 is determined based on the slide distance Ls of the drag operation. As a result, the user can change the motion speed Vr of the robot 20 or 30 by adjusting the slide distance Ls of the drag operation. In addition, when the user adjusts the slide distance Ls of the drag operation to adjust the motion speed Vr of the robot 20 or 30, the aspect of the speed graphics 61 displayed on the touch panel display 42 changes in accompaniment with the changes in slide distance Ls of the drag operation.

The aspect of the speed graphics 61 is correlated with the motion speed Vr of the robot 20 or 30. Therefore, the user can easily intuitively determine the correlation between the drag operation performed by the user themselves and the motion speed Vr of the robot 20 or 30 performed as a result of the drag operation, by viewing the speed graphics 61 displayed on the touch panel display 42. That is, the user can visually recognize the current motion speed Vr of the robot 20 or 30 that is performed as a result of their drag operation by viewing the speed graphics 61 displayed on the touch panel display 42. As a result, intuitive operation becomes possible and the sense of operation of the user can be improved.

The control unit 45 can perform the motion direction determining process by the processes performed by the motion command generating unit 47. The motion direction determining process is a process in which a motion command for operating the robot 20 or 30 in the positive direction is generated when the operating direction of the drag operation is the positive direction with reference to the start position P0 of the drag operation, and a motion command for operating the robot 20 or 30 in the negative direction is generated when the operating direction of the drag operation is the negative direction that is a direction opposite the positive direction. As a result, the user can adjust the motion direction of the robot 20 or 30 to the positive direction or the negative direction by adjusting the operating direction of the drag operation to the positive direction or the negative direction with reference to the start position P0 of the drag operation.

That is, the drag operation is an operation in which the finger 90 of the user or the like is moved, that is, slid over the touch panel display 42. Therefore, the drag operation always includes the operating direction and the slide distance Ls. Here, in the teaching pendant 40 configured as described above, the motion speed Vr of the robot 20 or 30 can be determined by the slide distance Ls of the drag operation and the positive/negative of the motion direction of the robot 20 or 30 can be determined based on the positive/negative of the operating direction of the drag operation. As a result, the user can determine the motion speed Vr and the motion direction of the robot 20 or 30 by a single drag operation. Consequently, the user is no longer required to perform a separate operation to determine the motion direction of the robot 20 or 30. As a result, the hassle of performing operations can be reduced and operability is improved.

The speed graphics 61 has the first bar 62 and the slider 63. The first bar 62 is formed in a linear shape with the start position P0 of the drag operation as the base point, and is configured to indicate the correlation between the slide distance Ls and the motion speed Vr of the robot 20 or 30. The slider 63 is capable of moving along the first bar 62 in accompaniment with the drag operation and is configured to indicate the current position P1 of the drag operation on the first bar 62.

As a result, the user can perform the drag operation with a sensation of moving the slider 63 along the linear first bar 62. In this case, the first bar 62 is formed in a linear shape with the start position P0 of the drag operation as the base point. Therefore, the current position P1 of the slider 63 in relation to the first bar 62 is determined by the slide distance Ls of the drag operation. In addition, the first bar 62 indicates the correlation between the slide distance Ls of the drag operation and the motion speed Vr of the robot 20 or 30. Therefore, the position of the slider 63 in relation to the first bar 62 indicates the motion speed Vr of the robot 20 or 30 determined by the drag operation. Consequently, the user can visually recognize the motion speed of the robot 20 or 30 by recognizing the positional relationship between the slider 63 and the first bar 62 when performing the drag operation. Therefore, the user is provided with a rough indication of the slide distance Ls when performing the drag operation, and as a result, operability is further improved.

The control unit 45 can perform the motion mode determining process by the processes performed by the motion command generating unit 47. The motion mode determining process is a process in which the motion mode of the robot 20 or 30 is determined to be the first motion mode when the operating direction of the drag operation detected by the operation detecting unit 46 is the first direction, and the motion mode of the robot 20 or 30 is determined to be the second motion mode when the operating direction of the drag operation is the second direction. Consequently, the user can perform manual operation regarding two motion modes of the robot 20 or 30 by selectively using the drag operations in the first direction and the second direction. Therefore, an operation for selecting the motion mode of the robot 20 or 30 can be eliminated. As a result, the hassle of performing operations is reduced and operability is improved.

The control unit 45 can perform the direction graphics display process by the processes performed by the display control unit 48. The direction graphics display process is a process in which, when the operation detecting unit 46 detects a touch operation, the first direction graphics 51 indicating the first direction and the second direction graphics 52 indicating the second direction are displayed on the touch panel display 42. As a result, when the user performs a touch operation on the touch panel display 42 to perform a drag operation, the first direction graphics 51 indicating the first direction and the second direction graphics 52 indicating the second direction are displayed on the touch panel display 42. Consequently, the user can easily determine the direction in which to perform the drag operation by viewing the first direction graphics and the second direction graphics on the touch panel display, before starting the drag operation. As a result, operability is further improved.

In addition, the first direction and the second direction are perpendicular to each other. The direction graphics display process includes a process in which the first direction graphics 51 and the second direction graphics 52 are displayed on the touch panel display 42 such as to be perpendicular to each other. In this case, the angle formed by the first direction and the second direction is a right angle, which is the largest angle within the range of angles that can be formed by the first direction and the second direction. Therefore, the user can easily perform operations while differentiating between the drag operation in the first direction along the first direction graphics 51 and the drag operation in the second direction along the second direction graphics 52. Consequently, situations in which the user performs an operation in which the operating direction of the drag operation is erroneous, or the drag operation is in a direction unintended by the user can be reduced. As a result, erroneous operation of the drag operation is reduced, and further improvement in operability and improvement in safety are achieved.

The speed graphics 61 is set such that the motion speed Vr of the robot 20 or 30 increases in stages in proportion to the slide distance Ls of the drag operation. That is, for example, a user with low proficiency in manual operation has difficulty in accurately setting the slide distance Ls of the drag operation as aimed. For example, when the slide distance Ls of the drag operation is directly reflected in the motion speed Vr of the robot 20 or 30, should the slide distance Ls of the drag operation even slightly deviate from that intended by the user, the motion speed Vr of the robot 20 or 30 will also deviate from that intended by the user.

In this regard, in the teaching pendant 40 configured as described above, the motion speed Vr of the robot 20 or 30 increases in stages in proportion to the slide distance Ls of the drag operation. That is, when the user wishes to operate the robot 20 or 30 at a certain motion speed Vr, the user is merely required to perform the drag operation over the slide distance Ls of a range corresponding to the motion speed Vr. That is, a certain extent of error is allowed in the slide distance Ls of the drag operation by the user. As a result, even should the slide distance Ls of the drag operation slightly deviate from that intended by the user, the deviation of the motion speed Vr of the robot 20 or 30 from that intended by the user can be reduced. The robot 20 or 30 can more easily be operated at the motion speed aimed for by the user. As a result, even a user with low proficiency, for example, can stably perform manual operation of the robot 20 or 30.

In addition, as a result of the robot operation program according to the present embodiment being run on, for example, a general-purpose tablet PC, a smartphone, or the like that is provided with a touch panel display, functions equivalent to those of the above-described teaching pendant 40 can be added to the general-purpose tablet PC, smartphone, or the like.

Figure 12:
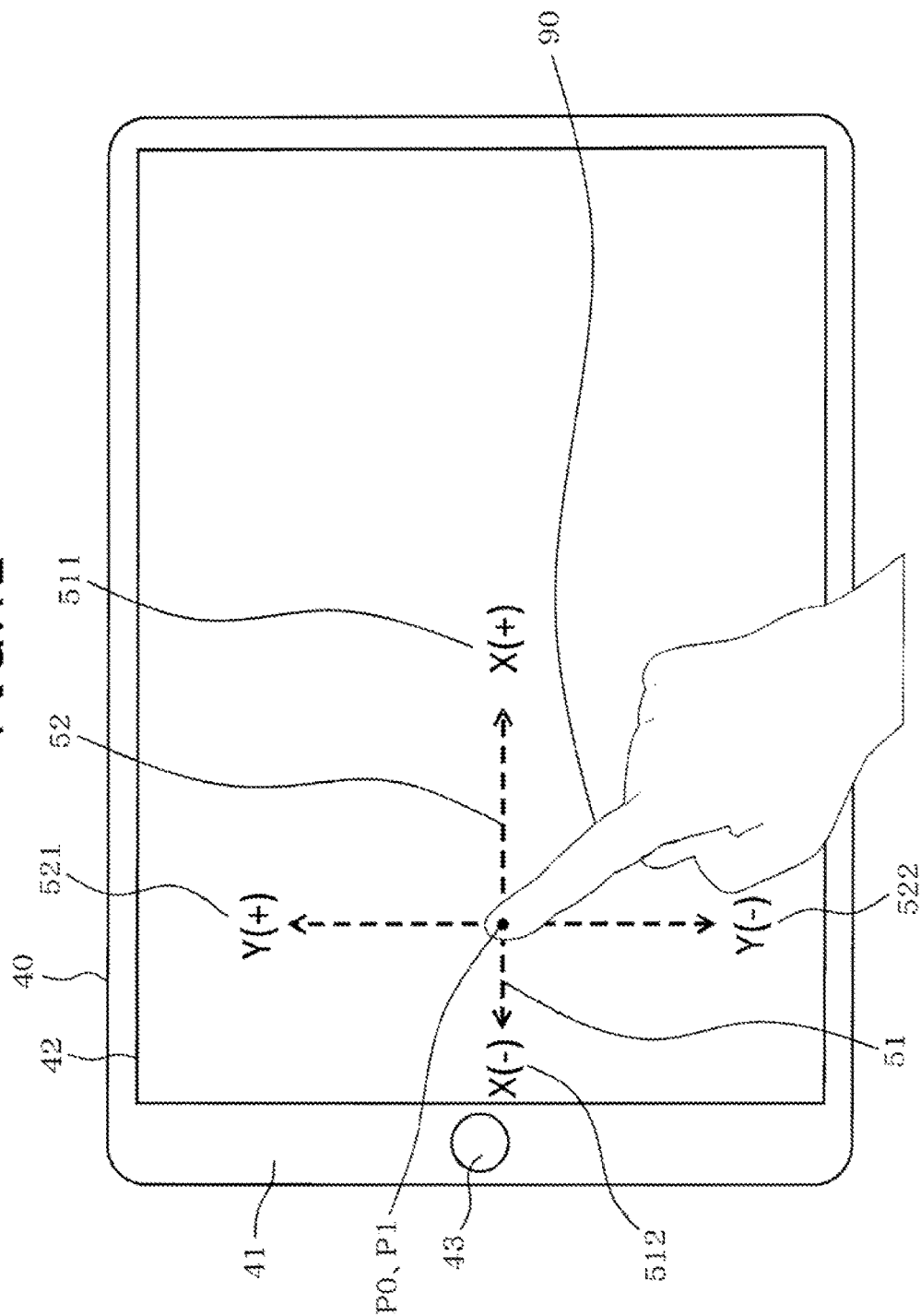
FIG. 12 is a diagram of an example of a direction graphics that is displayed on the touch panel display when a touch operation is performed near an end of the touch panel display, according to the first embodiment.
Figure 13:
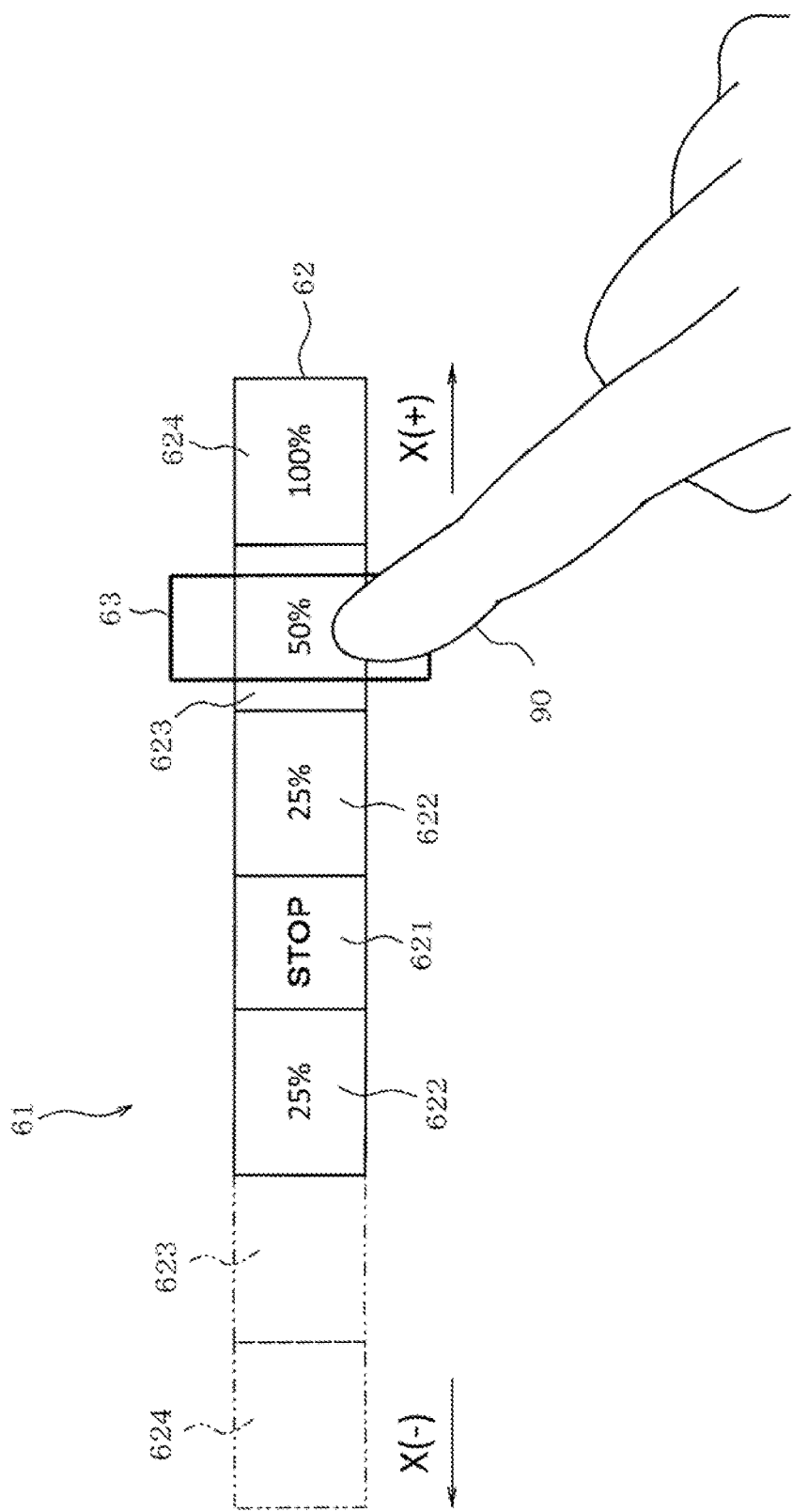
FIG. 13 is a diagram (1) of an example of details of a speed graphics in FIG. 12, according to the first embodiment.

In the direction graphics display process at step S12 in FIG. 4, as shown in FIG. 12, for example, the touch position P0 of the drag operation may be near an end of the screen of the touch panel display 42. In this case, the overall direction graphics 51 and 52 and speed graphics 61 do not fit within the screen of the touch panel display 42. Therefore, when the overall direction graphics 51 and 52 and speed graphics 61 do not fit within the screen of the touch panel display 42, the control unit 45 displays only the portion of the overall direction graphics 51 and 52 and speed graphics 61 that fits within the screen by processes performed by the display control unit 48. In this case, of the overall direction graphics 51 and 52 and speed graphics 61, the portion running off the screen of the touch panel display 42 is not displayed. For example, as shown in FIG. 13, in the first speed graphics 61, when a portion indicated by two-dot chain lines on the negative-direction side of the first bar 62, or in this case, the third area 623 and the fourth area 624 run off the screen of the touch panel display 42, the third area 623 and the fourth area 624 on the negative-direction side that runs off-screen are not displayed.

Figure 14:
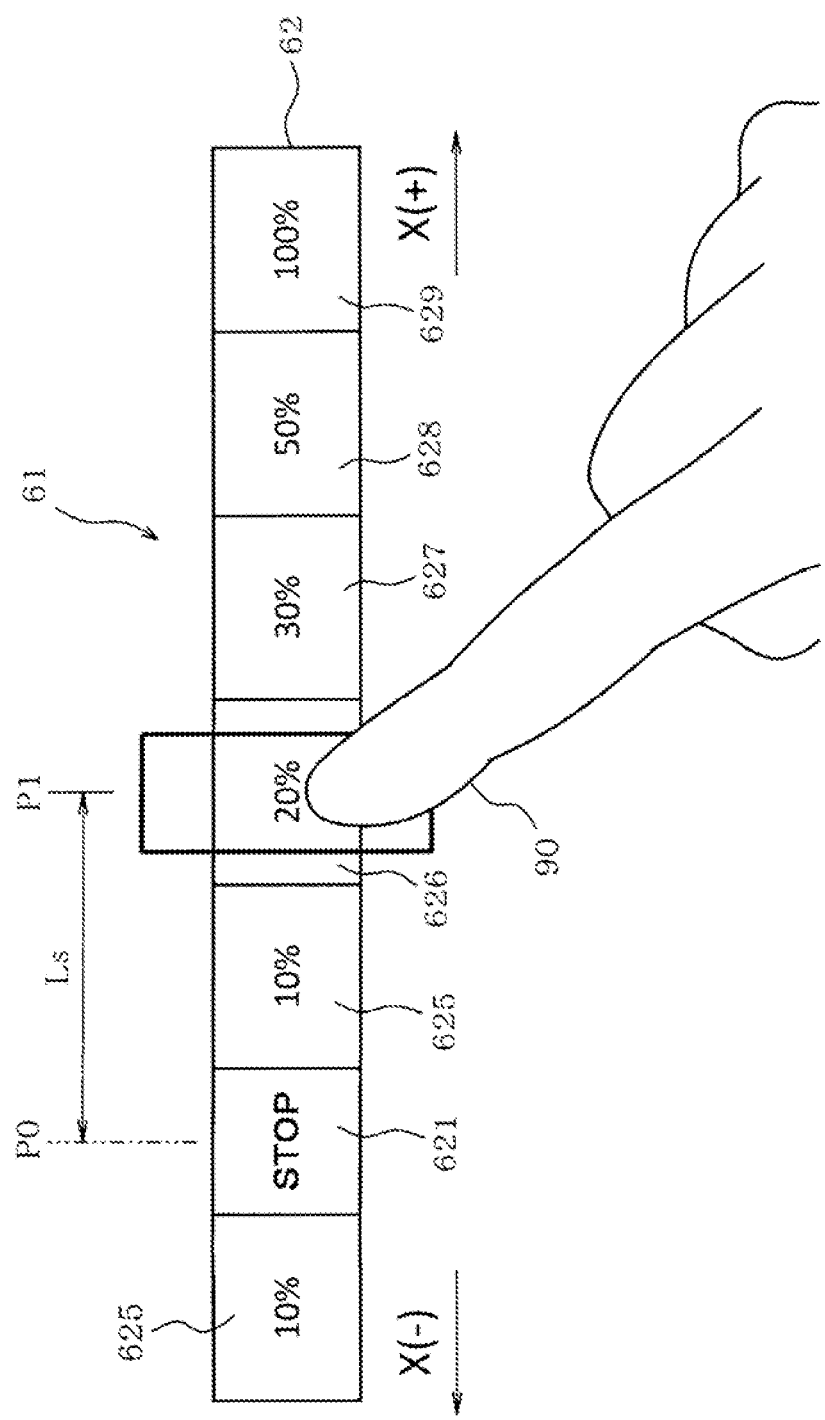
FIG. 14 is a diagram (2) of an example of details of the speed graphics in FIG. 12, according to the first embodiment.

In addition, for example, as shown in FIG. 12, when the touch position P0 by the touch operation is near one end side of the touch panel display 42, the control unit 45 may change the display aspect of the speed graphics 61 as shown in FIG. 14. In this case, the first bar 62 of the speed graphics 61 is shortened on one side in relation to the touch position P0, that is, the base point P0, and lengthened on the other side. In FIG. 12, the touch position P0 by the touch operation is near the end side in the negative direction on the first bar 62 of the first speed graphics 61. In this case, as shown in FIG. 14, the first bar 62 is shortened on the negative-direction side and lengthened on the positive-direction side, in relation to the base point P0. Then, the control unit 45 reconfigures each area such as to reduce the number of areas on the shorter side of the first bar 62 and increase the number of areas on the longer side.

For example, in FIG. 14, the negative-direction side of the first bar 62 is reconfigured to have an area that is only a fifth area 625 (10%), that is, a single area. Meanwhile, the positive-direction side of the first bar 62 is reconfigured to have areas that are the fifth area 625 (10%), a sixth area 626 (20%), a seventh area 627 (30%), an eighth area 628 (50%), and a ninth area 629 (100%), that is, five areas. New motion speeds Vr of the robot 20 or 30 are assigned to the slide distances Ls of the reconfigured areas 625 to 629.

As a result, when the touch position P0 by the touch operation is near one end side of the touch panel display 42, the choices for the motion speed Vr on the other end side opposite the one end increase. That is, as a result, when the user wishes to more finely adjust the motion speed Vr in a certain direction, the user positions the operating position P0 of the touch operation at a portion towards the side opposite the certain direction. Consequently, the number of assigned motion speeds Vr of the robot 20 or 30 in the certain direction increases. Therefore, the user can more finely adjust the motion speed Vr in this certain direction, and as a result, convenience is improved.

In addition, according to the above-described embodiment, the user can operate the robot 20 or 30 by performing touch operations and drag operations on the touch panel display 42. Consequently, compared to when physical operating keys are operated, the user can more intuitively and more easily perform manual operation. Furthermore, consequently, physical operating keys for manual operation, for example, can be eliminated. As a result, effects can be expected such as actualization of reduced size of the teaching pendant 40, increased screen size of the touch panel display 42, and reduced cost.

Figure 15:
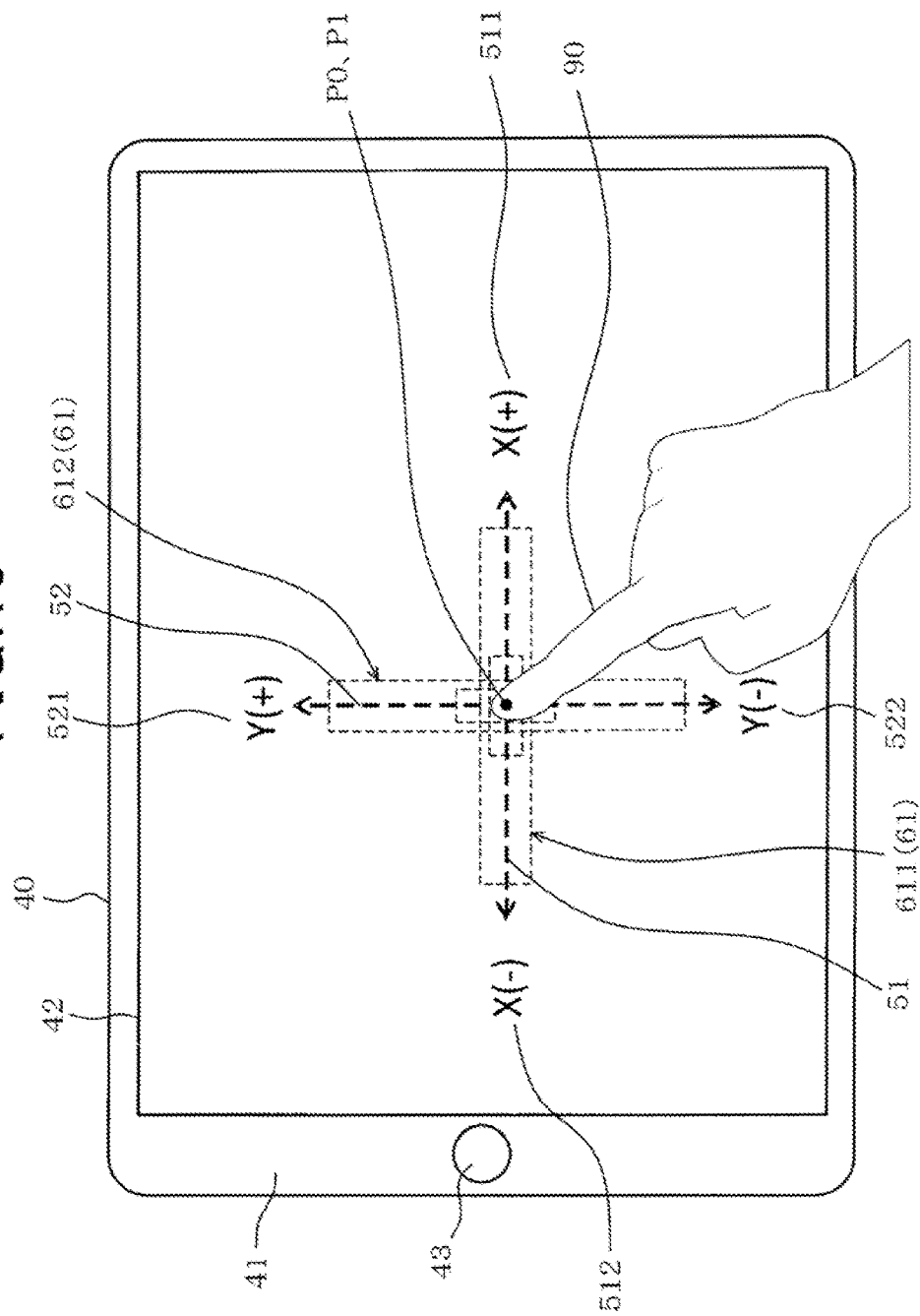
FIG. 15 is a diagram of an example of when the first direction graphics and the second direction graphics are displayed on the touch panel display in a variation example.
Figure 16:
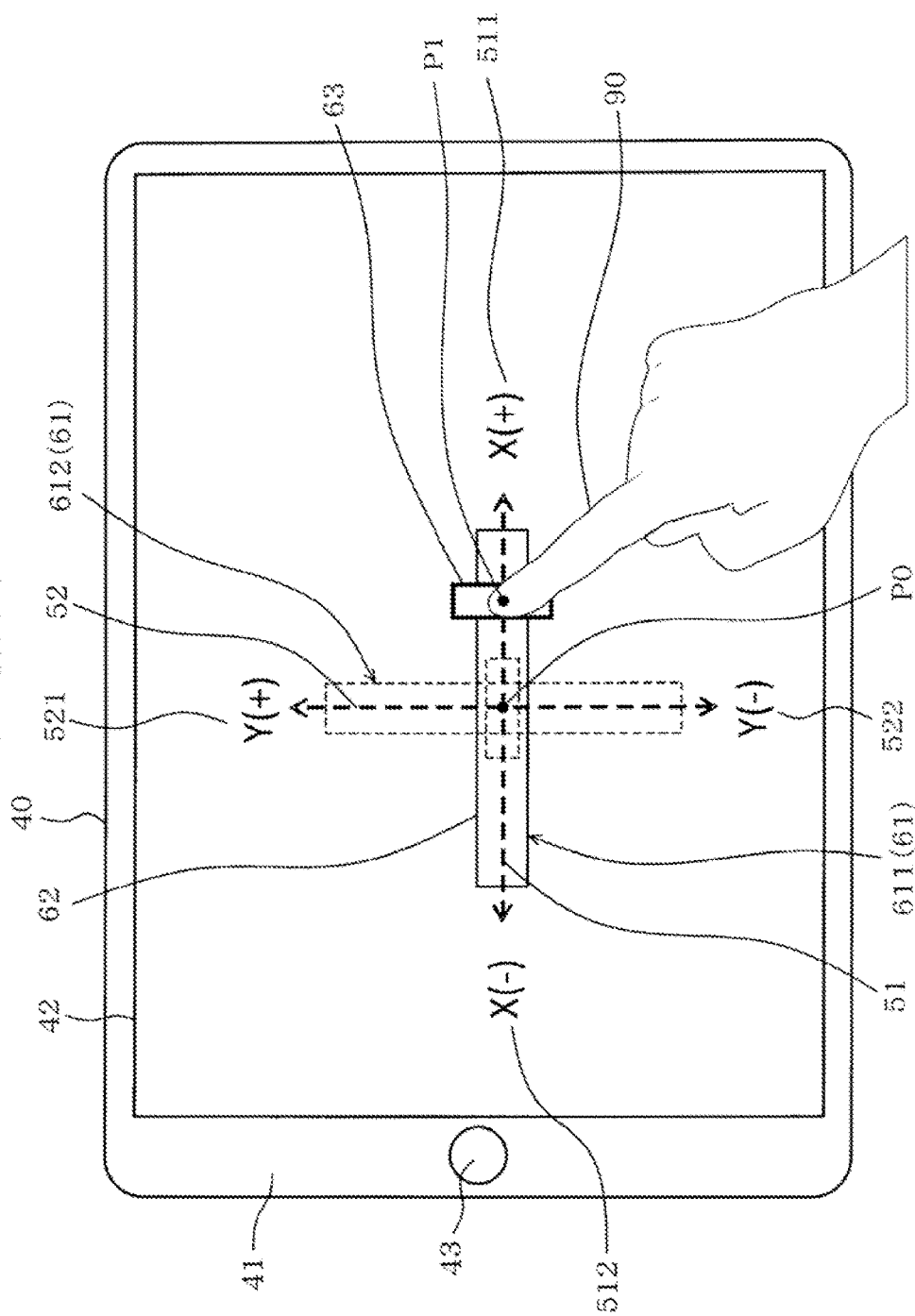
FIG. 16 is a diagram of an example of when the first speed graphics is displayed on the touch panel display in the variation example.
Figure 17:
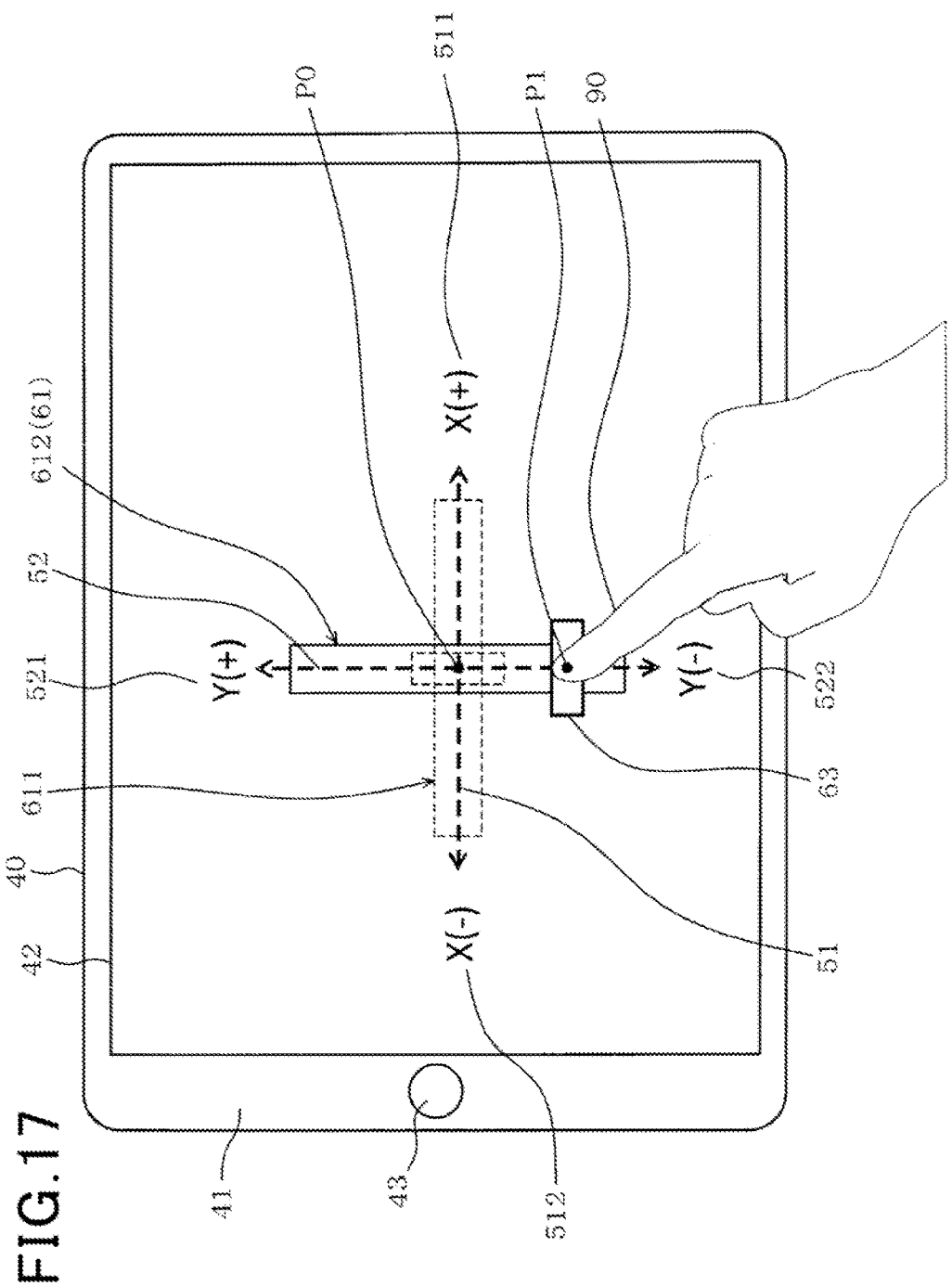
FIG. 17 is a diagram of an example of when the second speed graphics is displayed on the touch panel display in the variation example.

The above-described embodiment can be modified as follows, for example. That is, at step S12 in FIG. 4, as shown in FIG. 15, for example, the control unit 45 displays the direction graphics 51 and 52 on the touch panel display 42 and also lightly displays both first speed graphics 611 and 612 as an initial state. Then, as shown in FIG. 16 and FIG. 17, the first speed graphics 611 or 612 corresponding to the operating direction of the drag operation is darkly displayed based on the input of the drag operation. As a result, the user can more easily imagine the manner of operation to be performed by viewing the first speed graphics 611 and 612 that are lightly displayed, before performing the drag operation. As a result, operability is improved.

Figure 18:
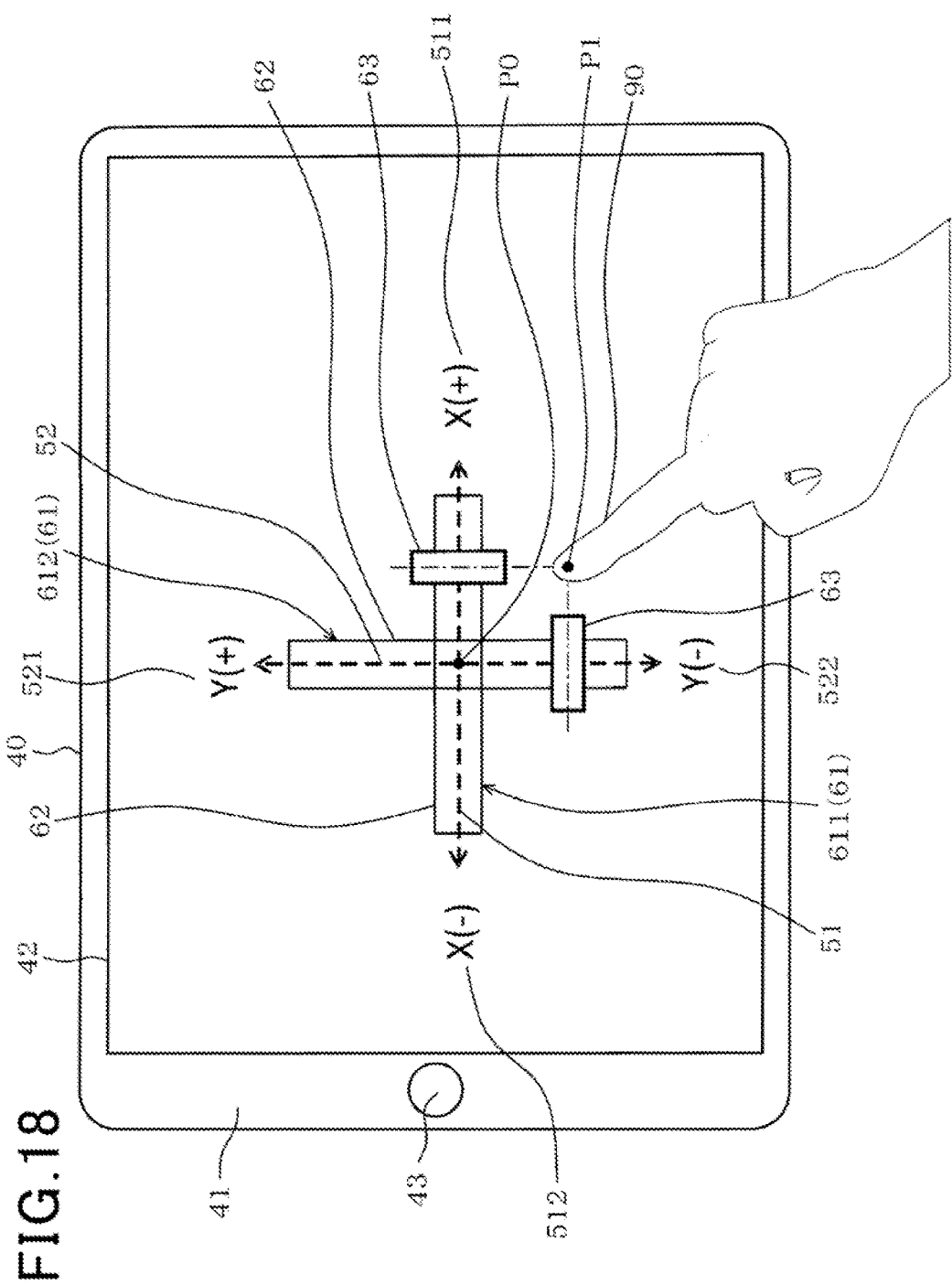
FIG. 18 is a diagram of when the first direction and the second direction are simultaneously operated, in the variation example.

In addition, as shown in FIG. 18, for example, the control unit 45 may simultaneously recognize and process a drag operation in the first direction and a drag operation in the second direction. As a result, for example, the user can perform simultaneous operations in the X direction and the Y direction, that is, an operation in the X-Y plane direction. Convenience is further improved.

Figure 19:
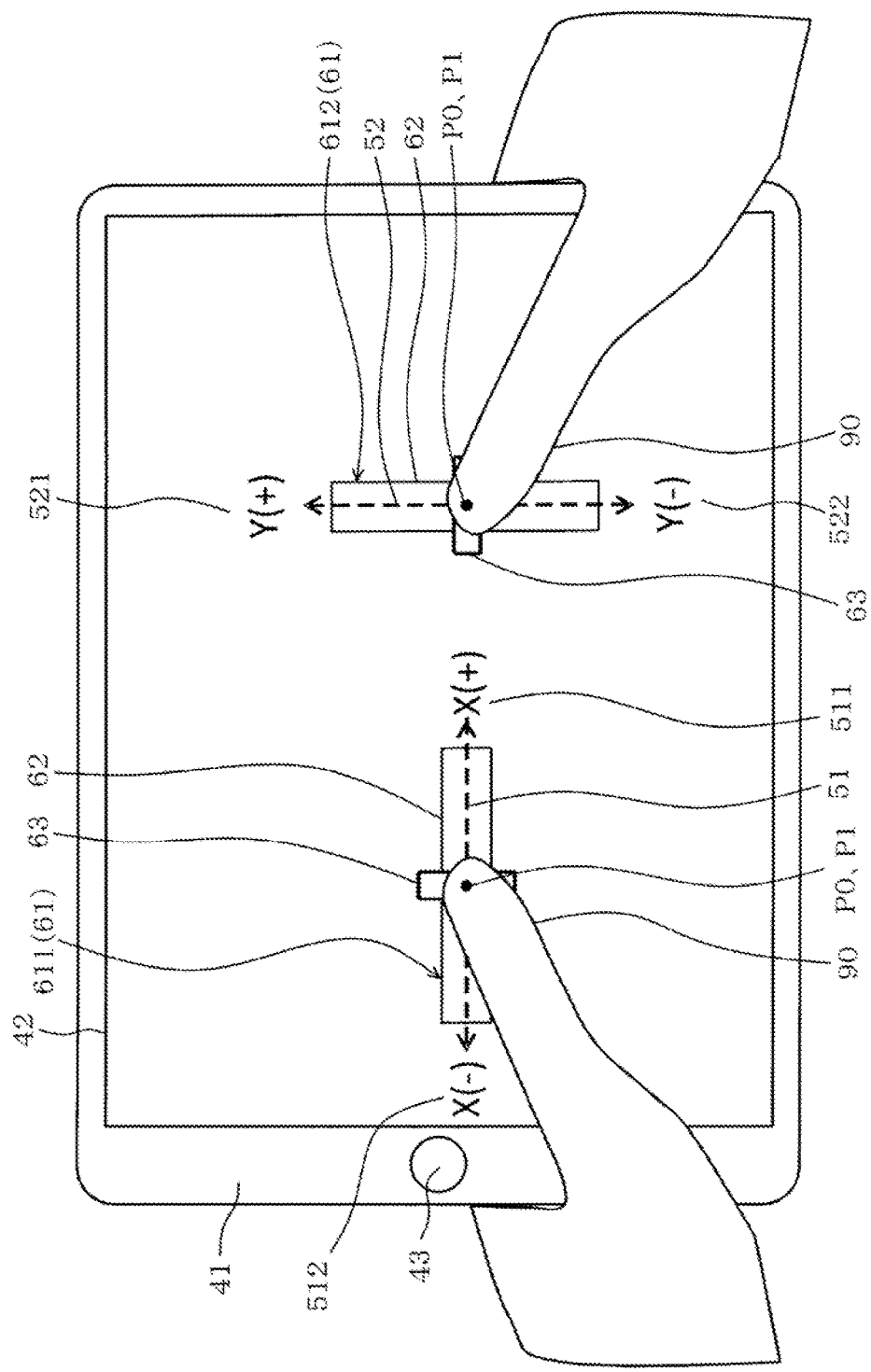
FIG. 19 is a diagram of an example of when the first speed graphics and the second speed graphics are displayed in a separated manner on the touch panel display, in the variation example.

In addition, as shown in FIG. 19, for example, the control unit 45 may separately display the first display graphics 51 and the first speed graphics 611 along the first direction, and the second direction graphics 52 and the first speed graphics 612 along the second direction, so as not to overlap. As a result, for example, the user can perform operation with both hands. Therefore, convenience is further improved.

Second Embodiment

Figure 20:
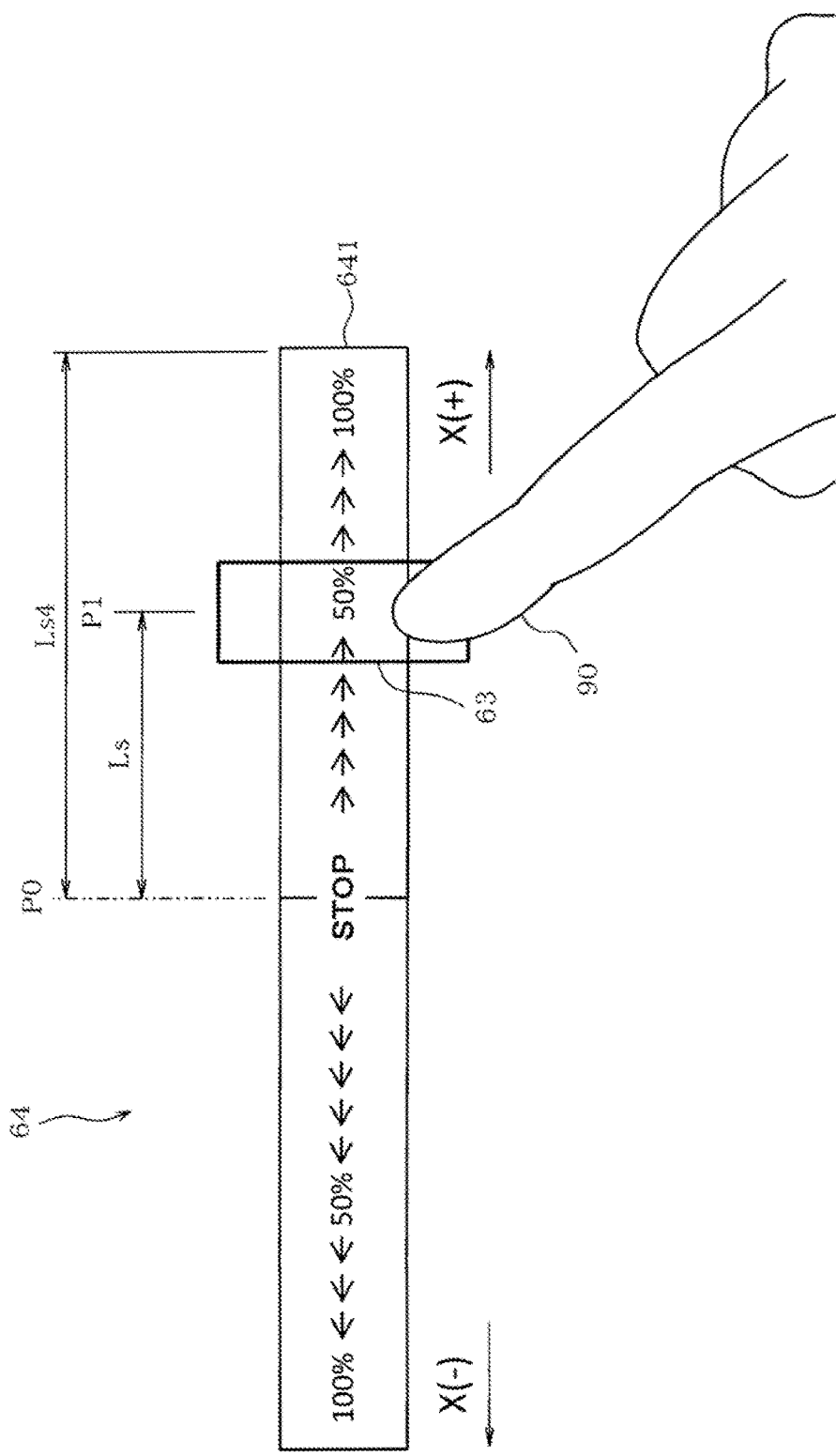
FIG. 20 is a diagram of an example of details of a speed graphics according to a second embodiment.
Figure 21:
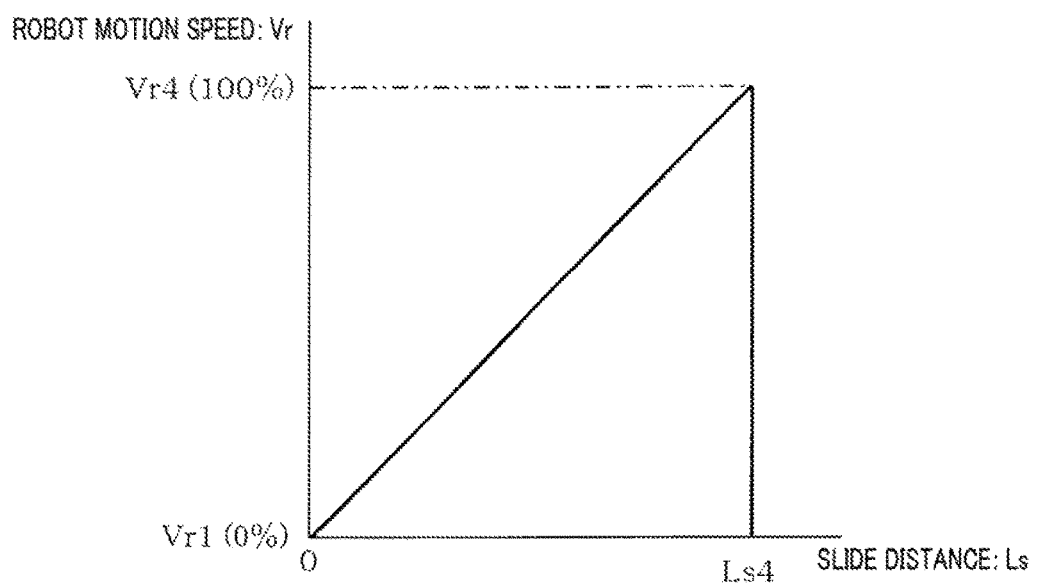
FIG. 21 is a diagram of an example of a correlation between a slide distance of a drag operation and a motion speed of a robot, according to the second embodiment.

Next, a second embodiment will be described with reference to FIG. 20 and FIG. 21. According to the present embodiment, the control unit 45 displays a second speed graphics shown in FIG. 20, instead of the first speed graphics 61 according to the first embodiment, on the touch panel display 42, by processes performed by the display control unit 48. The second speed graphics 64 is an example of the speed graphics. The second speed graphics 64 differs from the speed graphics 61 according to the above-described first embodiment in terms of the correspondence between the slide distance Ls of the drag operation and the motion speed Vr of the robot 20 or 30.

According to the present embodiment, the motion speed determining process is a process in which the motion speed Vr of the robot 20 or 30 is continuously increased in proportion to the slide distance Ls of the drag operation. That is, the second speed graphics 64 has a second bar 641. The second bar 641 is set such that the motion speed Vr of the robot 20 or 30 continuously increases in proportion to the slide distance Ls. According to the present embodiment, the correlation between the slide distance Ls and the motion speed Vr of the robot 20 or 30 is as shown in FIG. 21. The motion speed Vr of the robot 20 or 30 increases continuously, or in this case, by a linear function, in proportion to the increase in slide distance Ls.

Here, for example, a user with high proficiency in manual operation can set the slide distance Ls of the drag operation to that which is aimed for, with relative ease. Conversely, when fine adjustment of the robot 20 or 30 is performed, it is inconvenient unless the slide distance Ls of the drag operation by the user is accurately reflected in the motion speed Vr of the robot 20 or 30. In this regard, in the teaching pendant 40 according to the present embodiment, the motion speed Vr of the robot 20 or 30 continuously increases in proportion to the slide distance Ls of the drag operation. That is, the continuous changes in slide distance Ls of the drag operation are reflected in the motion speed Vr of the robot 20 or 30 as continuous changes. Therefore, the user can directly reflect the changes in slide distance Ls of the drag operation in the motion speed Vr of the robot 20 or 30. As a result, for example, a user with high proficiency can perform a more accurate fine adjustment of the robot 20 or 30, and therefore, convenience is improved.

Third Embodiment

Next, a third embodiment will be described with reference to FIG. 22 and FIG. 23. According to the present embodiment, the control unit 45 displays a third speed graphics 65 shown in FIG. 22, instead of the speed graphics 61 and 64 according to the above-described embodiments, on the touch panel display 42 by processes performed by the display control unit 48. The third speed graphics 65 is an example of the speed graphics. The third speed graphics 65 differs from the speed graphics 61 and 64 according to the above-described embodiments in terms of the correspondence between the slide distance Ls of the drag operation and the motion speed Vr of the robot 20 or 30.

According to the present embodiment, the motion speed determining process includes a process in which the motion speed Vr of the robot 20 or 30 is continuously increased in proportion to the slide distance Ls of the drag operation, within a range in which the slide distance Ls is zero or more and less than Ls5. In addition, the motion speed determining process includes a process in which the motion speed Vr of the robot 20 or 30 is increased in stages in proportion to the slide distance Ls of the drag operation, when the slide distance Ls becomes a predetermined distance, or in this case, Ls5 or more.

That is, when the slide distance Ls of the drag operation is less than a fifth distance Ls5, the motion speed Vr of the robot 20 or 30 is set to a value proportional to the slide distance Ls, within the range Vr1 (0%) to Vr2 (25%). When the slide distance Ls is the fifth distance Ls5 or more and less than a sixth distance Ls6, the motion speed Vr of the robot 20 or 30 is set to the third motion speed Vr3 (50%). When the slide distance Ls is the sixth distance Ls6 or more and less than a seventh distance Ls7, the motion speed Vr of the robot 20 or 30 is set to the fourth motion speed Vr4 (100%).

In this case as well, when the slide distance Ls becomes the seventh distance Ls7 or more, the control unit 45 determines that the operable range of the third speed graphics 65 is exceeded. The control unit 45 sets the motion speed Vr of the robot 20 or 30 to 0%, that is, stops the operation of the robot 20 or 30. When the slide distance Ls becomes the seventh distance Ls7 or more, the control unit 45 may maintain the motion speed Vr of the robot 20 or 30 at the fourth motion speed Vr4 (100%).

Figure 22:
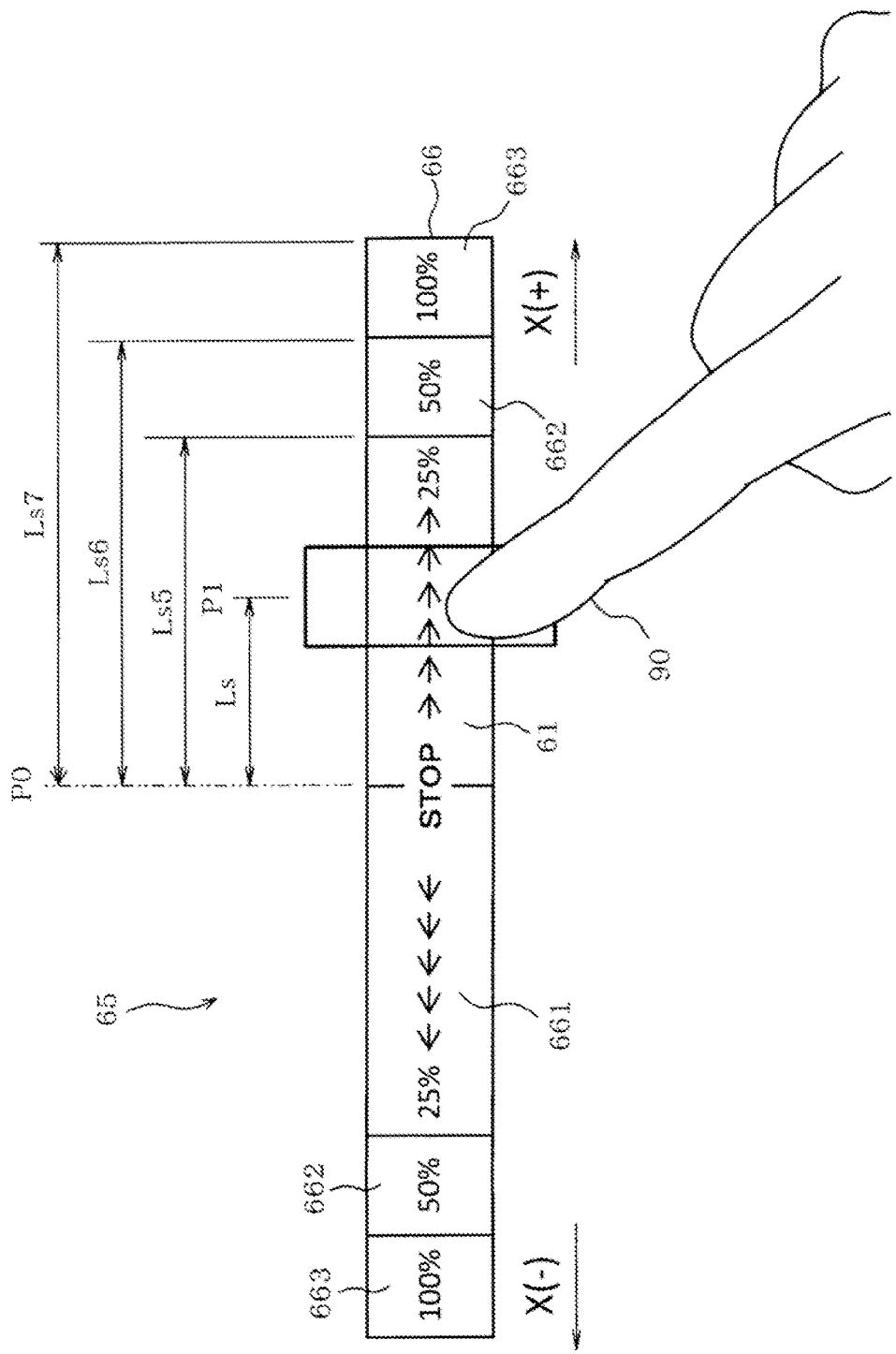
FIG. 22 is a diagram of an example of details of a speed graphics according to a third embodiment.
Figure 23:
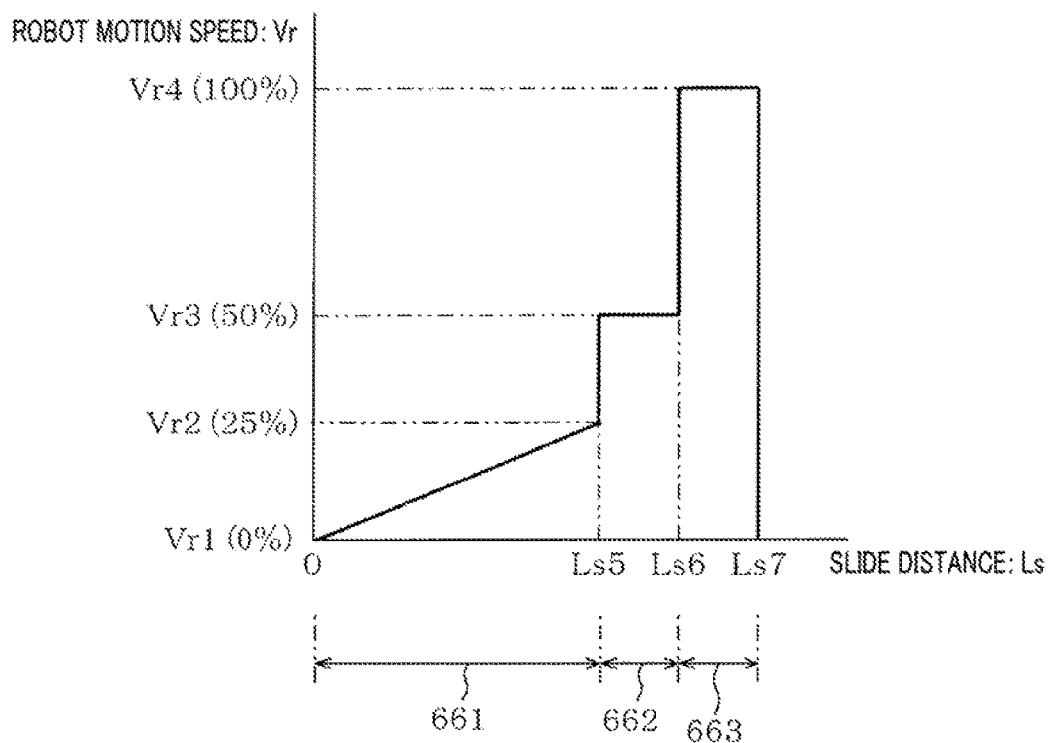
FIG. 23 is a diagram of an example of a correlation between a slide distance of a drag operation and a motion speed of a robot, according to the third embodiment.

As shown in FIG. 22, a third bar 66 of the third speed graphics has an eleventh area 661, a twelfth area 662, and a thirteenth area 663. Of the overall third bar 66, the eleventh area 661 is an area that is less than the fifth distance Ls5 on both the positive and negative side, with the start position P0 of the drag operation as the base point. Of the overall third bar 66, the twelfth area 662 is an area that is the fifth distance Ls5 or more and less than the sixth distance Ls6 on both the positive and negative side, with the start position P0 of the drag operation as the base point. Of the overall third bar 66, the thirteenth area 663 is an area that is the sixth distance Ls6 or more and less than the seventh distance Ls7 on both the positive and negative side, with the start position P0 of the drag operation as the base point.

The eleventh area 661 is assigned to values from the first motion speed Vr1 (Q %) to the second motion speed Vr2 (25%). The twelfth area 662 is assigned to the third motion speed Vr3 (50%). The thirteenth area 663 is assigned to the fourth motion speed Vr4 (100%). The correlation between the slide distance Ls on the third bar 66 in this case and the motion speed Vr of the robot 20 or 30 is as shown in FIG. 23.

As a result, working effects similar to those according to the above-described first embodiment and second embodiment are achieved. That is, the user can perform continuous adjustment of the motion speed Vr and adjustment of the motion speed Vr in stages by a single drag operation, without performing a switching operation or the like. Therefore, the hassle involved in operation can be reduced. As a result, operability is improved.

Here, as a situation in which the robot 20 or 30 is operated at a relatively slow motion speed Vr (such as Vr<25%), a situation is presumed in which fine adjustment of the end effector position of the robot 20 or 30 is performed. In this case, even slight changes in the end effector position of the robot 20 or 30 become important. Therefore, the motion speed Vr of the robot 20 or 30 is preferably able to be finely adjusted. Meanwhile, as a situation in which the robot 20 or 30 is operated at a relatively fast motion speed Vr (such as Vr 50%), a situation is presumed in which rough adjustment of the end effector position of the robot 20 or 30 is performed. In this case, slight changes in the end effector position of the robot 20 or 30 are not very important. Therefore, in situations in which the robot 20 or 30 is operated at a relatively fast motion speed Vr, the need for fine adjustment of the motion speed Vr is relatively low.

Rather, when the motion speed Vr is to be continuously changed in proportion to the slide distance Ls of the drag operation over the overall range of the motion speed Vr, a long slide distance Ls is required to be secured. In this case, the third bar 66 of the third speed graphics 65 becomes long and may not fit within the screen of the touch panel display 42. In addition, in this case, the user is required to increase the slide distance Ls of the drag operation to increase the motion speed Vr of the robot 20 or 30. This is inconvenient. Meanwhile, when the overall third bar 66 is reduced in size without changing the range of adjustment of the motion speed Vr, a slight effect of the slide distance Ls has a significant effect on the motion speed Vr of the robot 20 or 30. Operability may decrease.

Therefore, according to the present embodiment, for a range up to a relatively slow, predetermined motion speed Vr, or in this case, the second motion speed Vr2 (25%), the control unit 45 continuously increases the motion speed Vr of the robot 20 or 30 in proportion to the slide distance Ls of the drag operation. Meanwhile, for a range exceeding the predetermined motion speed Vr, the control unit 25 increases the motion speed Vr of the robot 20 or 30 in stages in proportion to the slide distance Ls of the drag operation.

As a result, within the range of the relatively slow motion speed Vr, the user can finely adjust the motion speed Vr by performing adjustment such as to continuously change the slide distance Ls of the drag operation. Meanwhile, regarding relatively fast motion speeds Vr, the user can perform operations without requiring a long slide distance Ls. In addition, because the area of the first bar 62 corresponding to the relatively fast motion speeds Vr can be shortened, the third bar 66 can be displayed within the screen of the touch panel display 42 without being reduced in size. As a result, operability can be further improved.

Fourth Embodiment

Figure 24:
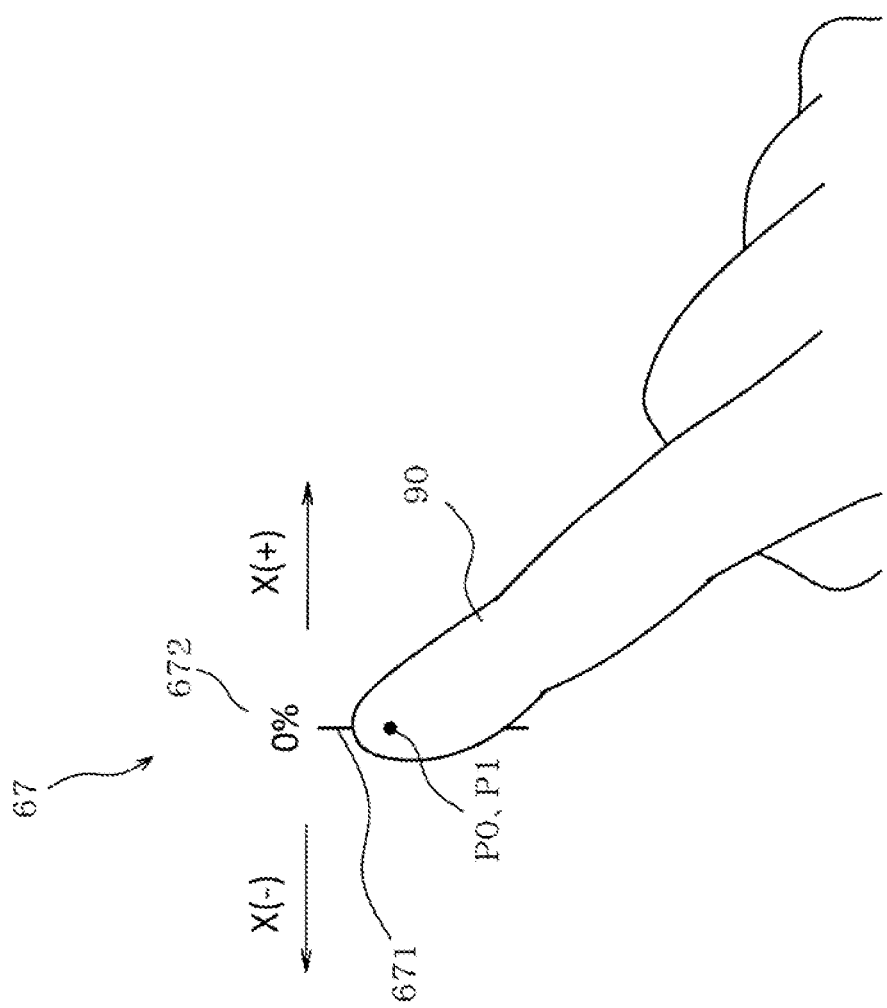
FIG. 24 is a diagram (1) of an example of details of a speed graphics according to a fourth embodiment.
Figure 25:
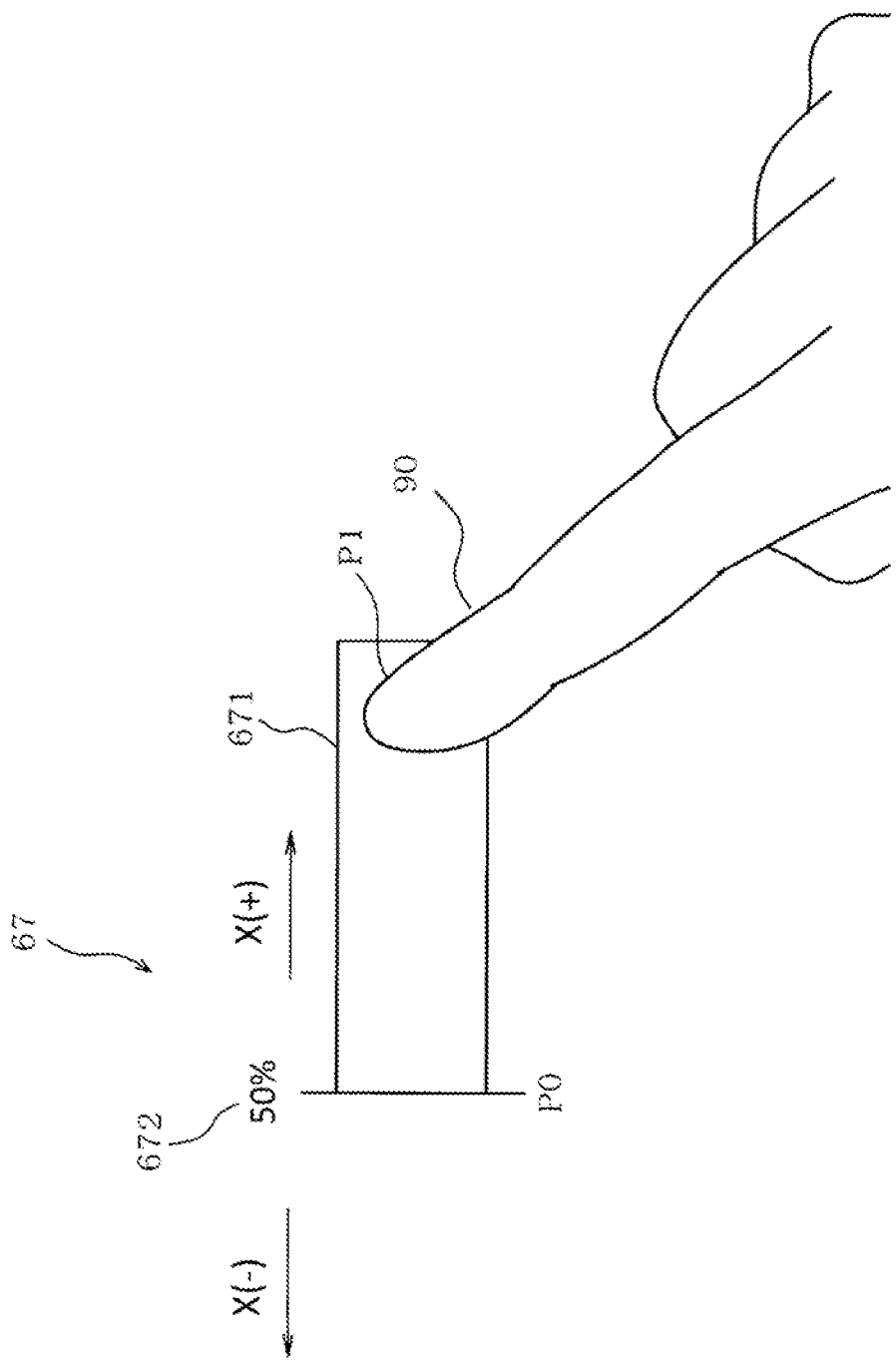
FIG. 25 is a diagram (2) of an example of the details of the speed graphics according to the fourth embodiment.

Next, a fourth embodiment will be described with reference to FIG. 24 and FIG. 25. According to the present embodiment, the control unit 45 displays a fourth speed graphics 67 shown in FIG. 24 and FIG. 25, instead of the speed graphics 61, 64, and 65 according to the above-described embodiments, on the touch panel display 42 by processes performed by the display control unit 48. The fourth speed graphics 67 is that which linearly extends and contracts based on the slide distance Ls, with the start position P0 of the drag operation as the base point.

Specifically, the fourth speed graphics 67 has an extending/contracting bar 671 and a speed display 672. As shown in FIG. 24 and FIG. 25, the extending/contracting bar 671 extends and contracts based on the slide distance Ls of the drag operation. The speed display 672 is a display that indicates the motion speed Vr of the robot 20 or 30 corresponding to the current slide distance Ls. For example, as shown in FIG. 24, when the slide distance Ls of the drag operation is zero, the extending/contracting bar 671 is displayed in the shape of a single, narrow bar. In this case, the speed display 672 is "0%" that indicates that the robot 20 or 30 is zero. Meanwhile, for example, as shown in FIG. 25, when the drag operation is performed and the slide distance Ls increases, the extending/contracting bar 671 changes to a length based on the slide distance Ls. The speed display 672 becomes the motion speed Vr, such as "50%," of the robot 20 or 30 determined based on the slide operation Ls.

In this way, the extending/contracting bar 671 of the fourth speed graphics 67 extends as the slide distance Ls of the drag operation becomes longer, and contracts as the slide distance Ls becomes shorter. In addition, the motion speed Vr of the robot 20 or 30 becomes faster as the slide distance Ls becomes longer, and the motion speed Vr of the robot 20 or 30 becomes slower as the slide distance Ls becomes shorter. Therefore, the length of the extending/contracting bar 671 and the motion speed Vr of the robot 20 or 30 are correlated. In this case, the correlation between the slide distance Ls and the length the extending/contracting bar 671, and the motion speed Vr of the robot 20 or 30 may be either intermittent or continuous, as described above.

As a result, the user can confirm the current motion speed Vr of the robot 20 or 30 by viewing the current length of the extending/contracting bar 671 of the fourth speed graphics 67. Therefore, the user can more easily visually recognize the motion speed Vr of the robot 20 or 30 that is performed by their drag operation. In addition, for example, when the user wishes to increase the motion speed Vr of the robot 20 or 30, the user can perform the operation with a sense of extending the extending/contracting bar 671 by the drag operation. Meanwhile, when the user wishes to reduce the motion speed Vr of the robot 20 or 30, the user can perform the operation with a sense of contracting the extending/contracting bar 671 by the drag operation. In this case, the extending and contracting of the extending/contracting bar 671, that is, the increase and decrease in length of the extending/contracting bar 671 and the increase and decrease in the motion speed Vr of the robot 20 or 30 are identical in terms of a certain physical quantity (in this case, length or speed) being increased and decreased. Therefore, the impression of correlation is easily received. As a result, intuitive operation becomes possible, and the sense of operation felt by the user can be improved.

Furthermore, the extending/contracting bar 671 of the fourth speed graphics 67 extends as the slide distance Ls of the drag operation increases. That is, at the start of input of the drag operation, the overall extending/contracting bar 671, that is, a fully extended state is not displayed. In this case, when the overall first bar 62 is displayed in advance at the start of input of the drag operation, as in the first speed graphics 61 shown in FIG. 10, for example, the user can more easily recognize the operating direction of the drag operation by viewing the direction in which the first bar 62 is extending. That is, in a speed graphics of which the bar does not extend and contract, a guidance effect of guiding the operating direction of the drag operation by the user is achieved.

Meanwhile, when the speed graphics is configured by the extending/contracting bar 671 that is capable of extending and contracting, as according to the present embodiment, and the overall fourth speed graphics 67 is not displayed at the start of input of the drag operation, the guidance effect for the drag operation of the fourth operation graphics 67 is reduced. As a result, the intention of the user to increase the slide distance Ls in stages or with relative slowness, based on the extending/contracting bar 671 that extends and contracts in accompaniment with the drag operation, is facilitated. Therefore, the user suddenly inputting a large drag operation can be suppressed. Sudden acceleration of the robot 20 or 30 resulting from input of a sudden drag operation can be prevented to the greatest possible extent. As a result, safety can be further improved.

Fifth Embodiment

Figure 26:
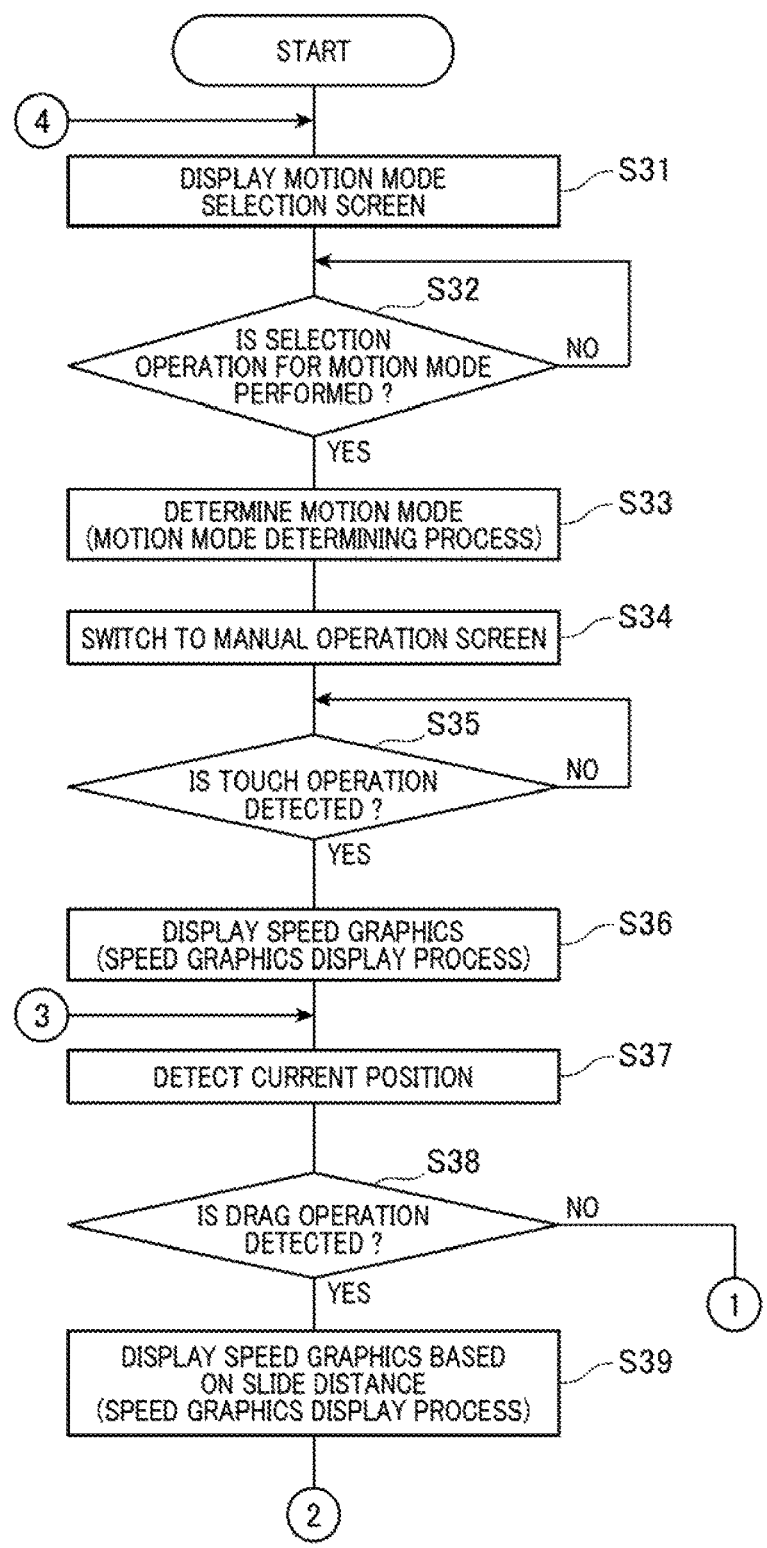
FIG. 26 is a flowchart of an example of details of various processes performed by a control unit according to the fifth embodiment.

Next, a fifth embodiment will be described with reference to FIG. 5 and FIG. 26 to FIG. 30. According to the present embodiment, the control unit 45 can perform the motion mode determining process for determining the motion mode of the robot 20 or 30 by a method differing from the drag operation. In other words, when manual operation is started and step S31 in FIG. 26 is performed, the control unit 45 displays a motion mode selection screen 70 or 80, shown in FIG. 27 or FIG. 28, on the touch panel display 42 by processes performed by the display control unit 48. The motion mode selection screen 70 or 80 is used by the user to select the motion mode of the robot 20 or 30 by a touch operation.

Figure 27:
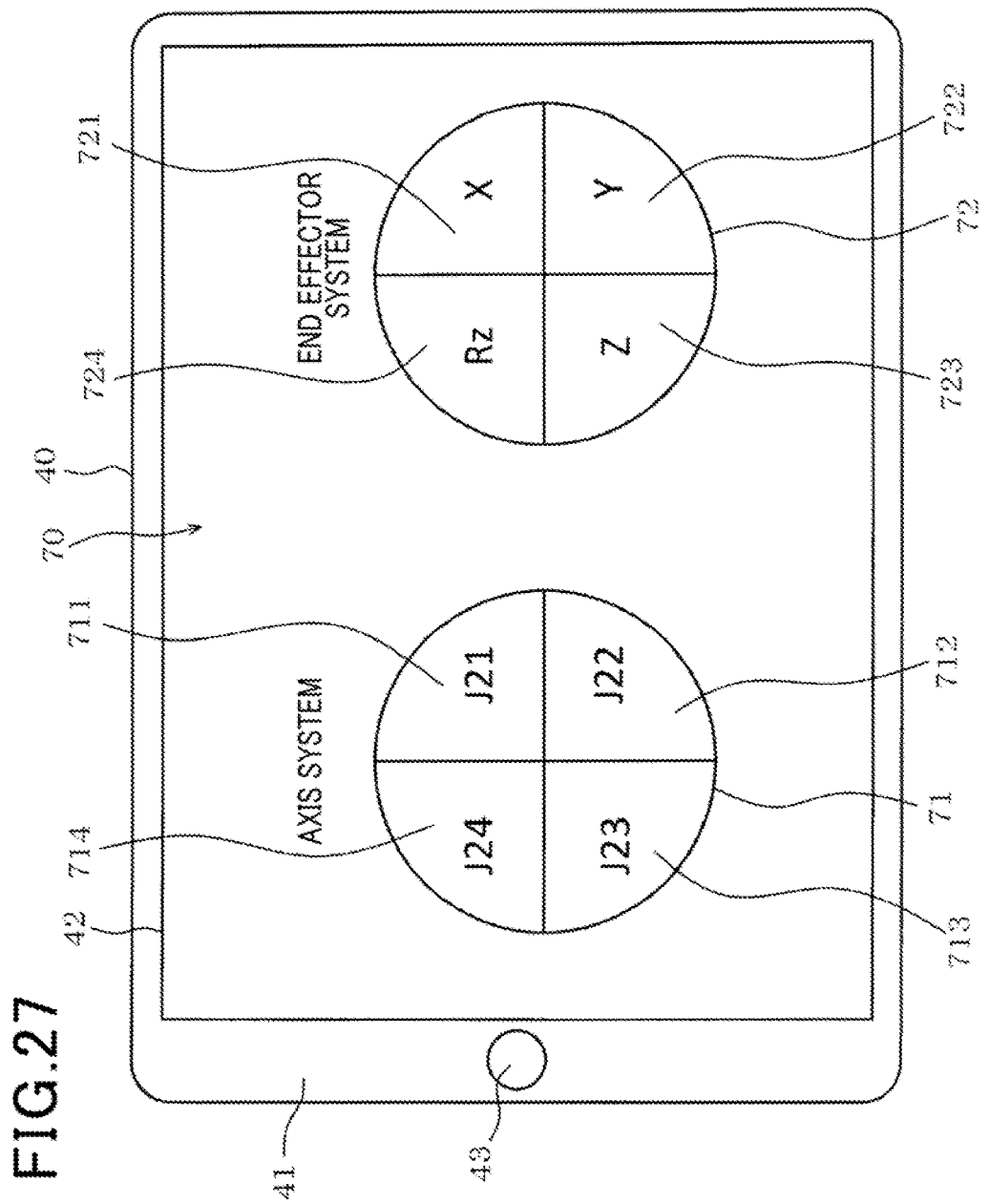
FIG. 27 is a diagram of an example of a motion mode selection screen for a four-axis robot displayed on a touch panel display, according to the fifth embodiment.

For example, the motion mode selection screen 70 shown in FIG. 27 is for the four-axis robot 20. The motion mode selection screen 70 has a selection portion 71 for the axis system and a selection portion 72 for the end effector system. The outer shapes of the selection portions 71 and 72 are formed into circles. The inside of the circle of each of the selection portions 71 and 72 is equally divided into the number of drive modes of each motion system. In the case of the motion mode selection screen 70 for the four-axis robot, the inside of the circle of each of the selection portions 71 and 72 is equally divided into four parts, which amounts to the number of drive modes of each motion system of the four-axis robot 20. The areas inside the selection portions 71 and 72 that are each equally divided into four parts are respectively set to selection areas 711 to 714 for the axis system and selection areas 721 to 724 for the end effector system.

In this case, in the selection portion 71 for the axis system, the selection area 711 is assigned to the motion mode of the first axis 321. The selection area 712 is assigned to the motion mode of the second axis 322. The selection area 713 is assigned to the motion mode of the third axis J23. The selection area 714 is assigned to the motion mode of the fourth axis J24. In addition, in the selection portion 72 for the end effector system, the selection area 721 is assigned to the motion mode in the X direction. The selection area 722 is assigned to the motion mode in the Y direction. The selection area 723 is assigned to the motion mode in the Z direction. The selection area 724 is assigned to the motion mode in the Rz direction. As a result, the user can perform a touch operation on any of the areas among the selection areas 711 to 714 and 721 to 724, and thereby operate the robot 20 in the motion mode assigned to the area.

Figure 28:
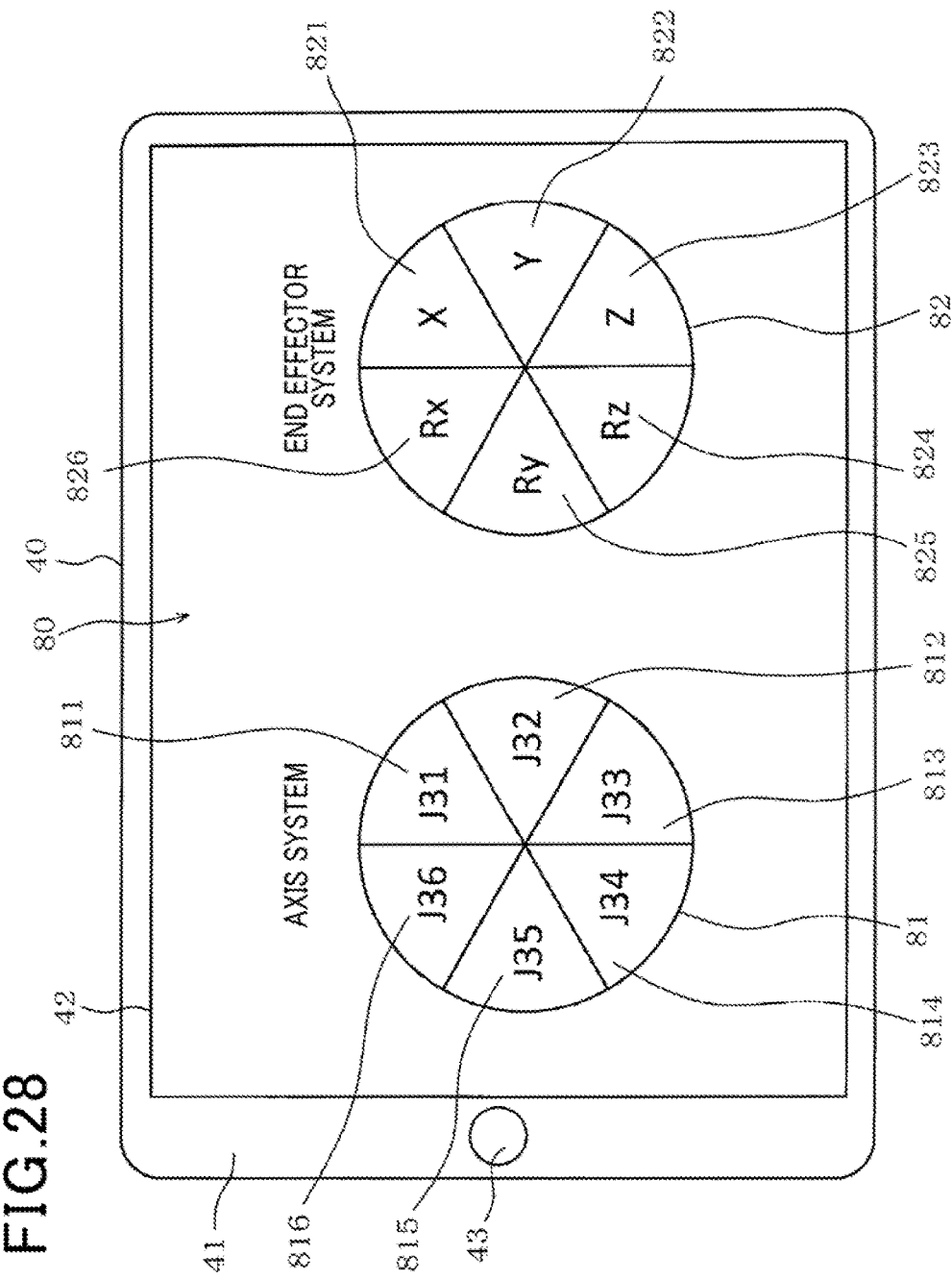
FIG. 28 is a diagram of an example of a motion mode selection screen for a six-axis robot displayed on a touch panel display, according to the fifth embodiment.

In addition, for example, the motion mode selection screen 80 shown in FIG. 28 is for the six-axis robot. The motion mode selection screen 80 has a selection portion 81 for the axis system and a selection portion 82 for the end effector system. The outer shapes of the selection portions 81 and 82 are formed into circles. The inside of the circle of each of the selection portions 81 and 82 is equally divided into the number of drive modes of each motion system. In the case of the motion mode selection screen 80 for the six-axis robot, the inside of the circle of each of the selection portions 81 and 82 is equally divided into six parts, which amounts to the number of drive modes of each motion system of the six-axis robot 30. The areas inside the selection portions 81 and 82 that are each equally divided into six parts are respectively set to selection areas 811 to 816 for the axis system and selection areas 821 to 826 for the end effector system.

In this case, in the selection portion 81 for the axis system, the selection area 811 is assigned to the motion mode of the first axis 331. The selection area 812 is assigned to the motion mode of the second axis J32. The selection area 813 is assigned to the motion mode of the third axis J33. The selection area 814 is assigned to the motion mode of the fourth axis J34. The selection area 815 is assigned to the motion mode of the fifth axis 335. The selection area 816 is assigned to the motion mode of the sixth axis 336. In addition, in the selection portion 82 for the end effector system, the selection area 821 is assigned to the motion mode in the X direction. The selection area 822 is assigned to the motion mode in the Y direction. The selection area 823 is assigned to the motion mode in the Z direction. The selection area 824 is assigned to the motion mode in the Rz direction. The selection area 825 is assigned to the motion mode in the Ry direction. The selection area 826 is assigned to the motion mode in the Rx direction. As a result, the user can perform a touch operation on any of the areas among the selection areas 811 to 816 and 821 to 826, and thereby operate the robot 30 in the motion mode assigned to the area.

Figure 29:
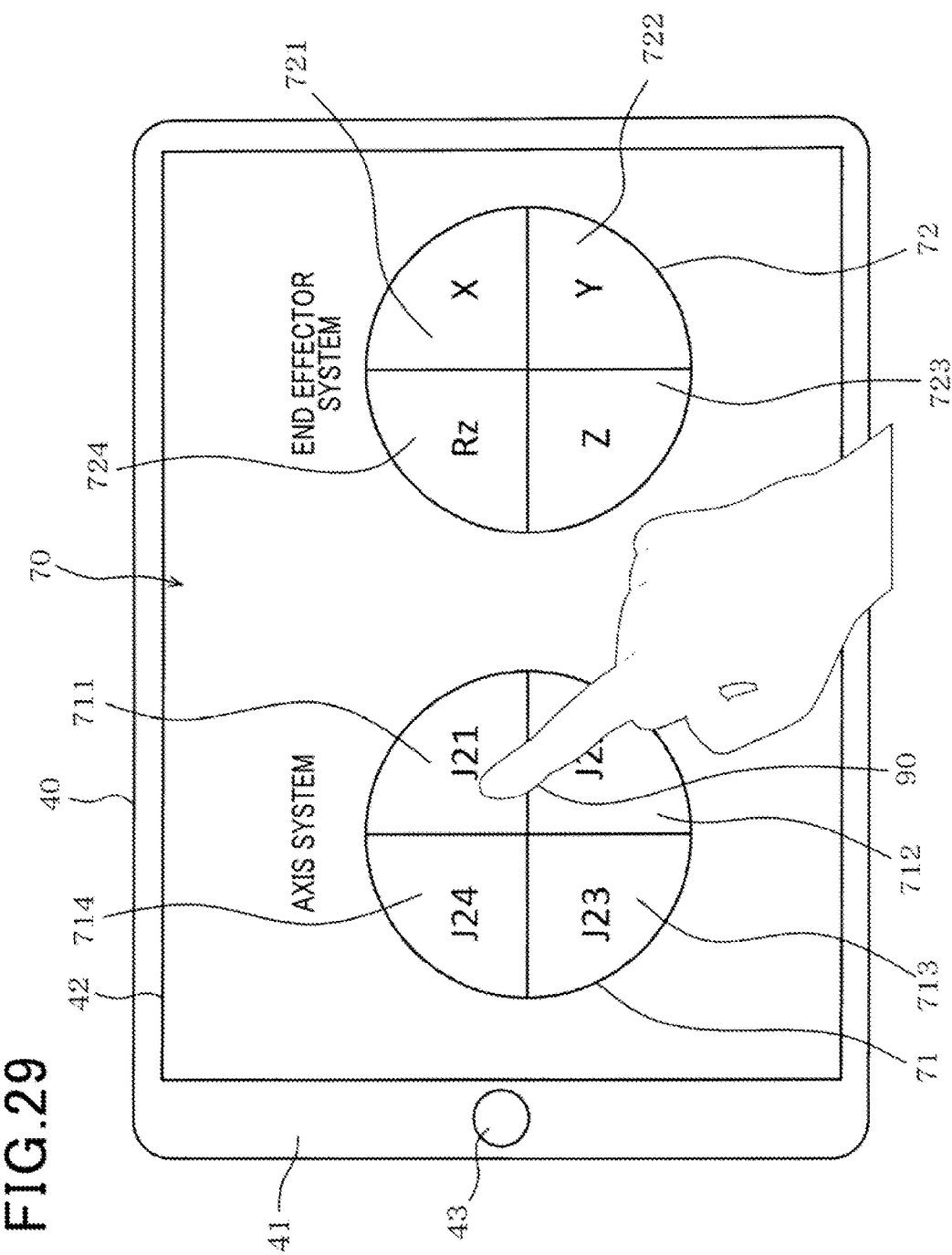
FIG. 29 is a diagram of an example of touch operation on the motion mode selection screen for a four-axis robot, according to the fifth embodiment.

At step S32 in FIG. 26, the control unit 45 determines whether or not an operation is performed on any of the selection areas 711 to 714 and 721 to 724 or any of the selection areas 811 to 8116 and 821 to 826, based on a detection result from the operation detecting unit 46. When determined that a touch operation is not performed on any of the selection areas (NO at step S32), the control unit 45 waits while maintaining the display of the motion mode selection screen 70 or 80. Meanwhile, when determined that a touch operation is performed on any of the selection areas (YES at step S32), the control unit 45 proceeds to step S33. Then, when step S33 is performed, the control unit 45 determines the motion mode of the robot 20 or 30 in manual operation to be the motion mode selected at step S32, by processes performed by the motion command generating unit 47. For example, as shown in FIG. 29, when the user performs a touch operation on the selection area 711 of the selection portion 71 for the axis system on the motion mode selection screen 70 for the four-axis robot 20, the control unit 45 determines the motion mode of the robot 20 to be the motion mode in which the first axis 321 of the axis systems is driven.

Figure 30:
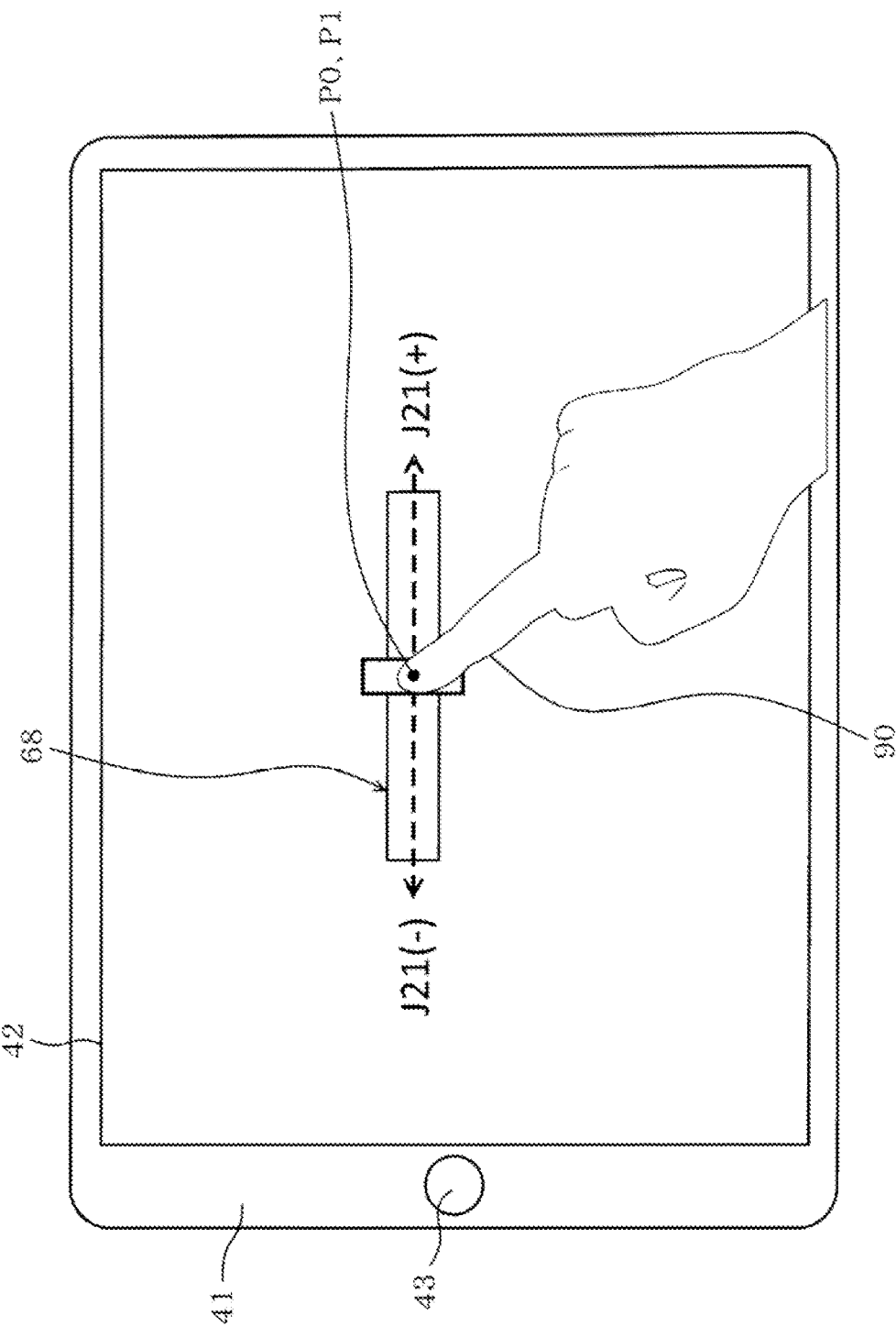
FIG. 30 is a diagram of an example of when a speed graphics is displayed on the touch panel display, according to the fifth embodiment.

Next, the control unit 45 performs step S34 in FIG. 26. The control unit 45 switches the screen of the touch panel display 42 to a manual operation screen, or in this case, a state in which nothing is displayed as shown in FIG. 6, by processes performed by the display control unit 48. Subsequently, at step S35, the control unit 45 determines whether or not a touch operation is performed on the touch panel display 42, based on a detection result from the operation detecting unit 46. When determined that a touch operation is not performed (NO at step S35), the control unit 45 displays nothing on the touch panel display 42, as shown in FIG. 6, and waits. Meanwhile, as shown in FIG. 30, when the user performs a touch operation on an arbitrary point on the touch panel display 42 with a finger 90 or the like, the control unit 45 determines that a touch operation is performed (YES at step S35) and performs step S36.

At step S36, the control unit 45 performs the speed graphics display process. The control unit 45 displays a fifth speed graphics 68 corresponding to the selected motion mode on the touch panel display 42. The fifth speed graphics 68 can also be replaced with any of the above-described first speed graphics 61, second speed graphics 64, third speed graphics 65, and fourth speed graphics 67. In addition, a configuration in which steps S34 and 35 are omitted is also possible. That is, for example, when the user touch-operates the motion mode screen 70 or 80 and selects a motion mode (step S33), the fifth speed graphics 68 of which the center position is the touch position by the touch operation is displayed on the touch panel display 42 (step S36).

Next, at step S37, the control unit 45 detects the current position P1 related to the finger 90 of the user or the like by the operation detecting unit 46. Subsequently, at step S38, the control unit 45 determines whether or not a drag operation is performed from the touch position P0, based on the touch position P0 detected at step S35 and the current position P1 detected at step S37. When determined that a drag operation is not performed (NO at step S38), the control unit 45 performs step S26 in FIG. 5. Meanwhile, when determined that a drag operation is detected (YES at step S38), the control unit 45 changes the display of the fifth speed graphics 68 based on the slide distance Ls of the drag operation, in a manner similar to that at steps S17 and S19 in FIG. 4. Then, the control unit 45 proceeds to step S20 in FIG. 5. As a result, the robot 20 or 30 is operated in the motion mode and at the motion speed Vr selected by the user.

Consequently, the user can perform manual operation while switching among three or more motion modes. Therefore, improvement in operability from a perspective differing from that according to the above-described first embodiment can be achieved. In addition, the selection portions 71, 72, 81, and 82 are each formed into a circle. The inside of the circle is equally divided based on the number of motion modes of the robot 20 or 30. Each area inside the equally divided circle is assigned a motion mode of the robot 20 or 30. Consequently, the user can easily recognize which motion mode is assigned to which selection area. As a result, operability can be further improved.

Sixth Embodiment

Next, a sixth embodiment will be described with reference to FIG. 31 to FIG. 33. According to the sixth embodiment, the description will be given regarding the first speed graphics 61. However, the sixth embodiment is also applicable to other speed graphics. The control unit 45 can display the first bar 62 such that the length thereof is variable based on the position of the slider 63, that is, the slide distance Ls of the drag operation, by processes performed by the display control unit 48. That is, the area of the first bar 62 that is displayed changes depending on the position of the slider 63. For example, the first bar 62 is displayed such as to expand and contract towards the same direction as the direction in which the slider 63 moves. In this case, the first bar 62 of the first speed graphics 61 linearly expands and contracts based on the slide distance Ls with the start position P0 of the drag operation as the base point.

Figure 31:
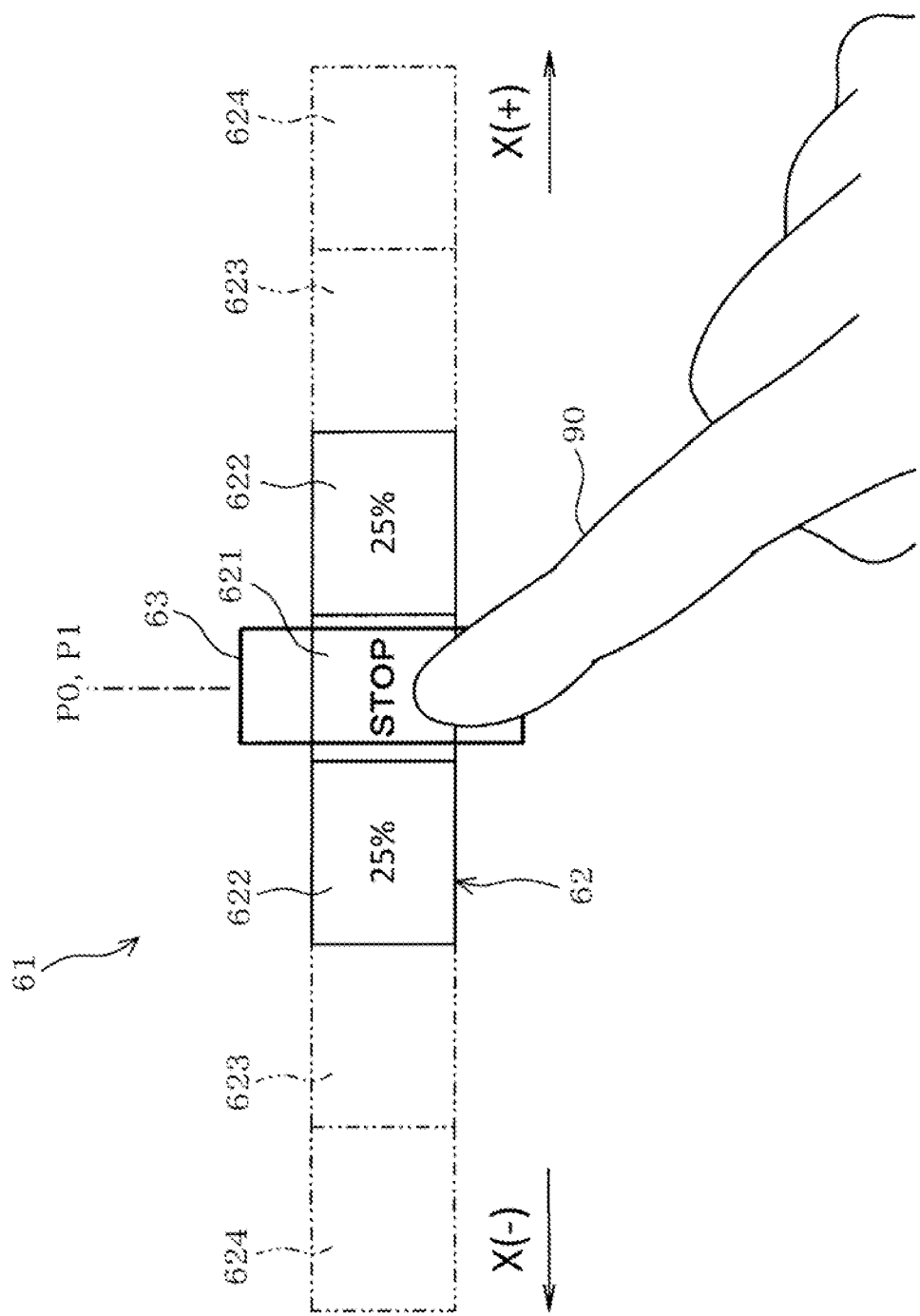
FIG. 31 is a diagram (1) of an example of details of a speed graphics according to a sixth embodiment.
Figure 32:
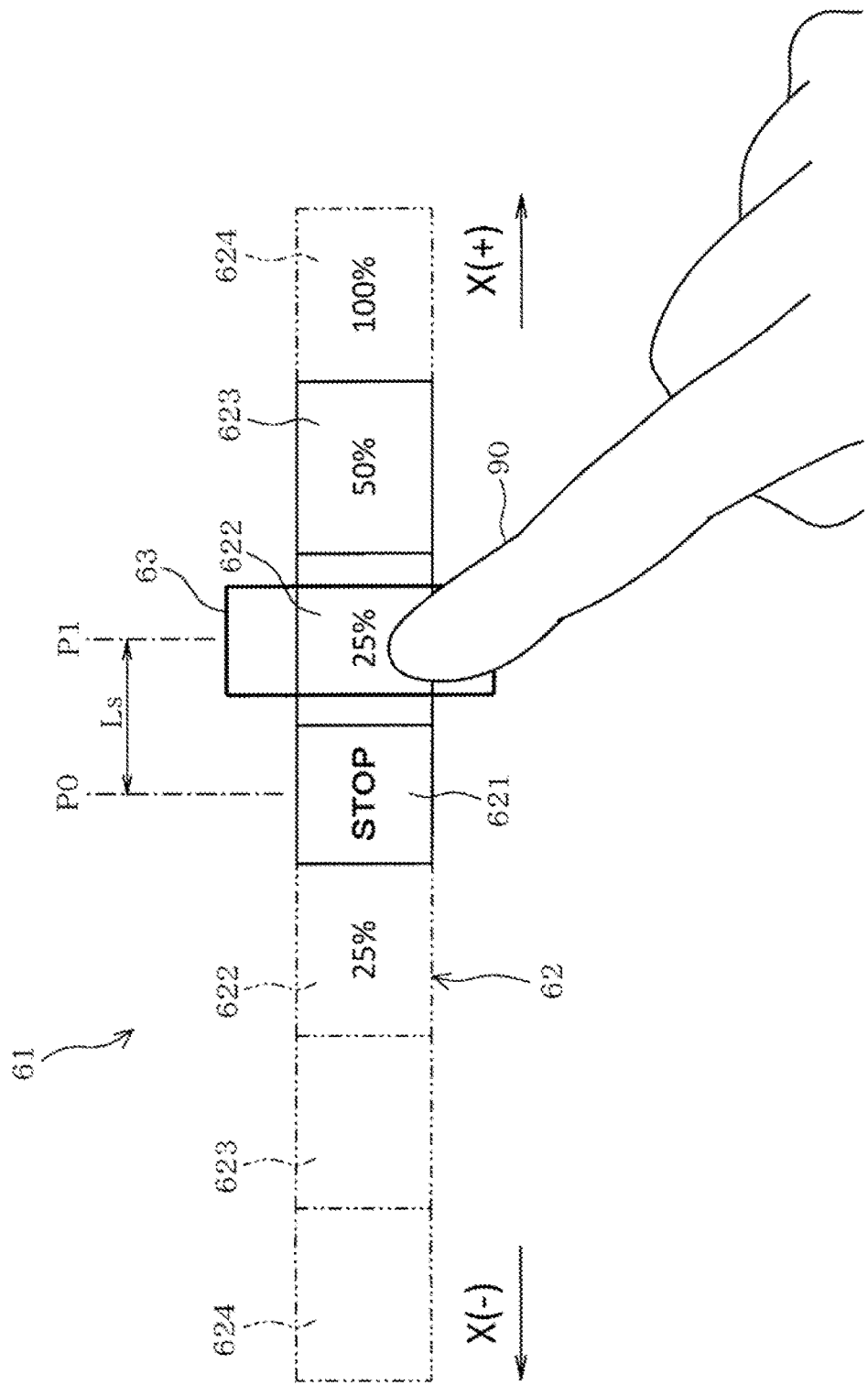
FIG. 32 is a diagram (2) of an example of the details of the speed graphics according to the sixth embodiment.

Specifically, as shown in FIG. 31, when the current position P1 of the drag operation is the initial position P0, that is, when the slide distance Ls is zero, the first area 621 in which the slider 63 is positioned, and the second areas 622 and 622 that are adjacent to the first area 621 on both sides are displayed. In this case, of the areas 621 to 624 on both the positive- and negative-direction sides, the areas other than the first area 621 and the second areas 622 and 622, that is, the third areas 623 and 623 and the fourth areas 624 and 624 on both the positive and negative sides are not displayed, as indicated by the broken lines.

Next, when a drag operation is performed towards the positive-direction side and the slide distance Ls increases towards the positive-direction side, the first bar 62 is displayed such as to extend towards the positive-direction side. Meanwhile, when a drag operation is performed towards the negative-direction side and the slide distance Ls increases towards the negative-direction side, the first bar 62 is displayed such as to extend towards the negative-direction side. For example, as shown in FIG. 32, when the drag operation is performed towards the positive-direction side and the slider 63 is positioned in the second area 622 on the positive-direction side, the third area 623 adjacent on the positive-direction side of the second area 622 on the positive-direction side in which the slider 63 is positioned is further displayed. In this case, the second area 622 on the negative-direction side that is positioned on the side opposite the operating direction of the drag operation is no longer displayed, as indicated by the two-dot chain lines.

Figure 33:
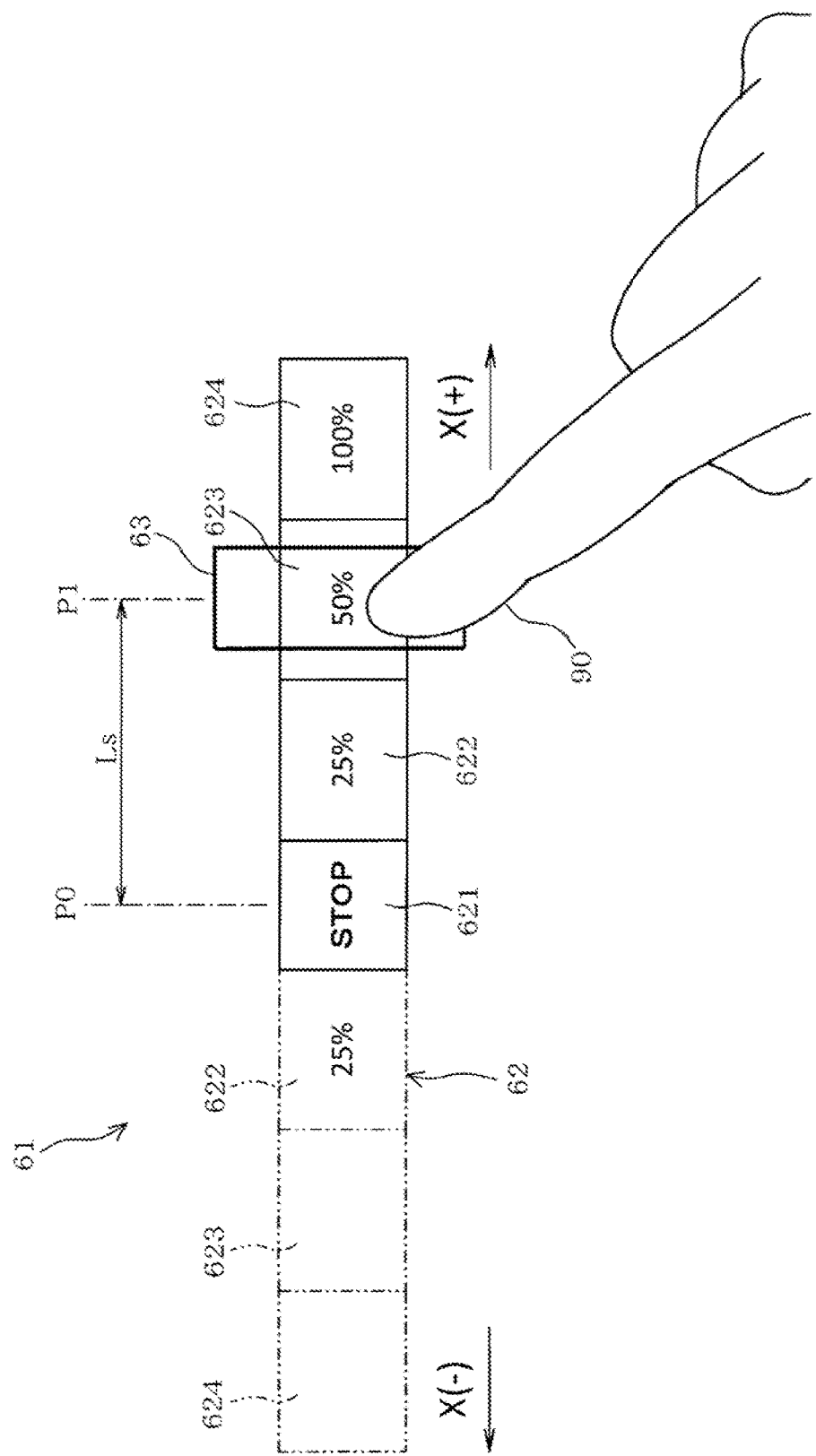
FIG. 33 is a diagram (3) of an example of the details of the speed graphics according to the sixth embodiment.

In addition, as shown in FIG. 33, when the drag operation is further performed towards the positive-direction side and the slider 63 is positioned in the third area 623 on the positive-direction side, the fourth area 624 adjacent on the positive-direction side of the third area 623 on the positive-direction side in which the slider 63 is positioned is further displayed. When the drag operation is performed towards the first area 621 side from the position of the third area 623, the first bar 62 is displayed such as to contract in order from FIG. 33, to FIG. 32, to FIG. 31, in reverse of that described above.

In this way, according to the present embodiment, the first bar 62 is displayed such as to extend and contract towards the operating direction of the drag operation, in accompaniment with the drag operation. The areas 621 to 624 of the first bar 62 displayed on the touch panel display 42 increase in accompaniment with the increase in slide distance Ls of the drag operation. Therefore, at the start of input of the drag operation, that is, when the current position P1 is near the initial position P0, only the area assigned to a relatively slow motion speed Vr (such as Vr2=25%) near the initial position P0 is displayed. That is, at the start of input of the drag operation, areas assigned to relatively fast motion speeds Vr (such as Vr3=50% and Vr4=100%) that are away from the initial position P0 are not displayed.

In this case, for example, when the overall first bar 62 is displayed in advance at the start of input of the drag operation, the user can more easily recognize the operating direction of the drag operation by viewing the first bar 62. That is, the first bar 62 provides a guidance effect of guiding the operating direction of the drag operation by the user. Conversely, when the overall first bar 62 is not displayed at the start of input of the drag operation, the guidance effect for the drag operation provided by the first bar 62 is reduced. As a result, the intention of the user to increase the slide distance Ls in stages or with relative slowness, based on the first bar 62 that extends and contracts in accompaniment with the drag operation, is facilitated. Therefore, the user suddenly inputting a large drag operation can be suppressed. Sudden acceleration of the robot 20 or 30 resulting from input of a sudden drag operation can be prevented to the greatest possible extent. As a result, safety can be further improved.

Seventh Embodiment

Figure 34:
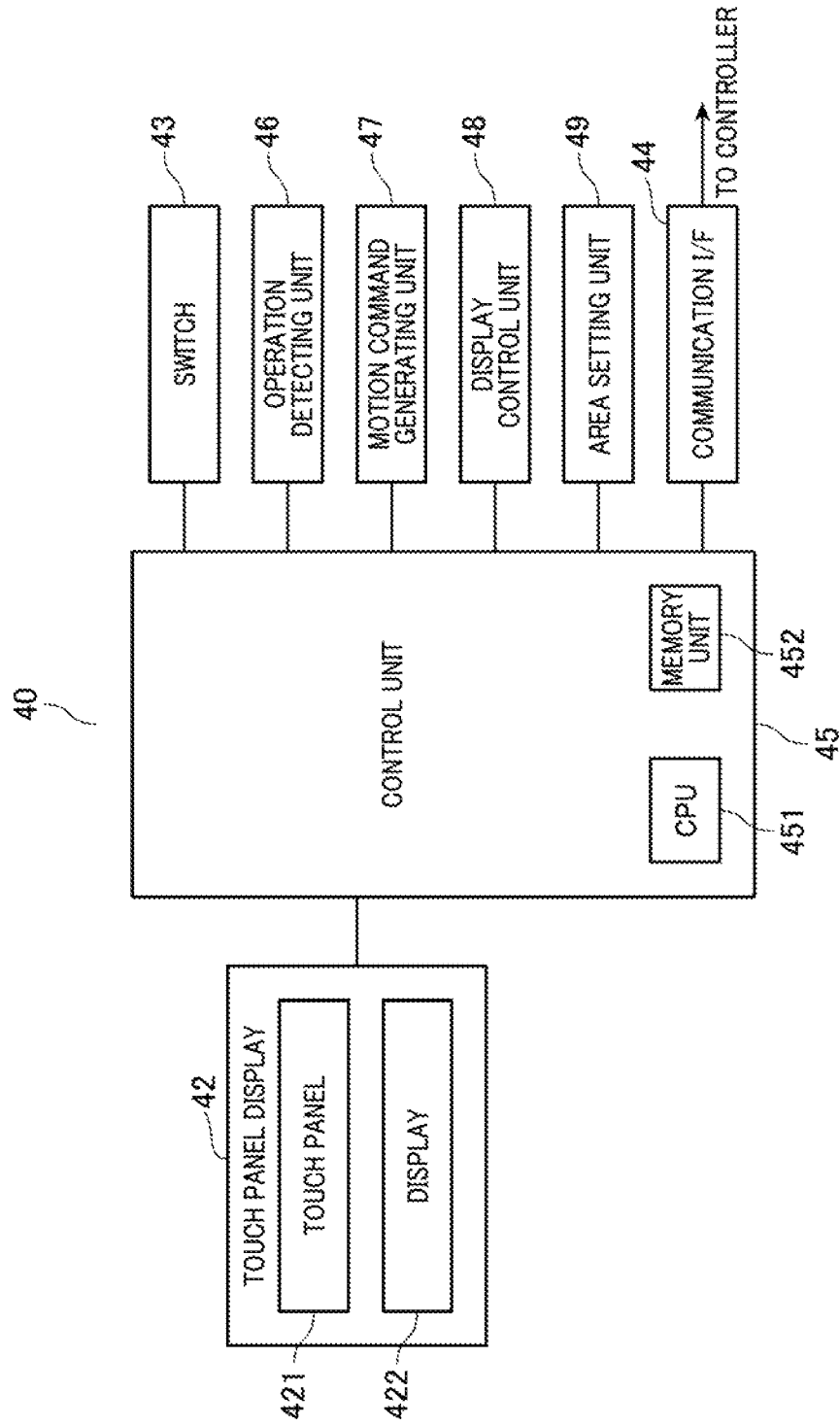
FIG. 34 is a block diagram of an example of an electrical configuration of a teaching pendant according to a seventh embodiment.

Next, a seventh embodiment will be described with reference to FIG. 34 to FIG. 37. The configuration according to the seventh embodiment is based on the configuration according to the first embodiment. As shown in FIG. 34, the teaching pendant 40 according to the seventh embodiment includes an area setting unit 49 in addition to the configuration according to the first embodiment. The area setting unit 49 sets a bar area 62A corresponding to the bar 62 shown in FIG. 8 and FIG. 9, for example, on the touch panel 421. In addition, according to the present embodiment, the motion speed determining process includes a process in which the motion speed Vr of the robot 20 or 30 is set to zero when the operating position of the drag operation, that is, the current position P1 runs outside the bar area 62A.

In addition, the operation detecting unit 46 according to the present embodiment is capable of detecting operating pressure related to the touch operation and the drag operation, that is, the pressing force by the finger of the user or the like on the touch panel 421. The motion speed determining process includes a process in which the motion speed Vr of the robot 20 or 30 is set to zero when the operating pressure detected by the operation detecting unit 46 exceeds a threshold set in advance.

Figure 35:
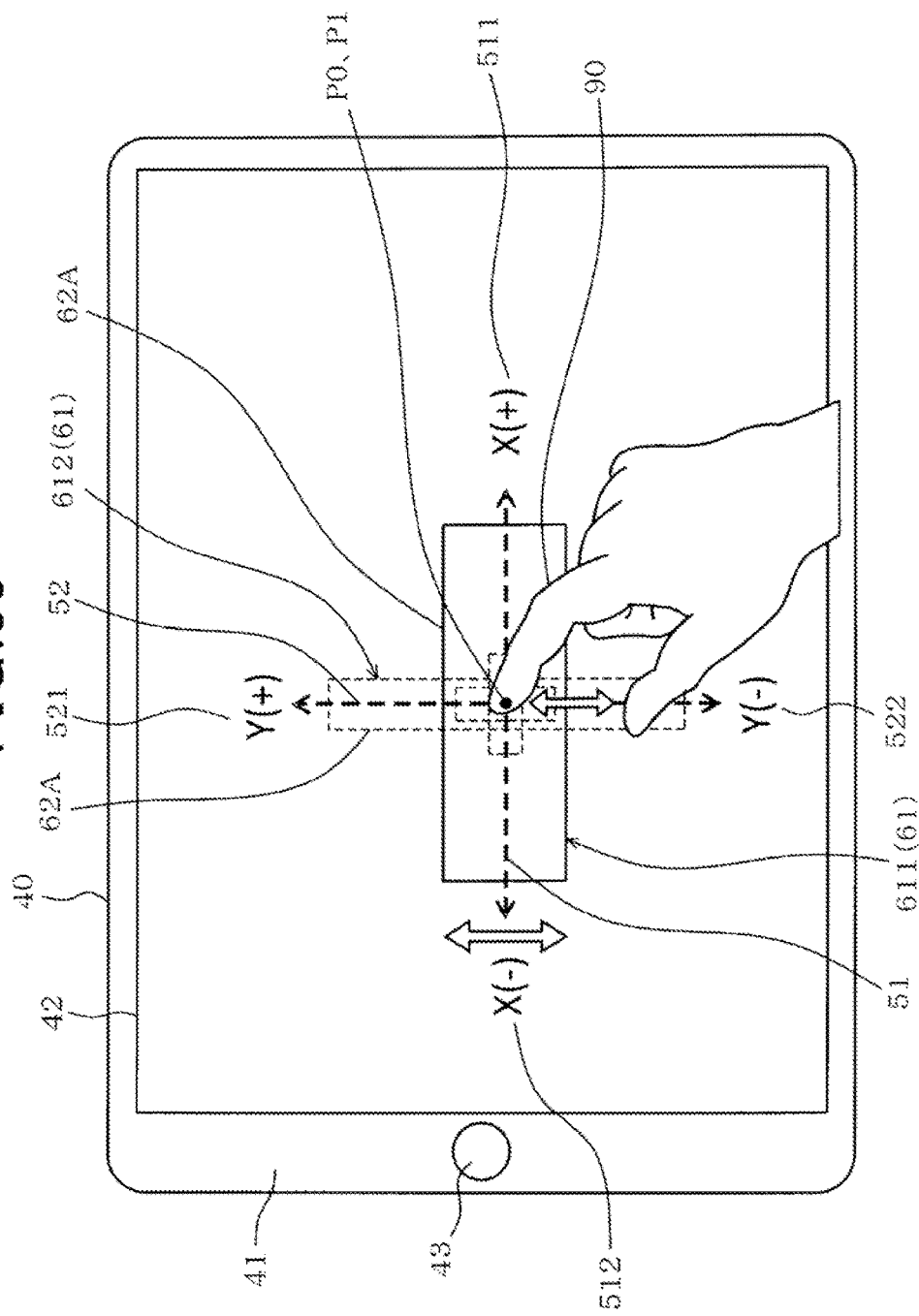
FIG. 35 is a diagram of an example of an operation when a width of a bar area set on a touch panel display is changed, according to the seventh embodiment.

In addition, the width of the bar area 62A can be arbitrarily set by the user. In this case, the user can change the width in the direction perpendicular to the longitudinal direction of the bar area 62A by performing an operation in which two fingers are spread or closed, that is, a so-called pinching operation, as shown in FIG. 35. That is, the user can widen the width of the bar area 62A by performing the pinching operation such as to widen the space between the two fingers, and narrow the width of the bar area 62A by performing the pinching operation such as to narrow the space between the two fingers In addition, the motion speed determining process includes a process in which the motion speed Vr of the robot 20 or 30 is set to zero when an operating speed Vd of the drag operation exceeds a threshold. In this case, the threshold for when an acceleration operation is performed is set to a predetermined in advance. The acceleration operation is a drag operation in which the slide distance Ls of the drag operation is increased. Meanwhile, the threshold for when a deceleration operation is performed is set to an operating speed Vr of the acceleration operation that is the drag operation performed immediately before the deceleration operation and in which the slide distance Ls is increased. The deceleration operation is a drag operation in which the slide distance Ls of the drag operation is decreased. That is, the threshold related to the acceleration operation is a fixed value set in advance. The threshold related to the deceleration operation is a varying value that varies depending on the acceleration operation immediately before the deceleration operation.

Figure 36:
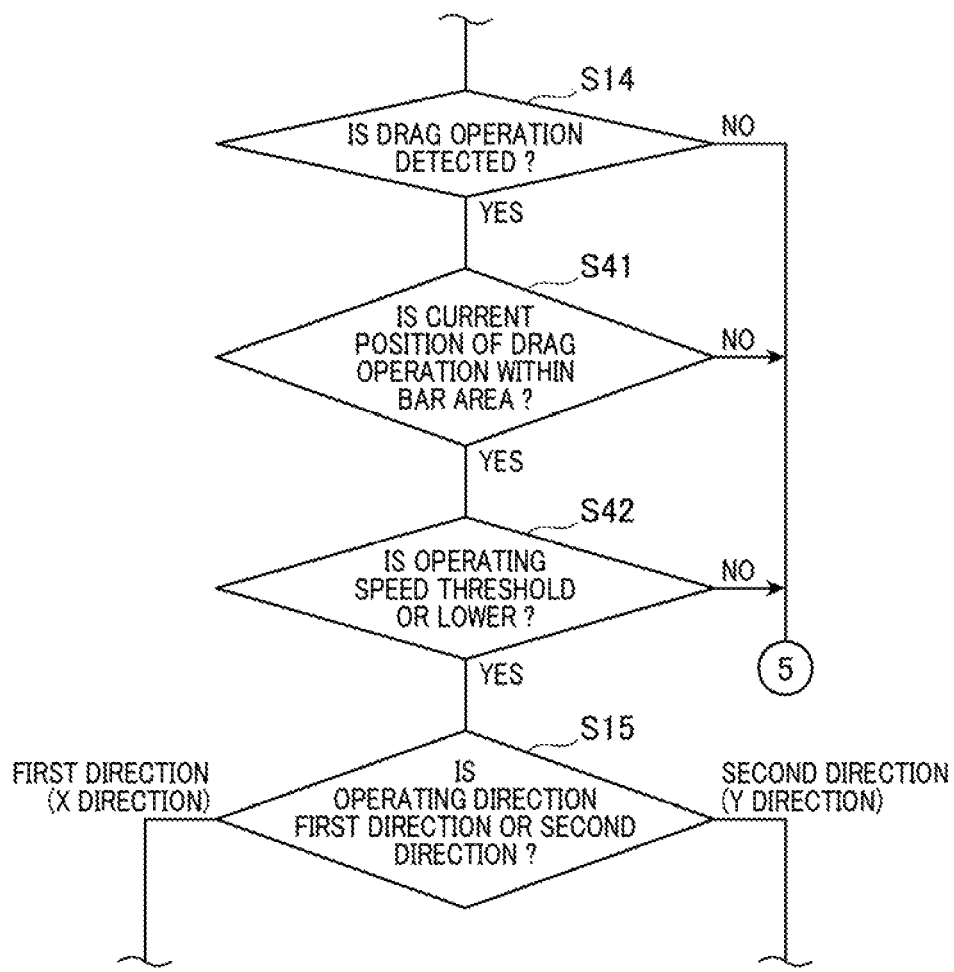
FIG. 36 is a flowchart (1) of additions to the details of various processes performed by a control unit according to the first embodiment, according to the seventh embodiment.

Next, control content performed by the control unit 45 will be described with reference to FIG. 36 and FIG. 37. According to the present embodiment, control content in FIG. 36 and FIG. 37 are further included in the control content in FIG. 4 and FIG. 5 according to the above-described first embodiment. That is, the control unit 45 performs step S41 shown in FIG. 36 after performing the control content at steps S11 to S14 shown in FIG. 4 in a manner similar to that according to the above-described first embodiment. At step S41, the control unit 45 determines whether or not the current position P1 of the drag operation is positioned within the bar area 42A.

When determined that the current position P1 of the drag operation is positioned outside of the bar area 42A (NO at step S41), the control unit 45 proceeds to step S44 in FIG. 37. Meanwhile, when determined that the current position P1 of the drag operation is positioned within the bar area 42A (YES at step S41), the control unit 45 proceeds to step S42 in FIG. 36 and determines whether or not the operating speed Vd of the drag operation is a threshold or lower. When determined that the operating speed Vd of the drag operation exceeds the threshold (NO at step S42), the control unit 45 proceeds to step S44 in FIG. 37. Meanwhile, when determined that the operating speed Vd of the drag operation is the threshold or lower (YES at step S42), the control unit 45 proceeds to step S15. Then, the control unit 45 performs step S15 and subsequent steps in a manner similar to that according to the above-described first embodiment.

In addition, after performing the control content at step S15 and subsequent steps in FIG. 4 and steps S20 to S25 in FIG. 5 in a manner similar to that according to the above-described first embodiment, when determined that the operation is not completed at step S26 (NO at step S26), the control unit 45 performs step S43 and subsequent steps shown in FIG. 37. At step S43, the control unit 45 determines whether or not the operating pressure detected by the operation detecting unit 46 is a threshold or lower. When determined that the operating pressure is the threshold or lower (YES at step S43), the control unit 45 proceeds to step S13 in FIG. 4. Meanwhile, when determined that the operating pressure exceeds the threshold (NO at step S43), the control unit 45 proceeds to step S44 in FIG. 37.

Then, the control unit 45 performs the motion speed determining process at step S44 and determines the motion speed of the robot 20 or 30 to be zero. Subsequently, the control unit 45 performs the motion command generating process at step S44. The control unit 45 generates the motion command for operating the robot 20 or 30 based on the motion speed Vr of the robot 20 or 30 determined in the motion speed determining process (step S44). That is, in this case, because the motion speed Vr of the robot 20 or 30 determined in the motion speed determining process (step S44) is zero, the control unit 45 generates a stop command for stopping the robot 20 or 30 at step S45. Then, at step S46, the control unit 45 transmits the motion command, or in this case, the stop command generated at step S45 to the controller 11. The controller 11 stops the robot 20 or 30 based on the motion command, that is, the stop command received from the teaching pendant 40. Subsequently, the control unit 45 proceeds to step S26, and performs step S26 and subsequent steps in a manner similar to that according to the above-described first embodiment.

In the configuration according to the present embodiment, even when the teaching pendant 40 does not include a so-called dead man's switch, a high degree of safety can be ensured. That is, many conventional robot operation apparatuses are provided with a physical switch, that is, the so-called dead man's switch for ensuring safety of the robot and user. For example, the configuration is such that the robot cannot be operated unless the dead man's switch is in a depressed state. In this configuration, when the robot 20 or 30 is about to collide with an object of some sort during operation of the robot 20 or 30 by the user, the user can stop the operation of the robot 20 or 30 by releasing a finger or the like from the dead man's switch or by firmly pressing the dead man's switch. Therefore, the user can quickly respond to such situations. As a result, a high degree of safety can be ensured. However, for example, when a low-cost device provided with a touch panel, such as a smartphone or a tablet terminal, is used as the robot operation apparatus, providing a physical switch such as the dead man's switch becomes difficult.

Here, when a device such as a smartphone is used as the teaching pendant 40, it is thought that the teaching pendant 40 is not equipped with the so-called dead man's switch. Therefore, when the robot is about to collide with an object of some sort during user operation, the user can stop the operation of the robot 20 or 30 by ending the operation by removing the finger or the like performing the operation from the touch panel 421. As a result, collision of the robot 20 or 30 can be prevented to the greatest possible extent.

However, in some instances, the user may not be able to take action to remove the finger or the like performing the operation from the touch panel 421, on the spur of the moment. In this case, for example, the following three actions are supposed as the actions taken by the user. A first action is the user performing an operation to set the motion speed Vr of the robot 20 or 30 to zero or to decrease the motion speed Vr, to stop or decelerate the robot 20 or 30. That is, the user performs an operation to shorten the slide distance Ls. A second action is the user erroneously performing an operation that increases the motion speed Vr of the robot 20 or 30. That is, the user performs an operation that increases the slide distance Ls. Both the first action and the second action are thought to be suddenly performed during a short amount of time. In addition, a third action is the user firmly pressing the touch panel 421 with the finger or the like at the current operating position P1, without being able to perform any operations.

Therefore, according to the present embodiment, the motion speed determining process includes the process in which the motion speed Vr of the robot 20 or 30 is set to zero when the motion speed Vd of the drag operation exceeds the threshold. That is, as a result, when a drag operation in which the slide distance Ls is suddenly increased or decreased, or in other words, a sudden drag operation in which the operating speed Vd exceeds the threshold is performed, the operation of the robot 20 or 30 can be stopped. Therefore, even when the above-described first action and second action are taken, the operation of the robot 20 or 30 can be quickly stopped. As a result, safety in robot operation can be improved.

Here, the following issue may occur when the threshold regarding the deceleration operation is uniformly set regardless of the proficiency of the user. That is, a user with high proficiency is used to operating the robot. Therefore, the user can safely operate the robot even when the operating speed is relatively high. However, when the threshold is set based on users with low proficiency, when the user with high proficiency performs a quick deceleration operation, the robot 20 or 30 stops contrary to the intention of the user. As a result, the operation intended by the user becomes difficult to perform, and this becomes inconvenient.

Therefore, according to the present embodiment, the threshold for the deceleration operation is set to the operating speed Vd of the acceleration operation performed immediately before the deceleration process. That is, when the first action is taken and the deceleration operation is performed, the operation of the robot 20 or 30 is stopped as a result of the operating speed of the acceleration operation performed immediately before the deceleration operation being exceeded. In other words, in an operation related to normal teaching operations and the like (referred to, hereafter, as normal operation), it is though that, because the user with high proficiency is used to operating the robot, the user performs both the acceleration operation and the deceleration operation at a relatively high operating speed. Meanwhile, in normal operation, it is though that, because a user with low proficiency is not used to operating the robot, the user performs both the acceleration operation and the deceleration operation at a relatively low operating speed. Therefore, in the present configuration, the threshold for the deceleration operation is set to the operating speed of the acceleration operation performed immediately before the deceleration operation. Consequently, the threshold for the deceleration operation related to a user with high proficiency tends to be a large value. Meanwhile, the threshold for the deceleration operation related to a user with low proficiency tends to be a small value. Therefore, the threshold for the deceleration operation can be that which is suitable for the proficiency level of the user. As a result, operability can be improved regardless of the proficiency level of the user.

When the deceleration operation is performed, the motion speed Vr of the robot 20 or 30 also decreases in accompaniment with the deceleration operation. Therefore, safety increases during normal operation. Consequently, no particular issues arise when the threshold for the deceleration operation changes depending on the proficiency level of the user. Meanwhile, when a sudden acceleration operation is performed, the motion speed Vr of the robot 20 or 30 also suddenly increases. Therefore, the level of danger increases. Consequently, the threshold for the acceleration operation is preferably fixed, regardless of the proficiency level of the user.

In addition, according to the present embodiment, the operation detecting unit 46 is capable of detecting the operating pressure related to the touch operation and the drag operation. The motion speed determining process includes the process in which the motion speed Vr of the robot 20 or 30 is set to zero when the operating pressure detected by the operation detecting unit 46 exceeds the threshold. As a result, when the user takes the above-described third action, the robot 20 or 30 can be stopped. Therefore, even when the user takes the above-described third action, collision of the robot can be prevented to the greatest possible extent. As a result, safety is improved.

In addition, the teaching pendant 40 according to the present embodiment further includes the area setting unit 49 that sets the bar area 62A corresponding to the bar on the touch panel 421. The motion speed determining process includes a process for setting the motion speed Vr of the robot 20 or 30 to zero when the operating position P1 of the drag operation runs outside of the bar area 62A. Consequently, when the robot 20 or 30 is about to collide with an object of some sort, the user can stop the robot 20 or 30 by shifting the operating position P1 of the drag operation to the outer side of the bar area 62A. As a result, collision of the robot 20 or 30 can be more easily prevented. Safety is improved.

In addition, according to the present embodiment, the width of the bar area 62A can be arbitrarily set. Consequently, as a result of the width of the bar area 62A being widened, for example, the drag operation by the user becomes less likely to run outside of the bar area 62A. Therefore, the user can perform the drag operation with relative ease, without viewing the touch panel display 42. As a result, operability is improved. Meanwhile, as a result of the width of the bar area 62A being narrowed, for example, the drag operation by the user can be made more likely to run outside of the bar area 62A. In this case, the user tries to perform a more careful operation so that their drag operation does not run outside of the bar area 62A. As a result, safety is further improved.

According to the present embodiment, the meaning of "the motion speed Vr of the robot 20 or 30 is set to zero" is not limited only to the motion speed Vr of the robot 20 or 30 being set exactly to zero. That is, according to the present embodiment, "the motion speed Vr of the robot 20 or 30 is set to zero" refers to a measure taken to prevent collision when the robot 20 or 30 is about to collide with an object of some sort. Therefore, according to the present embodiment, "the motion speed Vr of the robot 20 or 30 is set to zero" includes not only setting the motion speed Vr of the robot 20 or 30 exactly to zero and completely stopping the operation thereof, but also decelerating the robot 20 or 30 to an extent that an amount of time enabling the user to perform an appropriate operation is ensured.

Eighth Embodiment

Next, an eighth embodiment will be described with reference to FIG. 38 and FIG. 39. The configuration according to the eighth embodiment is based on the configuration according to the first embodiment and the configuration according to the seventh embodiment. The area setting unit 49 sets the bar area 62A for the bar 62 as shown in FIG. 38, for example. The bar area 62A has a main stop area 621A and action areas 622A to 624A. The main stop area 621A is an area corresponding to the first area 621 and is an area including the start position P0 of the drag operation. The action areas 622A to 624A are areas respectively corresponding to the second area 622, the third area 623, and the fourth area 624, and are each an area that does not include the start position P0 of the drag operation.

According to the present embodiment, the control unit 45 sets the motion speed of the robot 20 or 30 to zero when the operating position P1 of the drag operation is positioned in the main stop area 621A. That is, when the operating position P1 of the drag operation is positioned in the main stop area 621A, the robot 20 or 30 is stopped. Meanwhile, when the operating position P1 of the drag operation is positioned in the action areas 622A to 624A, the motion speed Vr of the robot 20 or 30 is determined based on the slide distance Ls.

When the drag operation in which the slide distance Ls is decreased, that is, the deceleration operation is performed, the area setting unit 49 increases the proportion of the main stop area 621A and decreases the proportion of the action areas 622 and 623 in relation to the overall length of the bar area 62A, as the operating speed Vd of the deceleration operation becomes faster. That is, when the user performs the deceleration operation at the operating speed Vd exceeding the threshold, as shown in FIG. 39, the main stop area 621A, that is, the first area 621 becomes longer. Conversely, the action areas 622A and 623A, that is, the second area 622 and the third area 623 become shorter.

As a result, for example, when the above-described first action is taken, the proportion of the main stop area 621A increases and the proportion of the action areas 622A and 623A decreases in relation to the overall length of the bar area 62A. That is, when the above-described first action is taken, for example, the distance from the current position P1 of the drag operation until the main stop area 621A is reached becomes short. Therefore, the operating position P1 of the drag operation can more quickly reach the main stop area 621A. Consequently, the operation of the robot 20 or 30 can be more quickly stopped. In addition, when the above-described first action is taken, for example, because the main stop area 621A becomes longer, the operating position P1 of the drag operation can be more easily stopped within the main stop area 621A. Consequently, the operation of the robot 20 or 30 can be stopped with more certainty. As a result, safety is further improved.

Ninth Embodiment

Next, a ninth embodiment will be described with reference to FIG. 40 and FIG. 41. The configuration according to the ninth embodiment is based on the configuration according to the first embodiment and the configuration according to the seventh embodiment. According to the present embodiment as well, the area setting unit 49 sets the bar area 62A for the bar 62 as shown in FIG. 40, for example. The bar area 62A has the main stop area 621A and the action areas 622A to 624A. When the slide distance Ls becomes a predetermined distance or more, the area setting unit 49 sets an auxiliary stop area 69A near the operating position P1 of the drag operation. The auxiliary stop area 69A is an area that does not include the start position P0 of the drag operation. The control unit 45 sets the motion speed Vr of the robot 20 or 30 to zero when the operating position P1 of the drag operation is positioned in the main stop area 621A or the auxiliary stop area 69A. Meanwhile, the control unit 45 determines the motion speed Vr of the robot 20 or 30 based on the slide distance Ls when the operating position P1 of the drag operation is positioned in the action areas 622A to 624A.

According to the present embodiment, the predetermined distance is set, for example, to a second distance Ls2. That is, when the slide distance Ls is the second distance Ls2 or more, or in other words, when the motion speed of the robot 20 or 30 is the second motion speed Vr2 or higher, the area setting unit 49 sets the auxiliary stop area 69A near the operating position P1 of the drag operation. In the example in FIG. 41, the operating position P1 of the drag operation is positioned within the third area 623A. That is, the motion speed Vr of the robot 20 or 30 is set to the third motion speed Vr3. In this case, the auxiliary stop area 69A is set on both sides of the third area 623.

The length dimension of the auxiliary stop area 69A in the operating direction of the drag operation is set to be shorter than the length dimension of the slider 63. That is, when the auxiliary stop area 69A and the slider 63 overlap, the auxiliary stop area 69A is completely covered by the slider 63. According to the present embodiment, when the state in which the auxiliary stop area 69A is covered by the slider 63 is maintained for a certain period, the control unit 45 determines that the user intends to stop the robot 20 or 30. The control unit 45 then sets the motion speed Vr of the robot 20 or 30 to zero and stops the robot 20 or 30. Meanwhile, when the slider 63 merely passes over the auxiliary stop area 69A, the control unit 45 determines that the user does not intend to stop the robot 20 or 30. In this case, the control unit 45 determines the motion speed Vr of the robot 20 or 30 based on the slide distance Ls.

According to the present embodiment, when the slide distance Ls becomes a predetermined distance or more, that is, when the motion speed Vr of the robot 20 or 30 becomes fast, the auxiliary stop area 69A near the current position P1 of the drag operation is set. The user can stop the operation of the robot 20 or 30 by positioning the operating position P1 of the drag operation in the auxiliary stop area 69A. That is, in this case, the user does not have to perform the drag operation to the main stop area 621A. Therefore, compared to when the drag operation to the main stop area 621A is performed, the user can more quickly stop the operation of the robot 20 or 30. As a result, safety can be further improved.

Other Embodiments

The embodiments of the present invention are not limited to the embodiments described above and shown in the drawings. Modifications can be made accordingly without departing from the spirit of the invention. The embodiments of the present invention may include, for example, the following modifications or expansions. The above-described embodiments may be carried out in combinations, as appropriate. According to each of the above-described embodiments, the touch panel 421 and the display 422 are integrally configured as the touch panel display 42. However, the touch panel and the display may be configured to be separated from each other as individual components.

In addition, the robot to be operated by the teaching pendant 40 according to the above-described embodiments is not limited to the four-axis robot 20 or the six-axis robot 30. For example, the robot may be the four-axis robot 20 or the six-axis robot 30 set on a so-called X-Y stage (two-axis stage). In addition, the robot to be operated by the teaching pendant 40 includes, for example, a linear-type robot having a single drive axis and an orthogonal-type robot having a plurality of drive axes. In this case, the drive axis is not limited to a mechanical rotating shaft and also includes, for example, a drive axis that is driven by a linear motor. In other words, the present invention can be applied to various robots prescribed by the Japanese Industrial Standards (JIS). In terms of shape classification, these robots include vertical articulated robots, horizontal articulated robots, orthogonal robots, and parallel link robots.

What is claimed is:

1. An apparatus for operating a robot, the apparatus comprising:
   a touch panel that receives input of a touch operation and a drag operation from a user;
   a display that displays graphics;
   an operation detecting unit that detects the touch operation and the drag operation on the touch panel;
   a motion command generating unit that generates a motion command for operating the robot based on a detection result from the operation detecting unit; and
   a display control unit that controls display content of the display, wherein
   the motion command generating unit performs a motion speed determining process in which a motion speed of the robot is determined based on a slide distance that is a distance from a start position of a drag operation detected by the operation detecting unit to a current position, and
   the display control unit performs a speed graphics display process in which a speed graphics in which the slide distance and the motion speed of the robot are correlated and that changes in aspect in accompaniment with changes in the slide distance is displayed on the display.

2. The apparatus according to claim 1, wherein:
   the motion command generating unit performs a motion direction determining process in which a motion command for operating the robot in a positive direction is generated when an operating direction of the drag operation is a positive direction with reference to the start position of the drag operation, and a motion command for operating the robot in a negative direction is generated when the operating direction of the drag operation is a negative direction that is opposite the positive direction.

3. The apparatus according to claim 1, wherein:
   the motion speed determining process includes a process in which the motion speed of the robot is set to zero when the operating speed of the drag operation exceeds a threshold.

4. The apparatus according to claim 3, wherein:
   the threshold when a deceleration operation that is a drag operation in which the slide distance is decreased is performed is set to an operating speed of an acceleration operation that is a drag operation performed immediately before the deceleration operation and in which the slide distance is increased.

5. The apparatus according to claim 1, wherein:
   the operation detecting unit detects operating pressure related to the touch operation and the drag operation; and
   the motion speed determining process includes a process in which the motion speed of the robot is set to zero when the operating pressure detected by the operation detecting unit exceeds a threshold.

6. The apparatus according to claim 1, wherein:
the speed graphics has a bar that is formed in a linear shape with the start position of the drag operation as a base point and indicates the correlation between the slide distance and the motion speed of the robot, and a slider moves along the bar in accompaniment with the drag operation and indicates a current position of the drag operation on the bar.

7. The apparatus according to claim 6, further comprising:
an area setting unit that sets a bar area corresponding to the bar on the touch panel, wherein
the motion speed determining process includes a process in which the motion speed of the robot is set to zero when an operating position of the drag operation is outside of the bar area.

8. The apparatus according claim 7, wherein:
the bar area has a width which is able to be arbitrarily set.

9. The apparatus according to claim 7, wherein:
the bar area has a main stop area that is an area including the start position of the drag operation and an action area that is an area that does not include the start position of the drag operation;
the motion speed determining process includes a process in which the motion speed of the robot is set to zero when the operating position of the drag operation is positioned in the main stop area, and the motion speed of the robot is set based on the slide distance when the operating position of the drag operation is positioned in the action area; and
the area setting unit performs a process in which, when the deceleration operation that is a drag operation in which the slide distance is decreased is performed, a proportion of the main stop area in relation to an overall length of the bar area is increased and a proportion of the action area is decreased as the operating speed of the deceleration operation becomes faster.

10. The apparatus according to claim 7, wherein:
the bar area has a main stop area that is an area including the start position of the drag operation and an action area that is an area that does not include the start position of the drag operation;
the area setting unit is able to set an auxiliary area that is an area that does not include the start position of the drag operation near the operating position of the drag operation when the slide distance is a predetermined distance or more; and
the motion speed determining process includes a process in which the motion speed of the robot is set to zero when the operating position of the drag operation is positioned in the main stop area or the auxiliary stop area, and the motion speed of the robot is determined based on the slide distance when the operating position of the drag operation is positioned in the action area.

11. The apparatus according to claim 1, wherein:
the speed graphics linearly extends and contracts based on the slide distance, with the start position of the drag operation as a base point.

12. The apparatus according to claim 1, wherein:
the motion command generating unit performs a motion mode determining process in which a motion mode of the robot by a drive axis or a combination of drive axes of the robot is determined to be a first motion mode when an operating direction of the drag operation detected by the operation detecting unit is a first direction, and the motion mode of the robot is determined to be a second motion mode when the operating direction of the drag operation is a second direction.

13. The apparatus according to claim 12 wherein:
the display control unit performs a direction graphics display process in which a first direction graphics indicating the first direction and a second direction graphics indicating the second direction are displayed on the display when the operation detecting unit detects the touch operation.

14. The apparatus according to claim 13, wherein:
the first direction and the second direction are perpendicular to each other; and
the direction graphics display process includes a process in which the first direction graphics and the second direction graphics are displayed on the display such as to be perpendicular to each other.

15. The apparatus according to claim 1, wherein:
the motion speed determining process is a process in which the motion speed of the robot increases in stages in proportion to the slide distance.

16. The apparatus according to claim 1, wherein:
the motion speed determining process is a process in which the motion speed of the robot continuously increases in proportion to the slide distance of the drag operation.

17. The apparatus according to claim 2, wherein:
the motion speed determining process includes a process in which the motion speed of the robot is set to zero when the operating speed of the drag operation exceeds a threshold.

18. The apparatus according to claim 2, wherein:
the operation detecting unit detects operating pressure related to the touch operation and the drag operation; and
the motion speed determining process includes a process in which the motion speed of the robot is set to zero when the operating pressure detected by the operation detecting unit exceeds a threshold.

19. The apparatus according to claim 3, wherein:
the operation detecting unit detects operating pressure related to the touch operation and the drag operation; and
the motion speed determining process includes a process in which the motion speed of the robot is set to zero when the operating pressure detected by the operation detecting unit exceeds a threshold.

20. A non-transitory computer readable storage medium having stored therein a robot operation program that is run by a computer incorporated in a robot operation apparatus that includes a touch panel that receives input of a touch operation and a drag operation from a user, a display that displays graphics, an operation detecting unit that detects the touch operation and the drag operation on the touch panel, a motion command generating unit that generates a motion command for operating the robot based on a detection result from the operation detecting unit, and a display control unit that controls display content of the display, the robot operation program causing the computer to perform:
a motion speed determining process in which a motion speed of the robot is determined based on a slide distance that is a distance from a start position of a drag operation detected by the operation detecting unit to a current position; and
a speed graphics display process in which a speed graphics in which the slide distance and the motion speed of the robot are correlated and that changes in aspect in accompaniment with changes in the slide distance is displayed on the display.

* * * * *